US008508518B2

(12) United States Patent
Uchino et al.

(10) Patent No.: US 8,508,518 B2
(45) Date of Patent: Aug. 13, 2013

(54) DISPLAY APPARATUS AND FABRICATION METHOD AND FABRICATION APPARATUS FOR THE SAME

(75) Inventors: Katsuhide Uchino, Kanagawa (JP); Tetsuro Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1322 days.

(21) Appl. No.: 12/289,570

(22) Filed: Oct. 30, 2008

(65) Prior Publication Data

US 2009/0135166 A1 May 28, 2009

(30) Foreign Application Priority Data

Nov. 28, 2007 (JP) ................................ 2007-307860

(51) Int. Cl.
*G06F 3/038* (2006.01)
*G09G 3/32* (2006.01)

(52) U.S. Cl.
USPC ................................ 345/205; 345/82; 345/83

(58) Field of Classification Search
USPC ........................................ 345/73–76, 82, 205
See application file for complete search history.

(56) References Cited

U.S. PATENT DOCUMENTS

2006/0076550 A1* 4/2006 Kwak et al. .................... 257/13
2006/0170628 A1* 8/2006 Yamashita et al. .............. 345/76
2007/0103405 A1* 5/2007 Kwak et al. .................... 345/76

FOREIGN PATENT DOCUMENTS

JP 2006-215213 8/2006

* cited by examiner

*Primary Examiner* — Alexander Eisen
*Assistant Examiner* — Amit Chatly
(74) *Attorney, Agent, or Firm* — Rader Fishman & Grauer PLLC

(57) ABSTRACT

A pixel array section includes a plurality of pixel circuits disposed in a matrix and each including a driving transistor, a storage capacitor, an electro-optical element, and a sampling transistor. Each pixel circuit includes a pixel divided into a plurality of divisional pixels for each of which an electro-optical element is provided, and a test transistor provided between the driving transistor and the electro-optical elements for carrying out on/off operations for specifying whether or not the electro-optical element is a dark spot element so that the electro-optical element of the dark spot can be specified. The number of the test transistors is smaller than the number of the divisional elements of the original one pixel.

16 Claims, 19 Drawing Sheets

<AGED VARIATION OF V-I CHARACTERISTIC OF ORGANIC EL ELEMENT>

<AGED VARIATION OF V-I CHARACTERISTIC OF ORGANIC EL ELEMENT>

<AGED VARIATION OF V-I CHARACTERISTIC OF ORGANIC EL ELEMENT>

<LIGHT EMITTING PERIOD B>

<DISCHARGE PERIOD C>

<INITIALIZATON PERIOD D>

<FIRST THRESHOLD VALUE CORRECTION PERIOD E>

<DIFFERENT ROW WRITING PERIOD F>

<SECOND THRESHOLD VALUE CORRECTION PERIOD G>

<DIFFERENT ROW WRITING PERIOD H>

<THIRD THRESHOLD VALUE CORRECTION PERIOD I>

<WRITING & MOBILITY CORRECTION PREPARATION PERIOD J>

<SAMPLING PERIOD & MOBILITY CORRECTION PERIOD K>

<LIGHT EMITTING PERIOD L>

FIG.9A
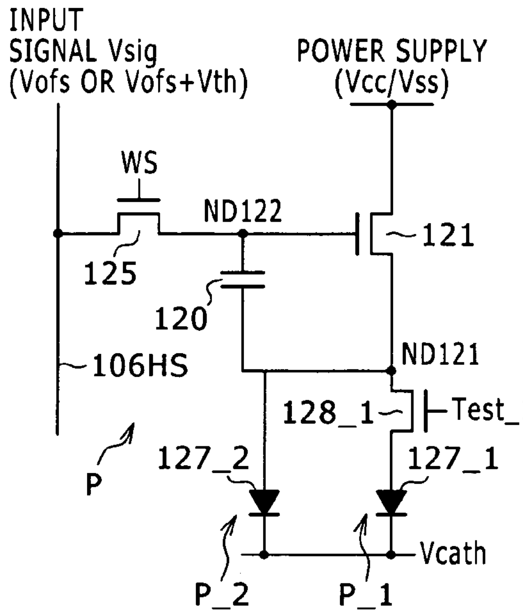
FIG.9B
| 128_1 | 127_2 | 127_1 |
|---|---|---|
| Test_1:L OFF | LIGHT EMISSION → NORMAL | DISREGARDED |
| | NO-LIGHT EMISSION → DARK SPOT | DISREGARDED |
| ON Test_1:H | DARK SPOT SPECIFIED | LIGHT EMISSION → NORMAL |
| | NORMAL | |
| | DISREGARDED (NORMAL) | NO-LIGHT EMISSION → DARK SPOT |
FIG.9C
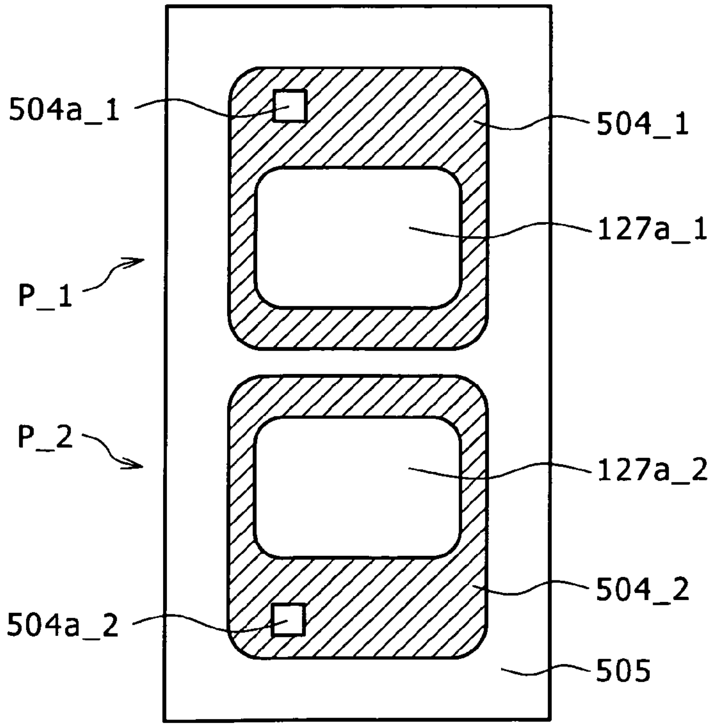

FIG. 9D

DETECTION
(ORGANIC EL ELEMENT 127_2)

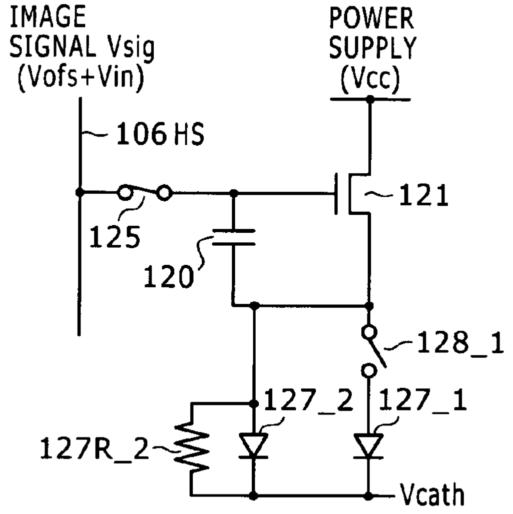

Test: L → TEST TRANSISTOR 128_1 → OFF
DECIDES WHETHER OR NOT ORGANIC EL ELEMENT 127_2 IS DARK SPOT

FIG. 9E

REPAIR
(ORGANIC EL ELEMENT 127_2)

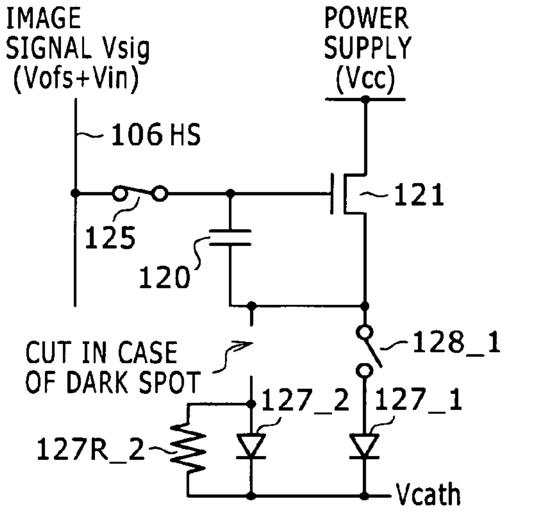

WHEN ORGANIC EL ELEMENT 127_2 IS DARK SPOT, ANODE SIDE WIRING LINE IS CUT FOR ISOLATION

FIG. 9F

DETECTION
(ORGANIC EL ELEMENT 127_1)

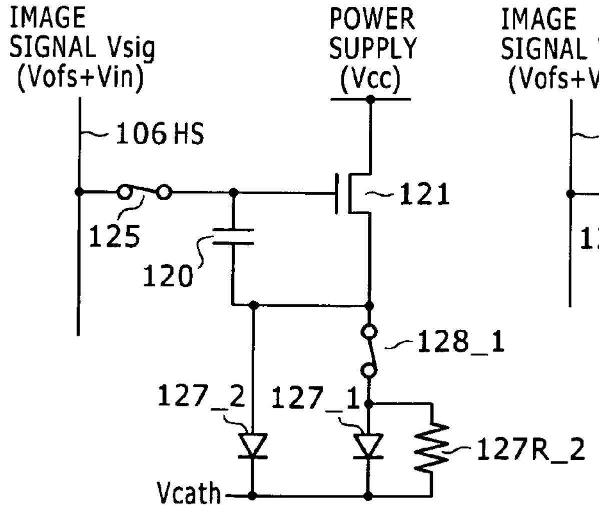

Test: H → TEST TRANSISTOR 128_1 → ON
DECIDES WHETHER OR NOT ORGANIC EL ELEMENT 127_1 IS DARK SPOT

FIG. 9G

REPAIR
(ORGANIC EL ELEMENT 127_1)

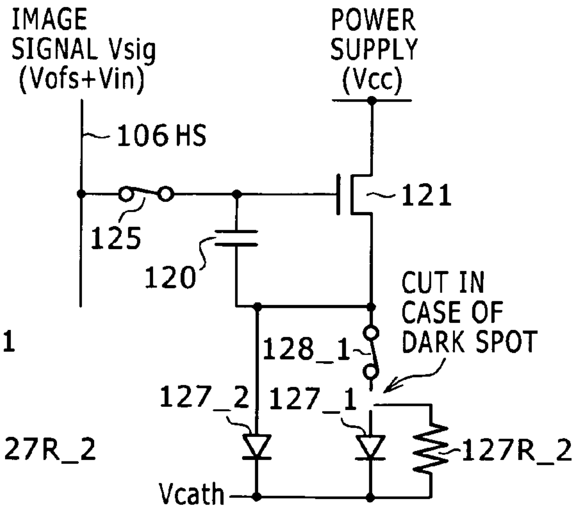

WHEN ORGANIC EL ELEMENT 127_1 IS DARK SPOT, ANODE SIDE WIRING LINE IS CUT FOR ISOLATION

FIG.10A

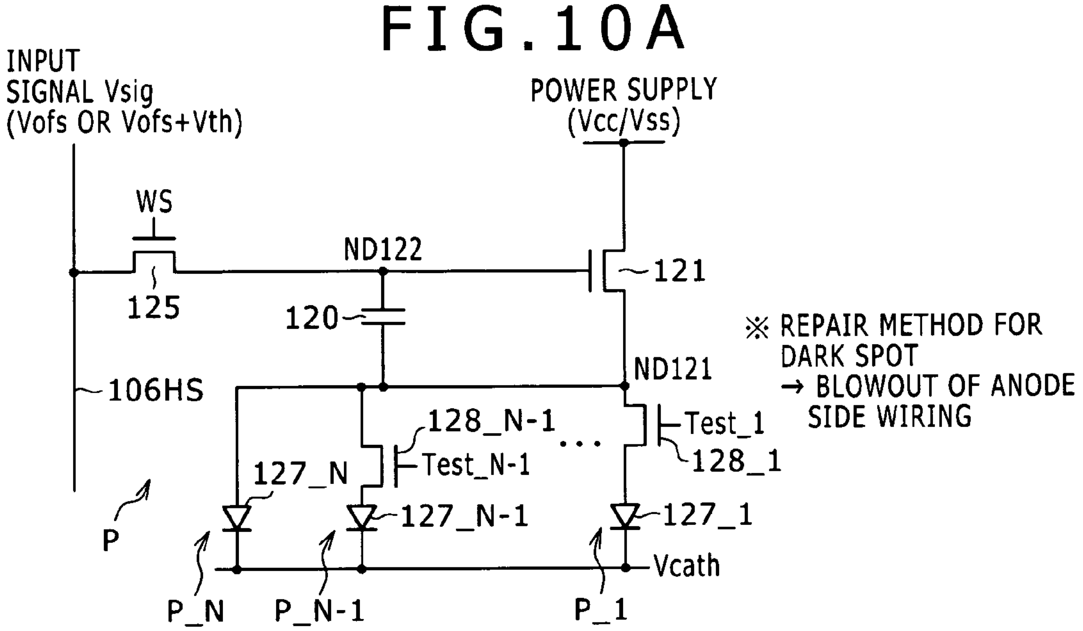

FIG.10B

| 128_k | 127_N | 127_N-1 | ••• | 127_2 | 127_1 |
|---|---|---|---|---|---|
| Test_k:L ALL OFF | LIGHT EMISSION → NORMAL | DISREGARDED | | DISREGARDED | DISREGARDED |
| | NO-LIGHT EMISSION → DARK SPOT | DISREGARDED | | DISREGARDED | DISREGARDED |
| Test_N-1:H 128_N-1:ON | DARK SPOT SPECIFIED | LIGHT EMISSION → NORMAL | | ••• | ••• |
| | NORMAL | | | | |
| | DISREGARDED (NORMAL) | NO-LIGHT EMISSION → DARK SPOT | | | |
| ⋮ | | | | ••• | ••• |
| Test_k:H ALL ON | | | | DARK SPOT SPECIFIED | LIGHT EMISSION → NORMAL |
| | | | | NORMAL | |
| | | | | DISREGARDED (NORMAL) | NO-LIGHT EMISSION → DARK SPOT |

FIG. 11C

DETECTION
(ORGANIC EL ELEMENT 127_1)

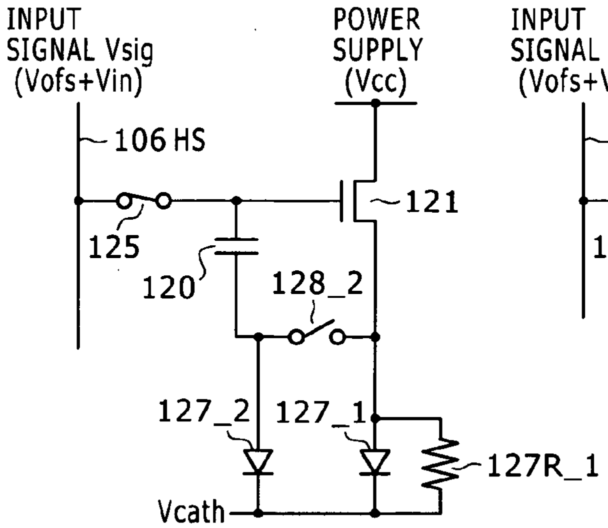

Test: L → TEST TRANSISTOR 128_2 → OFF
DECIDES WHETHER OR NOT ORGANIC EL ELEMENT 127_1 IS DARK SPOT

FIG. 11D

REPAIR
(ORGANIC EL ELEMENT 127_1)

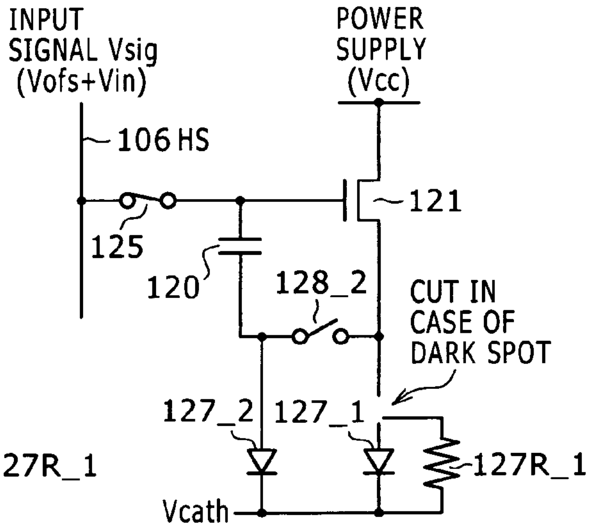

WHEN ORGANIC EL ELEMENT 127_1 IS DARK SPOT, ANODE SIDE WIRING LINE IS CUT FOR ISOLATION

FIG. 11E

DETECTION
(ORGANIC EL ELEMENT 127_2)

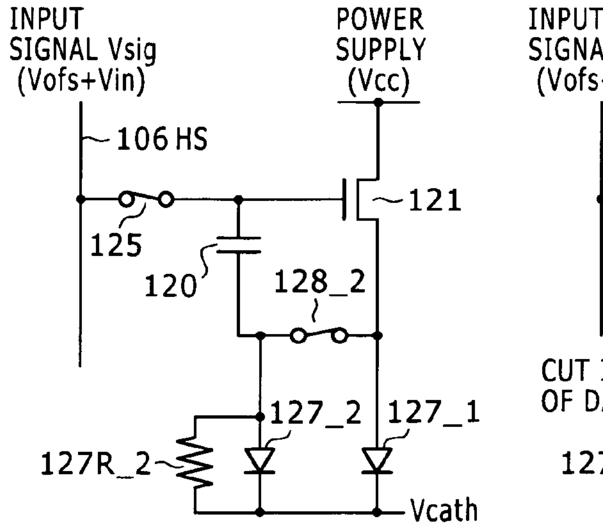

Test: H → TEST TRANSISTOR 128_2 → ON
DECIDES WHETHER OR NOT ORGANIC EL ELEMENT 127_2 IS DARK SPOT

FIG. 11F

REPAIR
(ORGANIC EL ELEMENT 127_2)

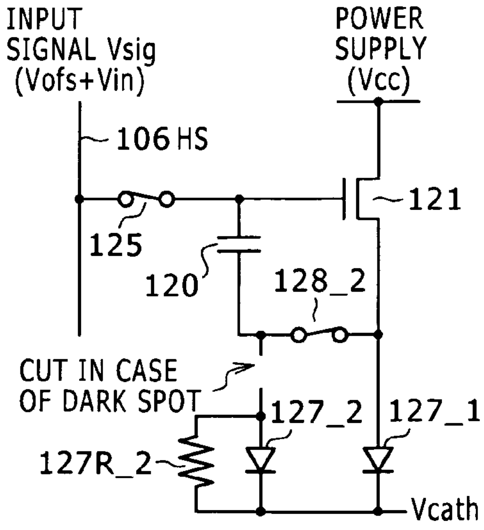

WHEN ORGANIC EL ELEMENT 127_2 IS DARK SPOT, ANODE SIDE WIRING LINE IS CUT FOR ISOLATION

FIG.12A

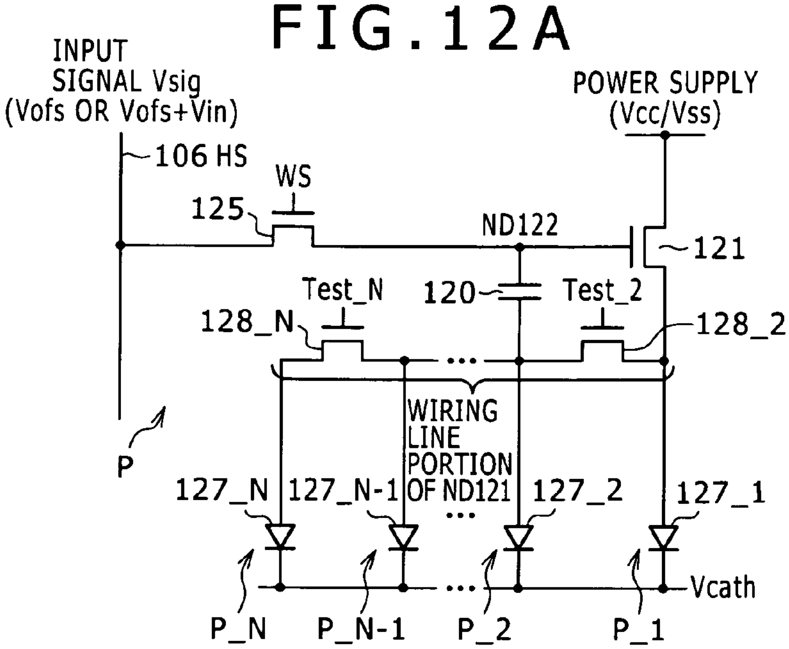

FIG.12B

| 128_k | 127_1 | 127_2 | ··· | 127_N-1 | 127_N |
|---|---|---|---|---|---|
| AT LEAST _2 OFF | LIGHT EMISSION → NORMAL | DISREGARDED | | DISREGARDED | DISREGARDED |
| | NO-LIGHT EMISSION → DARK SPOT | DISREGARDED | | DISREGARDED | DISREGARDED |
| _2 ON AND AT LEAST _3 OFF | DARK SPOT SPECIFIED | LIGHT EMISSION → NORMAL | | ··· | ··· |
| | NORMAL | | | | |
| | DISREGARDED (NORMAL) | NO-LIGHT EMISSION → DARK SPOT | | | |
| ⋮ | | | | ··· | ··· |
| Test_k:H ALL ON | | | | DARK SPOT SPECIFIED | LIGHT EMISSION → NORMAL |
| | | | | NORMAL | |
| | | | | DISREGARDED (NORMAL) | NO-LIGHT EMISSION → DARK SPOT |

DISPLAY APPARATUS AND FABRICATION METHOD AND FABRICATION APPARATUS FOR THE SAME

CROSS REFERENCES TO RELATED APPLICATIONS

The present invention contains subject matter related to Japanese Patent Application JP 2007-307860, filed in the Japan Patent Office on Nov. 28, 2007, the entire contents of which being incorporated herein by reference.

BACKGROUND OF THE INVENTION

1. Field of the Invention

This invention relates to a display apparatus which includes a pixel array section including a plurality of pixel circuits (hereinafter referred to also as pixels) disposed in rows and columns and each including an electro-optical element (hereinafter referred to as display element or light emitting element), and also to a fabrication method and a fabrication apparatus for the display apparatus. More particularly, the present invention relates to a display apparatus of the active matrix type wherein a plurality of pixel circuits each including an electro-optical element whose emission light luminance varies depending upon current flowing therethrough are disposed in rows and columns and display driving in a unit of a pixel is carried out by an active element included in each of the pixel circuits, and also to a fabrication method and a fabrication apparatus for the display apparatus.

2. Description of the Related Art

A display apparatus is available which uses, as a display element of a pixel, an electro-optical element whose emission light luminance varies depending upon a voltage applied thereto or depending upon current flowing therethrough. For example, a liquid crystal display element is a representative one of electro-optical elements whose emission light varies depending upon a voltage applied thereto. Meanwhile, an organic electroluminescence (hereinafter referred to as organic EL) element such as an organic light emitting diode (OLED) is a representative one of electro-optical elements whose emission light luminance varies depending upon current flowing therethrough. An organic EL display apparatus which uses the latter organic EL element is a selfluminous display apparatus which uses an electro-optical element, which is a selfluminous element, as a display element of a pixel.

An organic EL element includes a lower electrode, an upper electrode, and an organic thin film or organic layer disposed between the upper and lower electrodes and formed by laminating an organic hole transport layer, an organic light emitting layer and so forth. With the organic EL element, a gradation of color development is obtained by controlling the value of current flowing through the organic EL element.

Since the organic EL element can be driven with a comparatively low application voltage such as, for example, 10 V or less, it exhibits low power consumption. Further, since the organic EL element is a selfluminous element which itself emits light, the organic EL display apparatus does not require an auxiliary illuminating member such as a backlight which is required by a liquid crystal display apparatus, and therefore, reduction in weight and thickness can be achieved readily with the organic EL display apparatus. Furthermore, since the response speed of the organic EL element is very high such as, for example, approximately several μs, an afterimage does not appear upon dynamic image display. Since the organic EL element has such advantages as described above, a display apparatus of a plane selfluminous type which uses an organic EL element as an electro-optical element has been and is being developed energetically in recent years.

Incidentally, a display apparatus which uses an electro-optical element including a liquid crystal display apparatus which uses a liquid crystal display element and an organic EL display apparatus which uses an organic EL element can adopt, as a driving method, a simple or passive matrix system and an active matrix system. However, although the display apparatus of the simple matrix system is simple in structure, it has a problem that it is difficult to implement a display apparatus of a large size and a high definition.

Therefore, in recent years, a display apparatus of the active matrix system is developed energetically wherein a pixel signal to be supplied to a light emitting element in a pixel is controlled using an active element formed within a pixel, for example, an insulated gate field effect transistor, usually, a thin film transistor (TFT), as a switching transistor.

In order to cause the electro-optical element in the pixel circuit to emit light, an input image signal supplied through an image signal line is fetched into a storage capacitor or pixel capacitor provided at the gate terminal, which is a control input terminal, of a driving transistor through a switching transistor (hereinafter referred to as sampling transistor). Then, a driving signal in accordance with the fetched input image signal is supplied to the electro-optical element.

In a liquid crystal display apparatus which uses a liquid crystal display element as an electro-optical element, since the liquid crystal display element is an element of the voltage driven type, the liquid crystal display element is driven by a voltage signal itself corresponding to the input image signal fetched in the storage capacitor. In contrast, in an organic EL display apparatus which uses an element of the current driven type such as an organic EL element as an electro-optical element, a driving signal in the form of a voltage signal corresponding to the input image signal fetched in the storage capacitor is converted into a current signal by a driving transistor. Then, the driving current is supplied to the organic EL element and so forth.

In an electro-optical element of the current driven type represented by an organic EL element, where the value of driving current differs, also the emission light luminance differs. Therefore, in order to cause the electro-optical element to emit light with stable luminance, it is important to supply stable driving current to the electro-optical element. For example, driving methods for supplying driving current to the organic EL element can be roughly divided into a constant current driving method and a constant voltage driving method. Such driving methods are known and are not described specifically herein.

Since the voltage-current characteristic of the organic EL element has a steep slope, if constant voltage driving is applied, then a small dispersion of a voltage or a small dispersion of an element characteristic gives rise to a great dispersion of current and gives rise to a great luminance dispersion. Therefore, constant current driving wherein a driving transistor is used in a saturation region is used popularly. Naturally, even with constant current driving, if some current fluctuation exists, then this gives rise to a dispersion in luminance. However, if the current dispersion is small, then only small luminance dispersion occurs.

Conversely speaking, even where the constant current driving method is used, in order to make the emission light luminance of the electro-optical element invariable, it is significant for the driving signal, which is written into and stored in the storage capacitor in response to an input image signal, to be fixed. For example, in order for the emission light luminance of the organic EL element to be invariable, it is important for the driving current corresponding to the input image signal to be fixed.

However, the threshold voltage or the mobility of the active element, that is, a driving transistor, for driving the electro-optical element is dispersed by a process fluctuation. Further, a characteristic of the electro-optical element such as an organic EL element is fluctuated as time passes. If such a characteristic dispersion of a driving active element or a characteristic fluctuation of an electro-optical element exists, then this has an influence on the emission light luminance even where the constant current driving method is applied.

Therefore, in order to control the emission light luminance so as to be uniform over an entire screen of a display apparatus, various mechanisms for compensating for a luminance fluctuation arising from a characteristic fluctuation of a driving active element or an electro-optical element in each pixel circuit are investigated.

One of such mechanisms as just described is disclosed, for example, in Japanese Patent Laid-Open No. 2006-215213 (hereinafter referred to as Patent Document 1).

For example, according to the mechanism disclosed in Patent Document 1, a pixel circuit for an organic EL element is disclosed which has a threshold value correction function for making the driving current fixed even where the threshold voltage of a driving transistor suffers from a dispersion or aged deterioration, a mobility correction function for making the driving current fixed even where the mobility of the driving transistor suffers from a dispersion or aged deterioration and a bootstrap function for making the driving current fixed even where the current-voltage characteristic of an organic EL element suffers from aged deterioration.

SUMMARY OF THE INVENTION

However, if dust or the like sticks, upon fabrication of a panel, to an electro-optical element beginning with an organic EL element, then the electro-optical element becomes a dark spot element which does not emit light normally and forms a pixel defect on the panel, and this makes a cause of a drop of the yield. Such a defect to display as just described makes an obstacle to improvement of the efficiency percentage of the display apparatus and obstructs reduction of the cost of the display apparatus.

Further, the mechanism disclosed in Patent Document 1 adopts a 5TR driving configuration and is complicated in configuration of a pixel circuit. Since the pixel circuit includes a great number of components, enhancement of the definition of a display apparatus is obstructed. As a result, it is difficult to apply the 5TR driving configuration to a display apparatus which is used with a small-sized electronic apparatus such as a portable apparatus or mobile apparatus.

Therefore, it is demanded to develop a mechanism which makes a dark spot, which does not emit light normally, less conspicuous while achieving simplification of a pixel circuit. In this instance, it should be taken into consideration that a dark spot should be made less conspicuous and a problem which does not occur with the 5TR configuration may not be caused newly by simplification of the pixel circuit.

Therefore, it is desirable to provide a display apparatus which can make a dark spot, from which light is not emitted normally, less conspicuous and can achieve improvement of the efficiency percentage and a fabrication method and a fabrication apparatus by which the display apparatus can be fabricated efficiently.

Also it desirable to provide a display apparatus which can achieve a high definition by simplification of a pixel circuit and a fabrication method and a fabrication apparatus by which the display apparatus can be fabricated efficiently.

Further, it is desirable to provide a display apparatus which can suppress a luminance variation by a characteristic dispersion of a driving transistor or an electro-optical element while simplification of a pixel circuit is achieved and a fabrication method and a fabrication apparatus by which the display apparatus can be fabricated efficiently.

According to an embodiment of the present invention, there is provided a display apparatus including a pixel array section including a plurality of pixel circuits disposed in rows and columns and each including a driving transistor configured to produce driving current, a storage capacitor configured to store information in accordance with a signal amplitude of an image signal, an electro-optical element connected to an output terminal of the driving transistor, and a sampling transistor configured to write information in accordance with the signal amplitude into the storage capacitor, the driving transistor being operable to produce driving current based on the information stored in the storage capacitor and supply the driving current to the electro-optical element to cause the electro-optical element to emit light, the pixel circuit including a pixel divided into a plurality of divisional pixels for each of which the electro-optical element is provided, and a test transistor or transistors provided between the driving transistor and each of the electro-optical elements and capable of carrying out on/off operations for specifying whether or not the electro-optical element connected thereto is a dark spot element which does not emit light so that the electro-optical element of the dark spot can be specified, the number of the test transistors being smaller than the number of the divisional elements of the original one pixel.

In order for the sampling transistor to write information in accordance with a signal amplitude of an image signal into the storage capacitor, the sampling transistor fetches the signal potential to an input terminal thereof, that is, to one of the source terminal and the drain terminal thereof, and writes the information in accordance with the signal amplitude into the storage element connected to an output terminal thereof, that is, to the other of the source terminal and the drain terminal thereof. Naturally, the output terminal of the sampling transistor is connected also to a control input terminal of the driving transistor.

It is to be noted that the connection scheme of the pixel circuit described above exhibits the most basic 2TR configuration including the driving transistor and the sampling transistor. It suffices for the pixel circuit to include at least only the components mentioned but may additionally include some other component. Further, the term "connection" includes not only direct connection but also indirect connection with some component interposed therein.

For example, any connection may be modified such that a transistor for switching, a functioning element having some function or a like element is interposed as occasion demands. Typically, a switching transistor for dynamically controlling a display period, or in other words, a no-light emitting time period, may be interposed between the output terminal of the driving transistor and the electro-optical element. Or, a switching transistor may be interposed between the power supply terminal, typically, the drain terminal, of the driving transistor and a power supply line which is a wiring line for supplying power or between the output terminal of the driving transistor and a reference voltage line.

Even with such modified pixel circuits as described above, if they can implement the configuration and operation described above, also they are considered as pixel circuits which implement the embodiment of the display apparatus.

Further, a control unit for driving the pixel circuits may be provided at a peripheral portion of the pixel array section. The control unit includes, for example, a writing scanning section for successively controlling the sampling transistors within a horizontal period to line-sequentially scan the pixel circuits to write information in accordance with the signal amplitude of the image signal into the storage capacitors for one row, and a horizontal driving section for controlling so that the image signal is supplied to the sampling transistors in synchronism with the line-sequential scanning by the writing scanning section.

The display apparatus may further include a driving signal fixing circuit configured to keep the driving current fixed. The driving signal fixing circuit is formed from a combination of a connection scheme of the components of the pixel circuit and a scanning section for scanning and driving the pixel circuits. Corresponding to this, the control unit includes a scanning section for controlling the driving signal fixing circuit.

The driving signal fixing circuit signifies a circuit which tries to keep the driving current of the driving transistor fixed even when aged deterioration of the current-voltage characteristic of the electro-optical element or a characteristic variation of the driving transistor occurs. The driving signal fixing circuit may have any particular circuit configuration. In addition to the sampling transistor which is an example of a switching transistor and the driving transistor, some other switching transistor for carrying out control of keeping the driving current fixed may be provided.

For example, the control unit controls so as to carry out a threshold value correction operation for storing a voltage corresponding to a threshold voltage of the driving transistor into the storage capacitor. Where the pixel circuit has the 2TR configuration, the sampling transistor is rendered conducting within a time zone, within which a voltage corresponding to a first potential to be used to supply the driving current to the electro-optical element is supplied to a power supply terminal of the driving transistor and the reference potential of the image signal is supplied to the sampling transistor, to store a voltage corresponding to a threshold voltage of the driving transistor into the storage capacitor.

To this end, where the pixel circuit has the 2TR configuration, the control unit includes a driving scanning section for outputting a scanning driving pulse for controlling power supply to be applied to the power supply terminal of the driving transistors for one row in synchronism with the line-sequential scanning by the writing scanning section, and the horizontal driving section supplies an image signal, which changes over between the reference potential and the signal potential within each one horizontal period, to the sampling transistor. The sampling transistor functions as a switching transistor relating to the driving signal fixing function, and in order to implement the function, on/off operations of the sampling transistor are controlled.

The threshold value correction operation may be executed repetitively in a plurality of horizontal periods preceding to writing of the signal amplitude into the storage capacitor as occasion demands. Here, "as occasion demands" signifies a case wherein the voltage corresponding to the threshold voltage of the driving transistor cannot be stored fully into the storage capacitor within the threshold value correction period within one horizontal period. By execution of the threshold value correction operation by a plural number of times, the voltage corresponding to the threshold voltage of the driving transistor can be stored with certainty into the storage capacitor.

Further, the control unit controls so that initialization of the potential of the control input terminal and the output terminal of the driving transistor and the storage capacitor is carried out prior to the threshold value correction operation so that the potential difference between the terminals of the driving transistor may become higher than the threshold voltage. Where the pixel circuit has the 2TR configuration, the control unit renders the sampling transistor conducting within a time zone, within which a voltage corresponding to the second potential is supplied to the power supply terminal of the driving transistor and the reference potential is supplied to the input terminal which is one of the source terminal and the drain terminal of the sampling transistor, to set the control input terminal of the driving transistor to the reference potential and set the output terminal of the driving transistor to the second potential.

Further, after the threshold value correction operation, the control unit may implement a mobility correction function of adding, when the sampling transistor is rendered conducting to write information in accordance with the signal amplitude into the storage capacitor, a correction amount for a mobility of the driving transistor to the signal written in the storage capacitor. In this instance, where the pixel circuit has the 2TR configuration, the sampling transistor may be kept conducting only within a period shorter than the time zone within which the signal potential is supplied to the sampling transistor at a predetermined position within the time zone.

Further, the storage capacitor is connected between the control input terminal and the output terminal, which in fact is one of the terminals of the electro-optical element, of the driving transistor in order to implement the bootstrap function. The control unit controls such that the sampling transistor is rendered non-conducting at a point of time at which the information corresponding to the signal amplitude is written into the storage capacitor to stop the supply of the image signal to the control input terminal of the driving transistor thereby to carry out a bootstrap operation of causing the potential of the control input terminal of the driving transistor to interlock with the potential fluctuation of the output terminal of the driving transistor.

Here, as a characteristic matter of the display apparatus according to the embodiment of the present invention, one pixel is divided into a plurality of pixels, and the electro-optical element is provided for each of the divisional pixels. Further, when any of the electro-optical elements of the divisional pixels is a dark spot element, in order to specify the electro-optical element of the dark spot which is hereinafter referred to as dark spot element, it is made possible for the driving current to be selectively supplied from the driving transistor to the electro-optical elements through test transistors which are switching transistors and function as test switches. Here, the number of the test transistors is smaller than the number of the divisional pixels of the original pixel.

The term "selectively" is used to signify not only that it is made possible to select the electro-optical elements of the divisional pixels by one by one but also that the transistors may be arranged and connected in any manner only if they can carry out on/off operations to specify any dark spot element.

Upon fabrication of the display apparatus, the pixel circuit is rendered operative to specify presence or absence of a dark spot element and the position of the dark spot element through the selective operation of the test transistors. Then, if a dark spot element and the position of the same are specified, then an energy beam such as a laser beam is irradiated from a dark spot separation apparatus to electrically isolate the dark spot element from the other normal electro-optical elements (hereinafter referred to as normal elements). This process is referred to as process of repairing the dark spot element. Then, upon later normal operation, the test transistors are turned on and used in order to carry out display with the remaining normal elements.

In particular, where one pixel includes a plurality of electro-optical elements and a test transistor or transistors for specifying a dark spot element, a dark spot element is specified by on/off operations of the test transistor or transistors. If a dark spot element is specified, then the dark spot element is repaired and display is carried out using the remaining normal elements thereby to prevent the pixel from fully becoming a dark spot element.

In summary, with the display apparatus of the embodiment of the present invention, the pixel circuit is configured such that a pixel is divided into a plurality of divisional pixels in each of which the electro-optical element is provided and driving current can be selectively supplied from the driving transistor to the electro-optical elements of the divisional pixels through the test transistor or transistors which function as a test switch or switches.

Upon fabrication, the pixel circuits are rendered operative to specify presence or absence of a dark spot element and the position of the dark spot element through the selective operation of the test transistor or transistors, and the dark spot element is electrically isolated from the normal pixel circuits. Then, upon later normal operation, the test transistor or transistors are turned on and used in order to carry out display using the remaining normal electro-optical elements.

Where a plurality of electro-optical elements are provided in a pixel and a dark spot element is specified by on/off operations of the test transistor or transistors interposed between the electro-optical elements and the driving transistor and then isolated from the normal pixel circuits, one pixel can be prevented from fully becoming a dark spot element.

Even where the electro-optical element of one of the divisional pixels becomes a dark spot element, by electrically isolating the dark spot element from the electro-optical elements of the remaining normal divisional pixels by a repair operation such that the electro-optical elements of the other normal divisional pixels are used for display, then an effect that the dark spot element does not look a dark spot can be enjoyed. Consequently, one pixel can be prevented from fully becoming a dark spot element, and therefore, the yield in fabrication can be improved.

Here, in order to implement the threshold value correction function and the threshold value correction preparation function or initialization function or the mobility correction function which is carried out prior to the threshold value correction function, the power supply terminal of the driving transistor is changed over between the first potential and the second potential, and to use the power supply voltage as a switching pulse functions effectively. In particular, if the power supply voltage to be supplied to the driving transistors of the pixel circuits is used as a switching pulse in order to incorporate the threshold value correction function or the mobility correction function, then a switching transistor for correction and a scanning line for controlling the control input terminal of the switching transistor become unnecessary.

As a result, only it is necessary to apply some modification to the driving timings and so forth of the transistors on the basis of the 2TR driving configuration, and the number of components of the pixel circuit and the number of wiring lines can be reduced significantly and the pixel array section can be reduced. Consequently, a higher definition of the display apparatus can be achieved readily. Further, while simplification of the pixel circuit is achieved, a drop of the yield of a panel by dark spots can be prevented. Since the number of elements and the number of wiring lines are reduced, the display apparatus is suitable to achieve a higher definition, and a display apparatus of a small size for which high definition display is demanded can be implemented readily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 9A is a circuit diagram showing a pixel circuit of a first form having a dark spot element countermeasure function and FIG. 9B is a view illustrating a dark spot inspection step for specifying presence or absence of a dark spot element and the position of the dark spot element;

FIG. 9C is a plan view of one pixel illustrating an arrangement relationship of an organic EL element on a semiconductor substrate in the first form of the dark spot element countermeasure function;

FIGS. 9D to 9G are circuit diagrams illustrating a dark spot inspection step and a repair step of the pixel circuit of the first form;

FIG. 10A is a circuit diagram showing a pixel circuit of a second form having the dark spot element countermeasure function;

FIG. 10B is a view illustrating a dark spot inspection step of the pixel circuit of the second form;

FIGS. 11C to 11F are circuit diagrams illustrating a dark spot inspection step and a repair step for the pixel circuit of the third form;

FIG. 12A is a circuit diagram showing a pixel circuit of a fourth form having the dark spot element countermeasure function; and FIG. 12B is a view illustrating a dark spot inspection step for the pixel circuit of the fourth form.

DETAILED DESCRIPTION OF THE PREFERRED EMBODIMENT

Hereinafter, an embodiment of the present invention will be described with reference to the accompanying drawings.

<General Outline of the Display Apparatus>

Figure 1A:
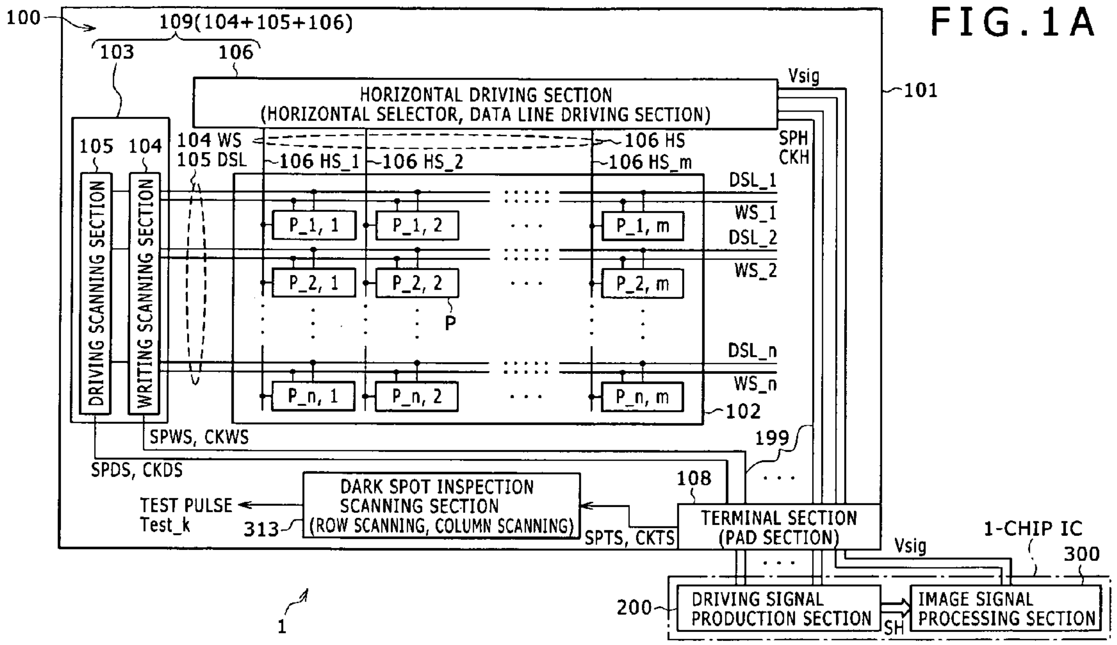
FIG. 1A is a block diagram showing a general configuration as a first configuration example of an active matrix display apparatus as a display apparatus according to an embodiment of the present invention.
Figure 1B:
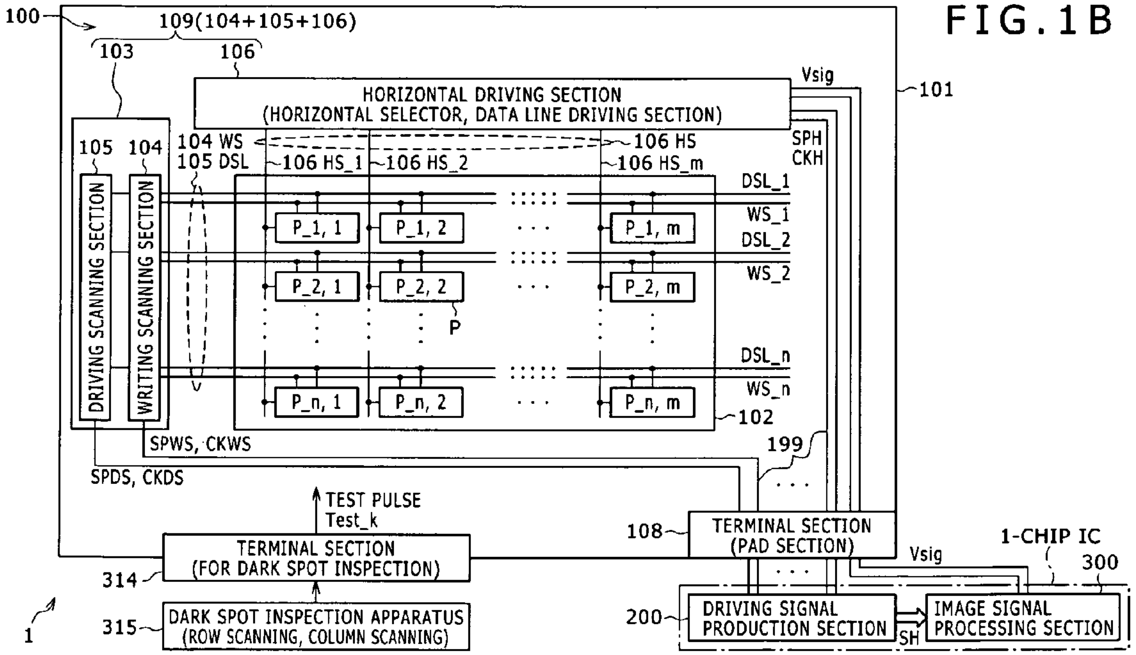
FIG. 1B is a similar view but showing a general configuration as a second configuration example of the active matrix display apparatus as the display apparatus according to the embodiment of the present invention.

Referring first to FIGS. 1A and 1B, there are shown different examples of a configuration of an active matrix type display apparatus as a display apparatus according to a preferred embodiment of the present invention. In the present embodiment, the present invention is applied to an active matrix type organic EL display apparatus (hereinafter referred to simply as “organic EL display apparatus”) wherein, for example, an organic EL element and a polysilicon thin film transistor (TFT) are used as a display element (electro-optical element or light emitting element) and an active element of each pixel, respectively. Further, in the organic EL display apparatus, such organic EL elements are formed on a semiconductor substrate on which such thin film transistors are formed.

It is to be noted that, while an organic EL element is described below particularly as an example of a display element of a pixel, this is a mere example, but the display element to be used is not limited to an organic EL element. Generally, all forms of the embodiment of the invention described below can be applied similarly to all display elements which are driven by current to emit light.

The first configuration example shown in FIG. 1A is configured such that a scanning circuit for dark spot inspection is incorporated in a panel of the organic EL display apparatus 1. Meanwhile, the second configuration example shown in FIG. 1B has a configuration ready for a jig wherein a scanning circuit for dark spot inspection is provided externally of the organic EL display apparatus 1.

As seen in FIGS. 1A and 1B, the organic EL display apparatus 1 includes a display panel section 100 wherein a plurality of pixel circuits (also referred to as pixels) P each having an organic EL element not shown as a display element are disposed in such a manner as to form an effective image region of a display aspect ratio of X:Y which may be, for example, 9:16. The organic EL display apparatus 1 further includes a driving signal production section 200 serving as a panel control unit for generating various pulse signals for controlling and driving the display panel section 100, and an image signal processing section 300. The driving signal production section 200 and the image signal processing section 300 are built in a one-chip IC (Integrated Circuit; semiconductor integrated circuit).

The organic EL display apparatus 1 may have a form of a module which includes all of the display panel section 100, driving signal production section 200 and image signal processing section 300 or may have another form which includes, for example, only the display panel section 100. The organic EL display apparatus 1 having the form just described is utilized as a display section of a portable music player or some other electronic apparatus-which utilizes a recording medium such as a semiconductor memory, a mini disk (MD) or a cassette tape.

The display panel section 100 includes a pixel array section 102 wherein the pixel circuits P are arrayed in a matrix of n rows×m columns, a vertical driving section 103 for scanning the pixel circuits P in a vertical direction, a horizontal driving section 106 for scanning the pixel circuits P in a horizontal direction, a terminal section or pad section 108 for external connection and so forth formed in an integrated manner on a substrate 101. The horizontal driving section 106 is called also horizontal selector or data line driving section. Thus, such peripheral driving circuits as the vertical driving section 103 and the horizontal driving section 106 are formed on the same substrate 101 on which the pixel array section 102 is formed.

The vertical driving section 103 includes, for example, a writing scanning section 104 and a driving scanning section 105 which functions as a power supply scanner having a power supplying capacity.

The vertical driving section 103 and the horizontal driving section 106 cooperatively form a control unit 109 which controls writing of information corresponding to a signal amplitude into a storage capacitor, a threshold value correction operation, a mobility correction operation and a bootstrap operation.

The configuration of the vertical driving section 103 shown and corresponding scanning lines is shown in conformity with that where the pixel circuits P have a 2TR configuration of the present embodiment hereinafter described. However, depending upon the configuration of the pixel circuits P, some other scanning section may be provided.

The pixel array section 102 is driven, as an example, from one side or the opposite sides thereof in the leftward and rightward direction in FIG. 1A or 1B by the writing scanning section 104 and the driving scanning section 105 and is driven from one side or the opposite sides thereof in the upward and downward direction by the horizontal driving section 106.

To the terminal section 108, various pulse signals are supplied from the driving signal production section 200 disposed externally of the organic EL display apparatus 1. Similarly, an image signal Vsig is supplied from the image signal processing section 300 to the terminal section 108.

As an example, necessary pulse signals which include a shift start pulse SPDS or SPWS which is an example of a writing starting pulse in the vertical direction and a vertical scanning clock CKDS or CKWS are supplied as pulse signals for vertical driving. Further, as pulse signals for horizontal driving, necessary pulse signals such as a horizontal start pulse SPH which is an example of a writing starting pulse in the horizontal direction and a horizontal scanning clock CKH are supplied.

Terminals of the terminal section 108 are connected to the vertical driving section 103 and the horizontal driving section 106 through wiring lines 199. For example, pulses supplied to the terminal section 108 are supplied to components of the vertical driving section 103 or the horizontal driving section 106 through buffers after the voltage level thereof is internally adjusted by a level shifter section not shown as occasion demands.

Though not shown, the pixel array section 102 is configured such that the pixel circuits P wherein a pixel transistor is provided for an organic EL element as a display element are disposed two-dimensionally in rows and columns and the scanning lines are wired for individual rows and the signal lines are wired for individual columns for the pixel array.

For example, scanning lines or gate lines 104WS, power supply lines 150DSL and image signal lines or data lines 106HS are formed in the pixel array section 102. At each of intersecting places of the gate lines 104WS and power supply lines 150DSL and the data lines 106HS, an organic EL element not shown and a thin film transistor (TFT) for driving the organic EL element are formed. A pixel circuit P is formed from a combination of the organic EL element and the thin film transistor.

In particular, for the pixel circuits P arrayed in a matrix, writing scanning lines 104WS_1 to 104WS_N for n rows which are driven with a writing driving pulse WS by the writing scanning section 104 and power supply lines 105DS_1 to 105DSL_n for n rows which are driven with a power supply driving pulse DSL by the driving scanning section 105 are wired for the individual pixel rows.

The writing scanning section 104 and the driving scanning section 105 successively select the pixel circuits P through the scanning lines 104WS and the power supply lines 105DSL based on a pulse signal of the vertical driving system supplied from the driving signal production section 200. The horizontal driving section 106 samples a predetermined potential from within the image signal Vsig through an image signal line 106HS and writes the sampled predetermined potential into the storage capacitor of the selected pixel circuit P based on a pulse signal of the horizontal driving system supplied from the driving signal production section 200.

In the organic EL display apparatus 1 of the present embodiment, line-sequential driving is used as an example. In particular, the writing scanning section 104 and the driving scanning section 105 of the vertical driving section 103 scan the pixel array section 102 line-sequentially, that is, in a unit of a row, and the horizontal driving section 106 writes an image signal into the pixel array section 102 simultaneously for one horizontally line in synchronism with the line-sequential scanning.

In order to be ready for line-sequential driving, for example, the horizontal driving section 106 is configured including a driver circuit for placing switches not shown provided on the image signal lines 106HS of all columns into an on state at a time. Further, the horizontal driving section 106 places switches not shown provided on the image signal lines 106HS of all columns into an on state at a time in order to write an image signal inputted from the image signal processing section 300 at a time into all pixel circuits P for one line of a row selected by the vertical driving section 103.

In order to be ready for line-sequential driving, components of the vertical driving section 103 are formed from combinations of logic gates including latches and select the pixel circuits P of the pixel array section 102 in a unit of a row. It is to be noted that, while the configuration wherein the vertical driving section 103 is disposed on only one side of the pixel array section 102 is shown in FIG. 1A, it is possible to otherwise dispose the vertical driving section 103 on the opposite left and right sides of the pixel array section 102.

Similarly, while the configuration wherein the horizontal driving section 106 is disposed on only one side of the pixel array section 102 is shown in FIG. 1A, it is possible to adopt another configuration wherein the horizontal driving section 106 is disposed on the opposite upper and lower sides of the pixel array section 102.

Here, although details are hereinafter described, the organic EL display apparatus 1 of the present embodiment adopts, as a configuration of the pixel circuits P, a configuration which is ready for a case wherein an organic EL element forms a dark spot (pixel which does not emit light) by such a defect as dust. Corresponding to this, the organic EL display apparatus 1 includes a mechanism for inspecting a dark spot.

For example, in the first configuration example shown in FIG. 1A, a dark spot inspection scanning section 313 for dark spot inspection is incorporated in the display panel section 100. To the dark spot inspection scanning section 313, necessary pulses such as a shift stark pulse SPTS for a test pulse Test_k and a scanning clock CKTS are supplied. The dark spot inspection scanning section 313 produces the test pulse Test_k to be supplied to the pixel circuits P based on the shift start pulse SPTS, scanning clock CKTS and so forth.

On the other hand, in the second configuration example shown in FIG. 1B, a terminal section 314 for receiving the test pulse Test_k to be supplied to the pixel circuit P from the outside of the display panel section 100 is provided. Further, as an inspection jig, a dark spot inspection apparatus 315 having a function similar to that of the dark spot inspection scanning section 313 is prepared outside the display panel section 100.

The first configuration example wherein the dark spot inspection scanning section 313 is provided on the display panel section 100 has an advantage that the dark spot inspection apparatus 315 is not required on a fabrication line and a specification work of a dark spot element can be carried out solely by the organic EL display apparatus 1. For example, since it is necessary to carry out the specification work of a dark spot element for all of the pixel circuits P on the display panel section 100, although much time is required, the work is generally fixed. On the other hand, a repair work for dark spot elements depends upon the number of dark spots, and if the number of dark spots is small, then the repair work requires only much shorter time than the specification work of dark spot elements.

In this connection, it seems a possible idea to prepare a fabrication equipment which includes a large number of dark spot inspection apparatus 315 in order to restrict a critical path upon fabrication to the repair step of dark spot positions. As an extension of this, it seems a possible idea to provide the organic EL display apparatus 1 itself with the dark spot inspection scanning section 313 having a function same as that of the dark spot inspection apparatus 315.

On the other hand, provision of the dark spot inspection scanning section 313 for each organic EL display apparatus 1 provides a drawback that an increased panel cost is required. As a countermeasure, it seems a possible idea to provide the organic EL display apparatus 1 with the terminal section 314 and prepare a large number of dark spot inspection apparatus 315 on a fabrication line.

The wiring lines to the pixel circuits P for the test pulse Test_k produced by the dark spot inspection scanning section 313 or the dark spot inspection apparatus 315 may be, for example, row scanning lines or column scanning lines for supplying the test pulse Test_k commonly to all of the pixel circuits P of the same row or the same column. Or, both of the row scanning lines and the column scanning lines may be prepared in order to individually select an organic EL element of an inspection object of each pixel circuit P.

<Pixel Circuit>

Figure 2:
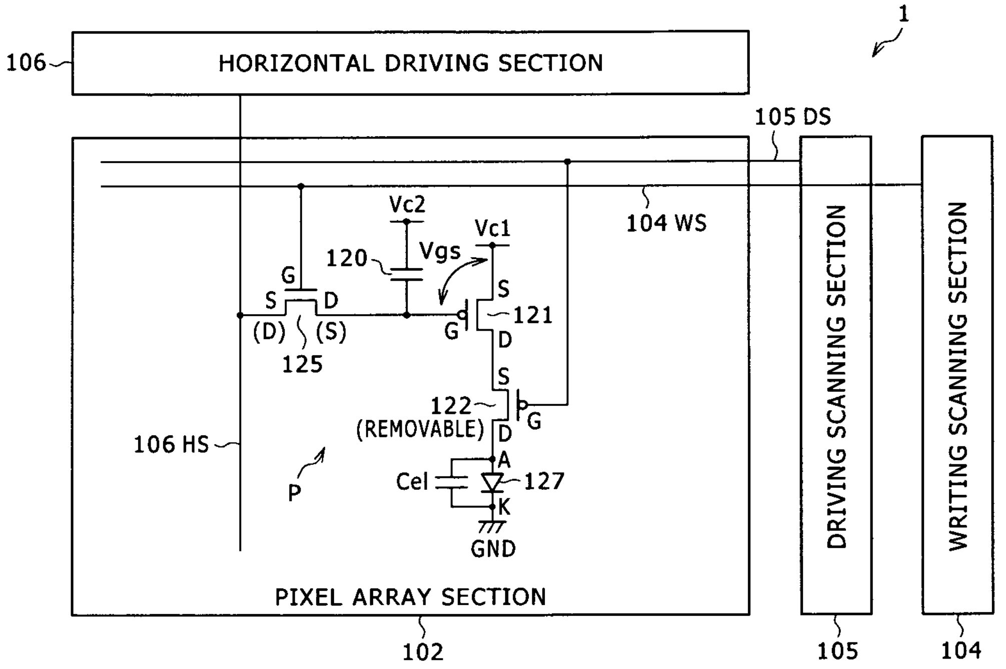
FIGS. 2 and 3 are circuit diagrams showing first and second comparative examples with a pixel circuit used in the active matrix display apparatus of FIGS. 1A and 1B.

FIG. 2 shows a first comparative example with the pixel circuit P of the embodiment used in the organic EL display apparatus 1 described hereinabove with reference to FIGS. 1A and 1B. FIG. 2 also shows the vertical driving section 103 and the horizontal driving section 106 provided at peripheral portions of the pixel circuit P on the substrate 101 of the display panel section 100.

Figure 3:
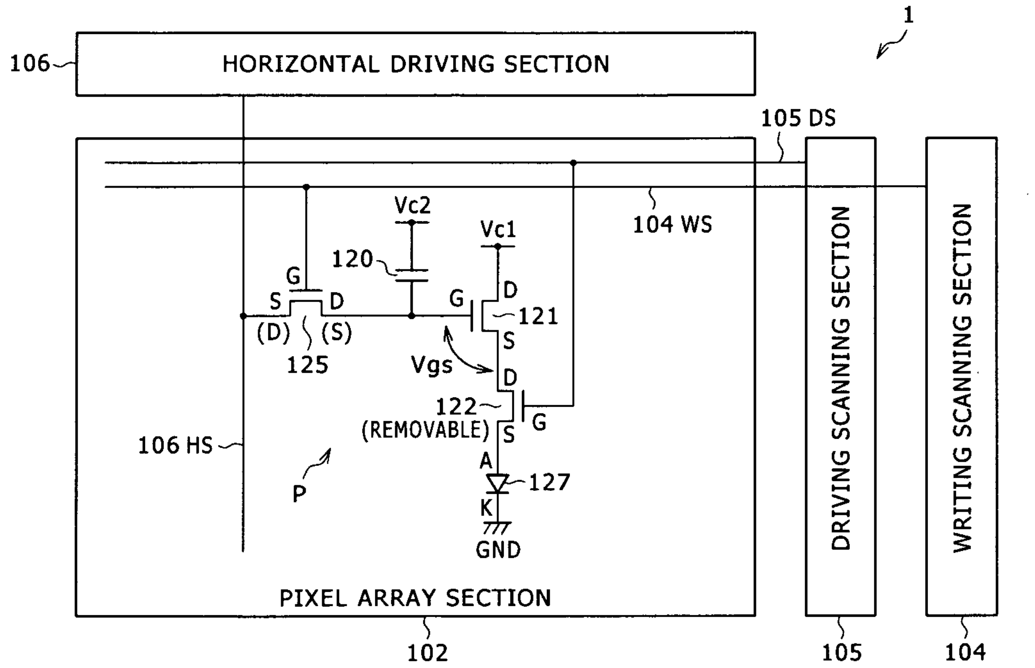

FIG. 3 shows a second comparative example with the pixel circuit P of the embodiment. FIG. 3 also shows the vertical driving section 103 and the horizontal driving section 106 provided at peripheral portions of the pixel circuit P on the substrate 101 of the display panel section 100.

Figure 4A:
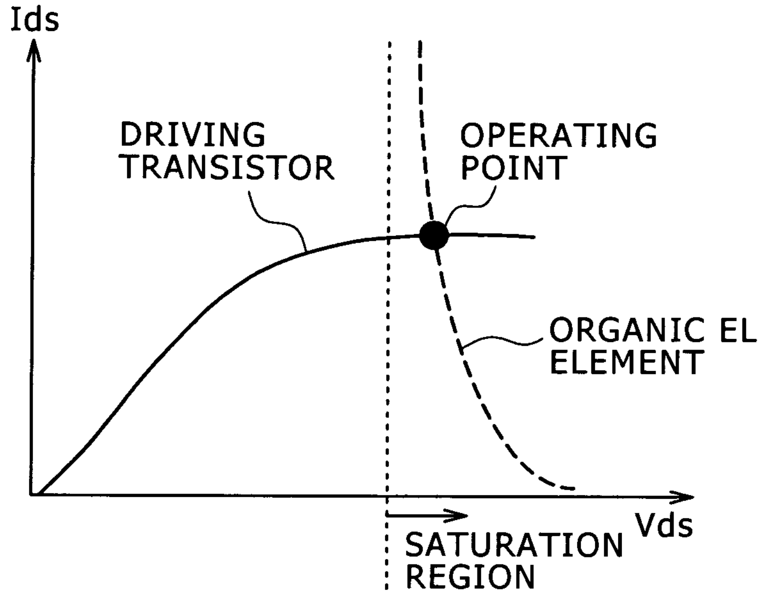
FIG. 4A is a graph illustrating an operating point of an organic EL element and a driving transistor.
Figure 4B:
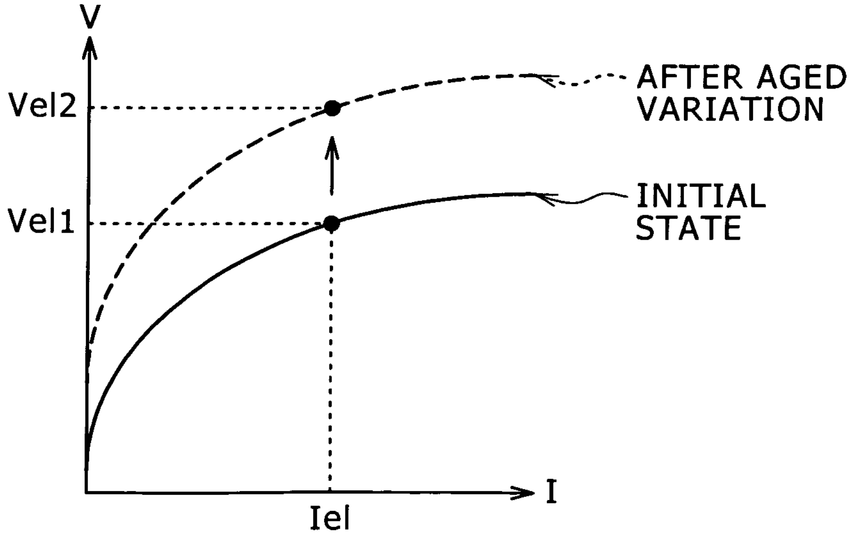
FIGS. 4B to 4D are graphs illustrating an influence of a characteristic dispersion of an organic EL element or a driving transistor on driving current.
Figure 4C:
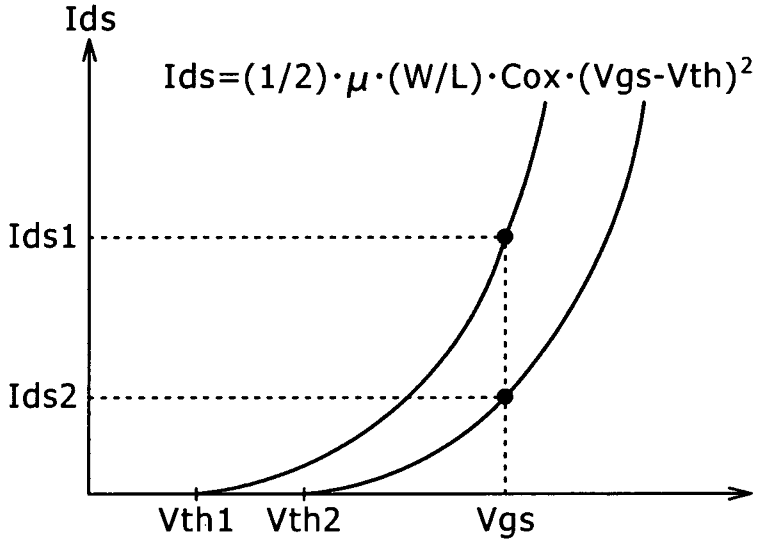
Figure 4D:
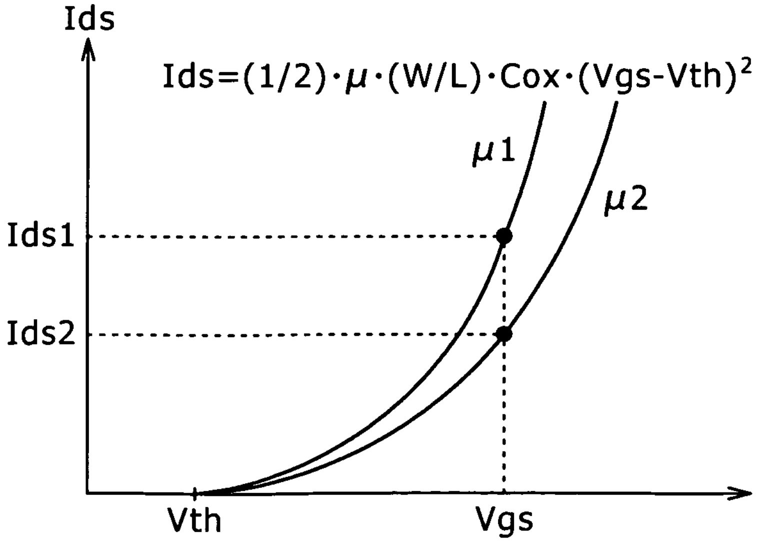

FIG. 4A illustrates an operating point of an organic EL element and a driving transistor. FIGS. 4B to 4D illustrate an influence of a characteristic dispersion of an organic EL element and a driving transistor gave on the driving current Ids.

Figure 5:
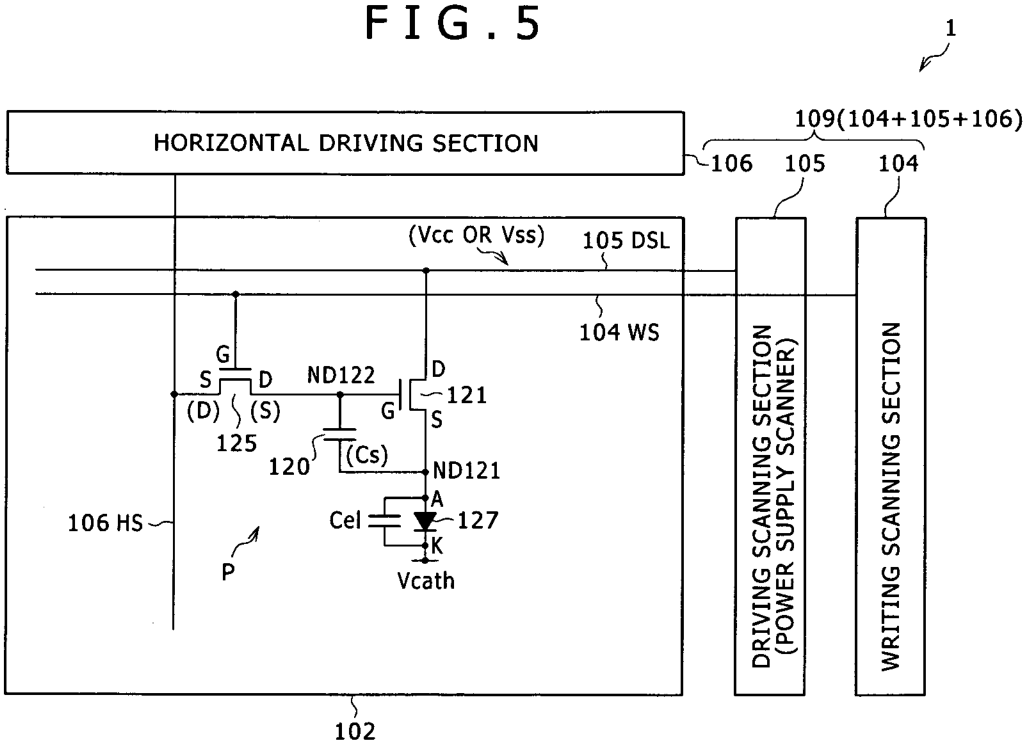
FIG. 5 is a circuit diagram showing an example of a configuration of a pixel circuit of the active matrix display apparatus of FIGS. 1A and 1B.

FIG. 5 shows a third comparative example with the pixel circuit P of the embodiment. The pixel circuit P of the embodiment is based on the pixel circuit P of the present third comparative example. In this regard, the pixel circuit P of the third comparative example may be regarded as a circuit having a circuit structure similar to that of the pixel circuit P of the embodiment. Also FIG. 5 shows the vertical driving section 103 and the horizontal driving section 106 provided at peripheral portions of the pixel circuit P on the substrate 101 of the display panel section 100.

PIXEL CIRCUIT OF A COMPARATIVE EXAMPLE: FIRST EXAMPLE

Referring to FIG. 2, the pixel circuit P of the first comparative example is characterized in that a drive transistor is basically formed from a p-channel thin film field effect transistor (TFT). The pixel circuit P further adopts a 3TR driving configuration which uses two transistors for scanning in addition to the drive transistor.

In particular, the pixel circuit P of the first comparative example includes a p-channel drive transistor 121, a p-channel light emission controlling transistor 122 to which an active-L driving pulse is supplied, and an n-channel sampling transistor 125 to which an active-H driving pulse is supplied. The pixel circuit P further includes an organic EL element 127 which is an example of an electro-optical element or light emitting element which emits light when current flows therethrough, and a storage capacitor 120 which may be referred to also as pixel capacitor. The drive transistor 121 supplies driving current to the organic EL element 127 in accordance with a potential supplied to the gate terminal G which is a control input terminal thereof.

It is to be noted that generally the sampling transistor 125 can be replaced by a p-channel transistor to which an active-L driving pulse is supplied. The light emission controlling transistor 122 can be replaced by an n-channel transistor to which an active-H driving pulse is supplied.

The sampling transistor 125 is a switching transistor provided on the gate terminal G or control input terminal of the drive transistor 121, and also the light emission controlling transistor 122 is a switching transistor.

Since generally the organic EL element 127 has a rectification property, it is represented by a symbol of a diode. It is to be noted that the organic EL element 127 includes parasitic capacitance Cel. In FIG. 2, the parasitic capacitance Cel is shown connected in parallel to the organic EL element 127.

The pixel circuit P is disposed at an intersecting point of scanning lines 104WS and 105DS on the vertical scanning side and an image signal line 106HS which is a scanning line on the horizontal scanning side. The writing scanning line 104WS from the writing scanning section 104 is connected to the gate terminal G of the sampling transistor 125, and the driving scanning line 105DS from the driving scanning section 105 is connected to the gate terminal G of the light emission controlling transistor 122.

The sampling transistor 125 is connected at the source terminal S as a signal input terminal thereof to the image signal line 106HS and at the drain terminal D as a signal output terminal thereof to the gate terminal G of the drive transistor 121. The storage capacitor 120 is interposed between the junction between the drain terminal D of the sampling transistor 125 and the gate terminal G of the drive transistor 121 and a second power supply voltage Vc2 which may a positive power supply voltage or may be equal to a first power supply voltage Vc1. As indicated in parentheses, the sampling transistor 125 may be connected reversely in the connection relationship of the source terminal S and the drain terminal D such that it is connected at the drain terminal D as a signal input terminal thereof to the image signal line 106HS and at the source terminal S as a signal output terminal thereof to the gate terminal G of the drive transistor 121.

The drive transistor 121, light emission controlling transistor 122 and organic EL element 127 are connected in order in series between the first power supply voltage Vc1 which may be, for example, a positive power supply voltage and a ground potential GND which is an example of a reference potential. In particular, the drive transistor 121 is connected at the source terminal S thereof to the first power supply voltage Vc1 and at the drain terminal D thereof to the source terminal S of the light emission controlling transistor 122. The light emission controlling transistor 122 is connected at the drain terminal D thereof to the anode terminal A of the organic EL element 127, and the organic EL element 127 is connected at the cathode terminal K thereof to the ground potential GND.

It is to be noted that, as a simpler configuration, the pixel circuit P shown in FIG. 2 may have a 2TR driving configuration which does not include the light emission controlling transistor 122. In this instance, the organic EL display apparatus 1 may have a configuration which does not include the driving scanning section 105.

In any of the 3TR driving configuration shown in FIG. 2 and the simplified 2TR driving configuration not shown, since the organic EL element 127 is a current light emitting element, a gradation of emitted light is obtained by controlling the amount of current flowing through the organic EL element 127. To this end, the value of current to flow through the organic EL element 127 is controlled by varying the application voltage to the gate terminal G of the drive transistor 121.

In particular, an active-H writing driving pulse WS is first supplied from the writing scanning section 104 to place the writing scanning line 104WS into a selected state, and an image signal Vsig is applied from the horizontal driving section 106 to the image signal line 106HS. Consequently, the n-channel sampling transistor 125 is rendered conducting so that the image signal Vsig is written into the storage capacitor 120.

The signal potential of the image signal Vsig becomes the potential of the gate terminal G of the drive transistor 121. Then, the writing driving pulse WS is rendered inactive, that is, in the present example, is set to the L level, to place the writing scanning line 104WS into a non-selected state. Although the image signal line 106HS and the drive transistor 121 are electrically isolated from each other, the gate-source voltage Vgs of the drive transistor 121 is held stably in principle by the storage capacitor 120.

Then, an active-L scanning driving pulse DS is supplied from the driving scanning section 105 to place the driving scanning line 105DS into a selected state. Consequently, the p-channel light emission controlling transistor 122 is rendered conducting, and driving current flows from the first power supply potential Vc1 toward the ground potential GND through the drive transistor 121, light emission controlling transistor 122 and organic EL element 127.

Then, the scanning driving pulse DS is rendered inactive, in the present example, set to the H level, to place the driving scanning line 105DS into a non-selected state. Consequently, the light emission controlling transistor 122 is placed into an off state, and driving current does not flow any more.

The light emission controlling transistor 122 is inserted in order to control the light emission time, that is, the duty, of the organic EL element 127 within a one-field period. As can be presumed from the description given hereinabove, the pixel circuit P need not essentially include the light emission controlling transistor 122.

The current flowing through the drive transistor 121 and the organic EL element 127 has a value corresponding to the gate-source voltage Vgs of the drive transistor 121, and the organic EL element 127 continues to emit light with luminance corresponding to the value of the current.

The operation of conveying the image signal Vsig applied to the image signal line 106HS through selection of the writing scanning line 104WS to the inside of the pixel circuit P in this manner is hereinafter referred to as “writing.” In this manner, if writing of a signal is carried out once, then the organic EL element 127 continues to emit light with fixed luminance for a period of time until the signal is rewritten subsequently.

In this manner, in the pixel circuit P of the first comparative example, the application voltage to be supplied to the gate terminal G of the drive transistor 121 is varied in response to the input signal, that is, the pixel signal Vsig, to control the value of current to flow through the organic EL element 127. At this time, the source terminal S of the p-channel drive transistor 121 is connected to the first power supply potential Vc1, and the drive transistor 121 normally operates in its saturation region.

PIXEL CIRCUIT OF A COMPARATIVE EXAMPLE: SECOND EXAMPLE

Now, the pixel circuit P of the second comparative example shown in FIG. 3 as a comparative example with the pixel circuit P of the present embodiment in regard to a characteristic is described. The organic EL display apparatus 1 wherein the pixel circuits P of the second comparative example are provided in the pixel array section 102 is hereinafter referred to as organic EL display apparatus 1 of the second comparative example.

The pixel circuits P of the second comparative example and the present embodiment are characterized basically in that a drive transistor is formed from an n-channel thin film field effect transistor.

If not a p-channel transistor but an n-channel transistor can be used as a drive transistor, then it is possible to use an existing amorphous silicon (a-Si) process for transistor fabrication. This makes it possible to reduce the cost for a transistor substrate, and development of the pixel circuit P having such a configuration described above is expected.

The-pixel circuit P of the second comparative example is basically same as the pixel circuit P of the organic EL display apparatus 1 of the present embodiment in that a drive transistor is formed from an n-channel thin film field effect transistor. However, the pixel circuit P of the second comparative example does not include a driving signal fixing circuit for preventing an influence of aged deterioration of the organic EL element 127 on driving current Ids.

In particular, the pixel circuit P of the second comparative example includes a drive transistor 121, a light emission controlling transistor 122 and a sampling transistor 125 all of the n-channel type, and an organic EL element 127 which is an example of an electro-optical element which emits light when current flows therethrough.

The drive transistor 121 is connected at the drain terminal D thereof to the first power supply potential Vc1 and at the source terminal S thereof to the drain terminal D of the light emission controlling transistor 122. The light emission controlling transistor 122 is connected at the source terminal S thereof to the anode terminal A of the organic EL element 127, and the organic EL element 127 is connected at the cathode terminal K thereof to the ground potential GND. In the pixel circuit P, the drive transistor 121 is connected at the drain terminal D thereof to the first power supply potential Vc1 and at the source terminal S thereof to the anode terminal A of the organic EL element 127 in such a manner as to generally form a source follower circuit.

The sampling transistor 125 is connected at the source terminal S thereof to an image signal line HS and at the drain terminal D thereof to the gate terminal G as a control input terminal of the drive transistor 121. The storage capacitor 120 is interposed between the junction between the drain terminal D of the sampling transistor 125 and the gate terminal G of the drive transistor 121 and the second power supply voltage Vc2 which may be, for example, a positive power supply voltage or may be equal to the first power supply voltage Vc1. As indicated by parentheses, the sampling transistor 125 may have a reversed connection scheme in regard to the source terminal S and the drain terminal D thereof.

In the pixel circuit P having the configuration described above, irrespective of whether or not a light emission controlling transistor is provided, when the organic EL element 127 is to be driven, the drain terminal D of the drive transistor 121 is connected to the first power supply voltage Vc1 while the source terminal S of the drive transistor 121 is connected to the anode terminal A of the organic EL element 127 thereby to generally form a source follower circuit.

It is to be noted that, as a simpler configuration, also the pixel circuit P shown in FIG. 3 may have a 2TR driving configuration which does not include the light emission controlling transistor 122. In this instance, the organic EL display apparatus 1 adopts a configuration which does not include the driving scanning section 105.

Now, operation of the pixel circuit P of the second comparative example shown in FIG. 3 is described. It is to be noted that the description here omits description of operation of the light emission controlling transistor 122. First, the potential within an effective period from within the potential of the image signal Vsig supplied from the image signal line HS is sampled, and the organic EL element 127 which is an example of a light emitting element is placed into a light emitting state. The potential of the image signal Vsig mentioned is hereinafter referred to also as image signal line potential, and the potential within en affective period is hereinafter referred to also as signal potential.

In particular, within a time zone within which the image signal line 106HS has the signal potential within an effective period of the image signal Vsig, the potential of the writing driving pulse WS changes over to the high level to place the n-channel sampling transistor 125 into an on state. Consequently, the image signal line potential supplied from the image signal line HS is charged into the storage capacitor 120. Consequently, the potential of the gate terminal G, that is, the gate potential Vg, of the drive transistor 121 begins to rise thereby to begin to cause drain current to flow. As a result, the anode potential of the organic EL element 127 rises and the organic EL element 127 begins to emit light.

Thereafter, when the writing driving pulse WS changes over to a low level, the image signal line potential at the point of time, that is, the potential or signal potential within an effective period from within the potential of the image signal Vsig, is stored into the storage capacitor 120. Consequently, the gate potential Vg of the driving transistor 121 becomes fixed and the emission light luminance is kept fixed till a next frame or field. The period within which the potential of the writing driving line WS remains the high level becomes a sampling period of the image signal Vsig, and a period later than the point of time at which the writing driving line WS changes over to the low level becomes a storage period.

<Iel-Vel Characteristic of the Light Emitting Element and I-V Characteristic of the Driving Transistor>

Generally, the drive transistor 121 is driven within a saturation region within which the driving current Ids is fixed irrespective of the drain-source voltage as seen in FIG. 4A. Therefore, where the current flowing between the drain terminal and the source of the transistor which operates in a saturation region is represented by Ids, the mobility by μ, the channel width or gate width by W, the channel length or gate length by L, the gate capacitance, that is, the gate oxide film per unit area, by Cox, and the threshold voltage of the transistor by Vth, the drive transistor 121 serves as a constant current source having a value represented by the expression (1) given below. As can be seen apparently from the expression (1), in the saturation region, the driving-current Ids of the transistor is controlled by the gate-source voltage Vgs and acts as a constant current source.

$$Ids = \frac{1}{2}\mu\frac{W}{L}Cox(Vgs - Vth)^2 \tag{1}$$

However, generally the I-V characteristic of a light emitting element of the current driven type beginning with an organic EL element deteriorates as time passes as seen from a graph shown in FIG. 4B. In the current-voltage (Iel-Vel) characteristic of the light emitting element of the current driven type represented by an organic EL element illustrated in the graph shown in FIG. 4B, a solid line curve represents the characteristic in an initial state, and a broken line curve represents the characteristic after the aged deterioration.

For example, when the light emission current Iel flows through the organic EL element 127 which is an example of a light emitting element, the anode-cathode voltage Vel is determined uniquely. However, as seen from the graph in FIG. 4B, within a light emitting period, the light emission current Iel which is determined by the drain-source current Ids, which is the driving current Ids, of the drive transistor 121 flows through the anode terminal A of the organic EL element 127, and the potential of the anode terminal A of the organic EL element 127 rises by an amount corresponding to the anode-cathode voltage Vel of the organic EL element 127.

In the pixel circuit P of the first comparative example shown in FIG. 2, the influence of the rise by the anode-cathode voltage Vel of the organic EL element 127 appears on the drain terminal D side of the drive transistor 121. However, since the drive transistor 121 is driven with constant current and operates in the saturation region, the constant current Ids continues to flow through the organic EL element 127, and even if the Iel-Vel characteristic of the organic EL element 127 is deteriorated, the emission light luminance of the organic EL element 127 does not suffer from aged deterioration.

By the configuration of the pixel circuit P which includes the drive transistor 121, light emission controlling transistor 122, storage capacitor 120 and sampling transistor 125 and has the connection scheme shown in FIG. 2, a driving signal fixing circuit which compensates for the variation of the current-voltage characteristic of the organic EL element 127, which is an example of an electro-optical element, to keep the driving current fixed is formed.

In particular, when the pixel circuit P is driven with the image signal Vsig, the source terminal S of the drive transistor 121 is connected to the first power supply potential Vc1 and is designed so that the p-channel drive transistor 121 always operates in the saturation region. Therefore, the drive transistor 121 serves as a constant current source which has a value represented by the expression (1).

Further, in the pixel circuit P of the first comparative example, while the voltage of the drain terminal D of the drive transistor 121 varies together with aged deterioration (FIG. 4B) of the Iel-Vel characteristic of the organic EL element 127, since the gate-source voltage Vgs is kept fixed in principle by a bootstrap function of the storage capacitor 120, the drive transistor 121 operates as a constant current source. As a result, current of a fixed amount flows through the organic EL element 127, and consequently, the organic EL element 127 can emit light with fixed luminance and the emission light luminance does not vary.

Also in the pixel circuit P of the second comparative example, the potential of the source terminal S, that is, the source potential Vs, of the drive transistor 121 depends upon the operating point of the drive transistor 121 and the organic EL element 127, and the drive transistor 121 is driven in its saturation region. Therefore, with the gate-source voltage Vgs corresponding to the source voltage at the operating point, driving current Ids of a current value defined by the expression (1) given hereinabove flows.

However, in a simplified circuit wherein the p-channel drive transistor 121 of the pixel circuit P of the first comparative example is replaced by the n-channel drive transistor 121, that is, in the pixel circuit P of the second comparative example, the source terminal S of the drive transistor 121 is connected to the organic EL element 127 side. As a result, the operating point of the drive transistor 121 varies because the anode-cathode voltage Vel with respect to the same light emission current Iel varies from Vel1 to Vel2 because of the Iel-Vel characteristic of the organic EL element 127 which suffers from aged deterioration as described hereinabove with reference to the curve shown in FIG. 4B. Consequently, even if the same gate potential Vg is applied, the source potential Vs of the drive transistor 121 varies. Consequently, the gate-source voltage Vgs of the drive transistor 121 varies.

As apparent from the characteristic expression (1), if the gate-source voltage Vgs fluctuates, then the driving current Ids fluctuates even if the gate potential Vg is fixed, and consequently, the value of current flowing through the organic EL element 127, that is, the light emission current Iel, fluctuates, resulting in fluctuation of the emission light luminance.

In this manner, in the pixel circuit P of the second comparative example, the anode potential fluctuation of the organic EL element 127 by aged deterioration of the Iel-Vel characteristic of the organic EL element 127 which is an example of a light emitting element appears as a fluctuation of the gate-source voltage Vgs of the driving transistor 121 and gives rise to a fluctuation of the drain current, that is, of the driving current Ids. The fluctuation of the driving current Ids by the reason described appears as a dispersion of the emission light luminance or aged deterioration for each pixel circuit P, and this gives rise to deterioration of the picture quality.

In contrast, although details are hereinafter described, also where the n-type drive transistor 121 is used, a circuit configuration and driving timings which implement a bootstrap function of causing the potential Vg of the gate terminal G of the drive transistor 121 to operate in an interlocking relationship with the fluctuation of the potential Vs of the source terminal S of the drive transistor 121 are adopted. Consequently, even if the anode potential of the organic EL element 127, that is, the source potential of the drive transistor 121, is fluctuated by the aged deterioration of the characteristic of the organic EL element 127, the gate potential Vg is fluctuated so as to cancel the fluctuation of the anode potential. This ensures the uniformity in luminance of the display. By the bootstrap function, the aged deterioration compensation capability of a light emitting element of the current driven type represented by an organic EL element can be improved.

Naturally, the bootstrap function operates also when the source potential Vs of the drive transistor 121 is fluctuated by the fluctuation of the anode-cathode voltage Vel of the organic EL element 127 in the course of rise of the anode-cathode voltage Vel is stabilized after the light emission current Iel begins to flow through the organic EL element 127 at a point of time of starting of light emission.

<Vgs-Ids Characteristic of the Drive Transistor>

While the characteristic of the drive transistor 121 does not particularly matter in the first and second comparative examples, if the characteristic of the drive transistor 121 differs among different pixels, then this has an influence on the driving current Ids flowing through the drive transistor 121. As an example, as can be recognized from the expression (1), where the mobility μ or the threshold voltage Vth disperses among pixels or is deteriorated as time passes, even if the gate-source voltage Vgs is same, a dispersion or aged deterioration occurs with the driving current Ids flowing through the drive transistor 121. Consequently, also the emission light luminance of the organic EL element 127 varies for individual pixels.

For example, a characteristic fluctuation of the threshold voltage Vth or the mobility μ for each pixel circuit P is caused by a dispersion of the fabrication process for the drive transistor 121. Also where the drive transistor 121 is driven in its saturation region, even if the same gate potential is applied to the drive transistor 121, the drain current or driving current Ids is fluctuated by the characteristic fluctuation described above for each pixel circuit P, and this appears as a dispersion of the emission light luminance.

For example, another graph shown in FIG. 4C illustrates the voltage-current (Vgs-Ids) characteristic with attention paid to a threshold value dispersion of the drive transistor 121. In the graph of FIG. 4C, characteristic curves of two drive transistors 121 having different threshold voltages Vth1 and Vth2 are illustrated.

As described hereinabove, the drain current Ids when the drive transistor 121 operates in the saturation region is represented by the characteristic expression (1). As can be seen apparently from the characteristic expression (1), if the threshold voltage Vth fluctuates, then even if the gate-source voltage Vgs is fixed, the driving current Ids fluctuates. In other words, if no countermeasure is taken against the dispersion of the threshold voltage Vth, then the driving current corresponding to the gate-source voltage Vgs when the threshold voltage is Vth1 is Ids1 as seen from the graph of FIG. 4C while the driving current Ids2 corresponding to the same gate-source voltage Vgs when the threshold voltage is Vth2 is different from the driving current Ids1.

Meanwhile, FIG. 4D illustrates a voltage-current (Vgs-Igs) characteristic with attention paid to the mobility dispersion of the drive transistor 121. Characteristic curves regarding two drive transistors 121 having different mobility values μ1 and μ2 are illustrated in FIG. 4D.

As can be seen apparently from the characteristic expression (1), if the mobility μ fluctuates, then even if the gate-source voltage Vgs is fixed, the driving current Ids fluctuates. In other words, if no countermeasure is taken against the dispersion of the mobility μ, then while the driving current corresponding to the gate-source voltage Vgs when the mobility is μ1 is Ids1 as shown in FIG. 4D, the driving current corresponding to the gate-source voltage Vgs same as that when the mobility is μ2 is Ids2 and different from Ids1.

As shown in FIGS. 4C and 4D, if a great difference in the Vin–Ids characteristic is caused by the difference of the threshold voltage Vth or the mobility μ, then even if the same signal amplitude Vin is applied, the driving current Ids and hence the emission light luminance differ and uniformity of the screen luminance cannot be obtained.

<Concept of the Threshold Value Correction and the Mobility Correction>

In contrast, if the driving timings are set so as to implement a threshold value correction function and a mobility correction function (details are hereinafter described), then the influence of such fluctuations can be suppressed and uniformity of the screen luminance can be assured.

In the threshold value correction operation and the mobility correction operation in the present embodiment, although details are hereinafter described, if it is assumed that the write gain is 1 which is an ideal value, then if the gate-source voltage Vgs upon light emission is set so as to satisfy "Vin+Vth−ΔV," then the driving current Ids is prevented from relying upon the dispersion or the variation of the threshold voltage Vth and from relying upon the dispersion or the variation of the mobility μ. As a result, even if the threshold voltage Vth or the mobility μ is fluctuated by the fabrication process or the aged deterioration, the driving current Ids does not fluctuate and also the emission light luminance of the organic EL element 127 does not fluctuate.

Upon mobility correction, negative feedback is applied such that, for the high mobility μ1, a mobility correction parameter ΔV1 is set to a high value, but for the low mobility μ2, also another mobility correction parameter ΔV2 is set to a low value. Therefore, the mobility correction parameter ΔV is hereinafter referred to also as negative feedback amount ΔV.

PIXEL CIRCUIT OF A COMPARATIVE EXAMPLE: THIRD EXAMPLE

A pixel circuit P of a third comparative example shown in FIG. 5 on which the pixel circuit P of the organic EL display apparatus 1 of the present embodiment is based incorporates a circuit, that is, a bootstrap circuit, which prevents driving current fluctuation by aged deterioration of the organic EL element 127 in the pixel circuit P of the second comparative example described hereinabove with reference to FIG. 3 and adopts a driving method which prevents driving current fluctuation by a characteristic fluctuation such as a threshold voltage fluctuation or a mobility fluctuation of the drive transistor 121. The organic EL display apparatus 1 wherein the pixel circuits P of the third comparative example are provided in the pixel array section 102 is hereinafter referred to as organic EL display apparatus 1 of the third comparative example.

The pixel circuit P of the third comparative example uses the n-channel drive transistor 121 similarly to the pixel circuit P of the second comparative example. The pixel circuit P of the third comparative example is characterized in that it additionally includes a circuit for suppressing the fluctuation of the driving current Ids to the organic EL element by aged deterioration of the organic EL element, that is, a driving signal fixing circuit which compensates for the fluctuation of the current-voltage characteristic of the organic EL element which is an example of an electro-optical element to keep the driving current Ids fixed. Further, the pixel circuit P of the third comparative example is characterized in that it has a function of fixing the driving current even where the current-voltage characteristic of the organic EL element suffers from aged deterioration.

In particular, the pixel circuit P is characterized in that it adopts a 2TR driving configuration which uses one switching transistor for scanning, that is, the sampling transistor 125, in addition to the drive transistor 121. The pixel circuit P is further characterized in that it prevents the influence of aged deterioration of the organic EL element 127 or a characteristic fluctuation such as, for example, a dispersion or a fluctuation of the threshold voltage or the mobility upon the driving current Ids by setting of the power supply driving pulse DSL for controlling the switching transistors and the on/off timings of the writing driving pulse WS.

Since the pixel circuit P has the 2TR driving configuration and uses a comparatively small number of elements and wiring lines, a high definition can be anticipated. In addition, since the image signal Vsig can be sampled without deterioration, good picture quality can be obtained.

The pixel circuit P of the third comparative example is much different in configuration from the pixel circuit P of the second comparative example described hereinabove with reference to FIG. 3 in that the connection scheme of the storage capacitor 120 is modified such that a bootstrap circuit which is an example of a driving signal fixing circuit is formed as a circuit for preventing driving current fluctuation by aged deterioration of the organic EL element 127. As a method of suppressing the influence of a characteristic fluctuation such as, for example, a dispersion or a fluctuation of the threshold voltage or the mobility of the drive transistor 121, the driving timings of the transistors 121 and 125 are optimized.

In particular, the pixel circuit P of the third comparative example includes the storage capacitor 120, an n-channel drive transistor 121, an n-channel sampling transistor 125 to which an active-H (high) writing driving pulse WS is supplied, and an organic EL element 127 which is an example of an electro-optical element or light emitting element which emits light when current flows therethrough.

The storage capacitor 120 is connected between the gate terminal G (node ND122) and the source terminal S of the drive transistor 121, and the drive transistor 121 is connected at the source terminal S thereof to the anode terminal A of the organic EL element 127. The storage capacitor 120 functions as a bootstrap capacitor. The cathode terminal K of the organic EL element 127 provides a cathode potential Vcath as a reference potential. Preferably, the cathode potential Vcath is connected to a wiring line Vcath, preferably the ground potential GND, which is common to all pixels for supplying the reference voltage similarly as in the second comparative example described hereinabove with reference to FIG. 3.

The drive transistor 121 is connected at the drain terminal D thereof to a power supply line 105DSL from the driving scanning section 105 which functions as a power supply scanner. The power supply line 105DSL is characterized in that it itself has a power supplying capacity to the drive transistor 121.

In particular, the driving scanning section 105 includes a power supply voltage changeover circuit which switchably supplies a first potential Vcc of the high voltage side and a second potential Vss of the low voltage side corresponding to the power supply voltages to the drain terminal D of the drive transistor 121.

The second potential Vss is sufficiently lower than a reference potential Vofs of the image signal Vsig on the image signal line 106HS. The reference potential Vofs is referred to also as offset potential Vofs. In particular, the second potential Vss of the low potential side on the power supply line 105DSL is set so that the gate-source voltage Vgs of the drive transistor 121, that is, the difference between the gate potential Vg and the source potential Vs of the drive transistor 121, may be higher than the threshold voltage Vth of the drive transistor 121. It is to be noted that the offset potential Vofs is utilized in an initialization operation prior to a threshold value correction operation and is used also to precharge the image signal line 106HS in advance.

The sampling transistor 125 is connected at the gate terminal G thereof to the writing scanning line 104WS from the writing scanning section 104, at the drain terminal D thereof to the image signal line 106HS and at the source terminal S thereof to the gate terminal G (node ND122) of the drive transistor 121. To the gate terminal G of the drive transistor 121, the active-H writing driving pulse WS from the writing scanning section 104 is supplied.

The sampling transistor 125 may be connected in a reversed connection scheme with regard to the source terminal S and the drain terminal D. Further, the sampling transistor 125 may be formed from any of a transistor of the depletion type and a transistor of the enhancement type.

OPERATION OF THE PIXEL CIRCUIT OF THE THIRD COMPARATIVE EXAMPLE

Figure 6A:
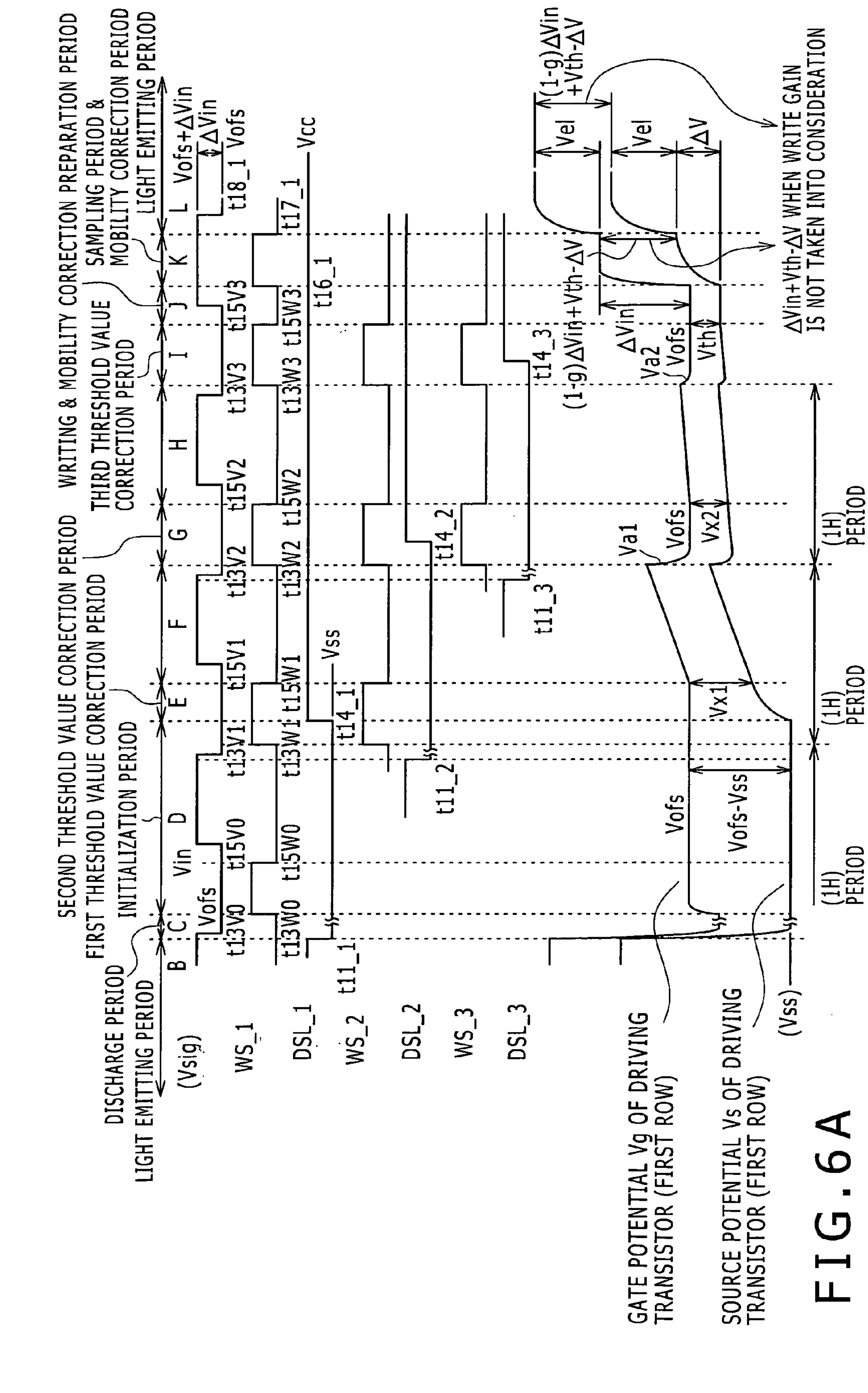
FIG. 6A is a timing chart illustrating a basic example of driving timings of the pixel circuit shown in FIG. 5.

FIG. 6A illustrates a basic example of driving timings of the third comparative example of the pixel circuit P described hereinabove with reference to FIG. 5. The driving timings are substantially similar to those of the pixel circuit P according to the present embodiment. Meanwhile, FIGS. 6B to 6L illustrate operation states of equivalent circuits within periods B to L of the timing chart of FIG. 6A. FIG. 7A illustrates a variation of the source potential Vs of the drive transistor 121 upon threshold value correction operation of the pixel circuit P, and FIG. 7B illustrates a variation of the source potential Vs of the drive transistor 121 upon mobility correction operation of the pixel circuit P.

In the following description, in order to facilitate description and understandings, unless otherwise specified, it is assumed that the write gain is 1 which is an ideal value and such simple representation as to write or store information of the signal amplitude Vin into or in the storage capacitor 120 or sample information of the signal amplitude Vin is used. Where the write gain is lower than 1, not the magnitude itself of the signal amplitude Vin but information of the signal amplitude Vin multiplied by the corresponding gain is stored into the storage capacitor 120.

Incidentally, the rate of the magnitude of information written into the storage capacitor 120 corresponding to the signal amplitude Vin is referred to as write gain Ginput. Here, the write gain Ginput relates to a charge amount distributed, in a capacitive series circuit of total capacitance C1 including parasitic capacitance disposed in parallel to the storage capacitor 120 in an electric circuit and total capacitance C2 disposed in series to the storage capacitor 120 in an electric circuit, to the total capacitance C1 when the signal amplitude Vin is supplied to the capacitive series circuit. If this is represented by an expression, where $g=C1/(C1+C2)$, the write gain Ginput is given by $Ginput=C2/(C1+C2)=1-C1/(C1+C2)=1-g$. In the following description, any description which involves "g" takes the write gain into consideration.

Further, in order to facilitate description and understandings, unless otherwise specified, it is assumed that the bootstrap gain is 1 which is an ideal value. Incidentally, where the storage capacitor 120 is interposed between the gate and the source of the drive transistor 121, the rising ratio of the gate potential Vg to the rise of the source potential Vs is hereinafter referred to as bootstrap gain or bootstrap operation capacity Gbst. Here, the bootstrap gain Gbst particularly relates to a capacitance value Cs of the storage capacitor 120, a capacitance value Cgs of a parasitic capacitor C121*gs* formed between the gate and the source of the drive transistor 121, a capacitance value Cgd of a parasitic capacitor C121*gd* formed between the gate and the drain of the drive transistor 121, and a capacitance value Cws of a parasitic capacitor C125*gs* formed between the gate and the source of the sampling transistor 125. If this is represented by an expression, then the bootstrap gain Gbst is represented by $Gbst=(Cs+Cgs)/(Cs+Cgs+Cgd+Cws)$.

In FIG. 6A, a potential variation of the writing scanning line 104WS, a potential variation of the power supply line 105DSL and a potential variation of the image signal line 106HS are illustrated on a common time axis. Further, in parallel to the potential variations, also variations of the gate potential Vg and the source potential Vs of the drive transistor 121 for one row, in FIG. 6A, for the first row, are illustrated.

Basically, for each one row of the writing scanning line 104WS or the power supply line 105DSL, similar driving is carried out but in a state delayed by one horizontal scanning period. Timings and signals in FIG. 6A are indicated by those same as the timings and signals for the first row independently of the processing object row. Then, where distinction is required in the description, the processing object row represented by a reference character with "_" is annexed for identification to the timing or the signal.

Further, in the driving timings in the third comparative example, a period which is an ineffective period of the image signal Vsig within which the image signal Vsig has the offset potential Vofs is the front half of one horizontal period, and another period which is an effective period of the image signal Vsig within which the image signal Vsig has the signal potential Vofs+Vin is the latter half of one horizontal period. Further, for each one horizontal period which is composed of the effective period and the ineffective period of the image signal Vsig, a threshold value correction operation is repeated three times. Changeover timings t13V and t15V between the effective period and the ineffective period of the image signal Vsig and changeover timings t13W and t15W between active and inactive states of the writing driving pulse WS are distinguished from each other by annexing, to each timing, a reference character without "_" representing the cycle time number.

While, in the third comparative example, a threshold value correction operation is repeated three times within a process cycle of one horizontal period, the repetitive operations are not necessarily required, but a threshold value correction operation may be executed only once within a process cycle of one horizontal period.

One horizontal period is determined as a process cycle of a threshold value correction operation from the following reason. In particular, for each row, before the sampling transistor 125 samples information of the signal amplitude Vin into the storage capacitor 120, the potential of the power supply line 105DSL is set to the second potential Vss prior to the threshold value correction operation and the gate of the drive transistor is set to the offset potential Vofs, and after an initialization operation of setting the source potential to the second potential Vss is carried out, a threshold value correction operation of rendering the sampling transistor 125 conducting in a state wherein the potential of the power supply line 105DSL is the first potential Vcc within a time zone wherein the image signal line 106HS has the offset potential Vofs so that a voltage corresponding to the threshold voltage Vth of the drive transistor 121 is stored into the storage capacitor 120.

The threshold correction period inevitably becomes shorter than one horizontal period. Accordingly, within the shortened threshold value correction operation period for one time, a case wherein an accurate voltage corresponding to the threshold voltage Vth cannot be sufficiently stored into the storage capacitor 120 may occur from a relationship in magnitude of the capacitance value Cs of the storage capacitor 120 and the second potential Vss or from some other factor. In the third comparative example, the threshold value correction operation is executed by a plural number of times in order to cope with such a case as just described. In particular, a threshold value correction operation is executed by a plural number of times within a plurality of horizontal periods preceding to sampling of information of the signal amplitude Vin, that is, signal writing into the storage capacitor 120, so that a voltage corresponding to the threshold voltage Vth of the drive transistor 121 is stored into the storage capacitor 120 with certainty.

With regard to a certain row (here, the first row), within a light emitting period B of a preceding field prior to timing t11, the writing driving pulse WS is in an inactive-L state and the sampling transistor 125 is in a non-conducting state while the power supply driving pulse DSL has the first potential Vcc which is the high potential power supply voltage side.

Figure 6B:
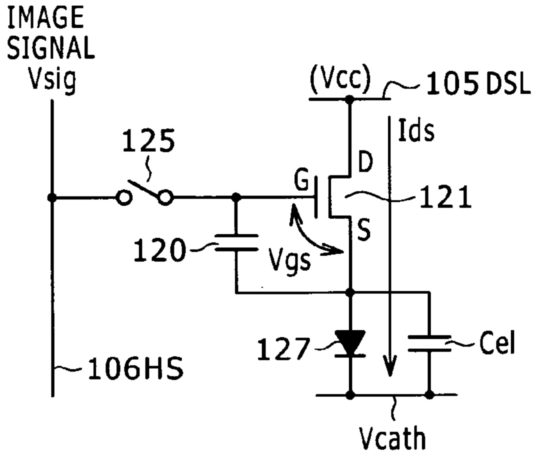
FIG. 6B is a circuit diagram showing an equivalent circuit of the pixel circuit shown in FIG. 5 within a light emitting period illustrated in the timing chart of FIG. 6A and illustrating operation of the equivalent circuit.
Figure 7A:
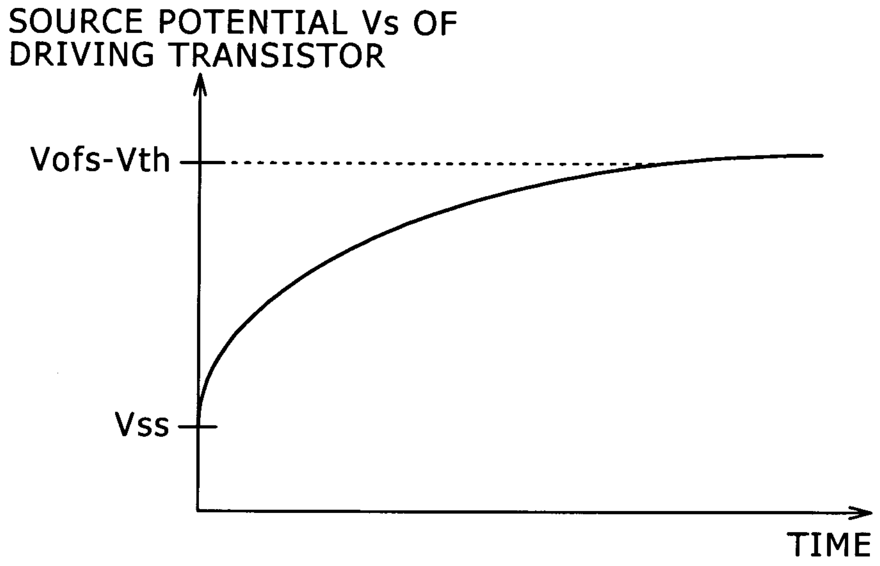
FIG. 7A is a graph illustrating a variation of the source potential of the driving transistor upon threshold value correction operation.
Figure 7B:
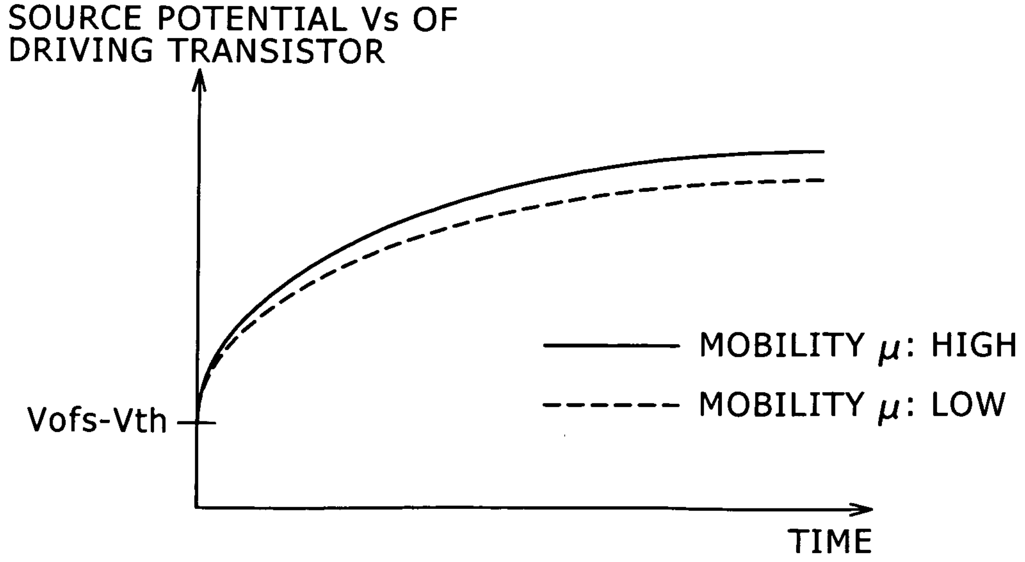
FIG. 7B is a graph illustrating a variation of the source potential of the driving transistor upon mobility correction operation.

Accordingly, as seen in FIG. 6B, driving current Ids is supplied from the drive transistor 121 to the organic EL element 127 in response to a voltage state, which is the gate-source voltage Vgs of the drive transistor 121, stored in the storage capacitor 120 as a result of operation in the preceding field irrespective of the potential of the image signal line 106HS. The driving current Ids flows into the wiring line Vcath, preferably to the ground potential GND, common to all pixels. Consequently, the organic EL element 127 is in a light emitting state. At this time, since the drive transistor 121 is set so as to operate in its saturation region, the driving current Ids flowing to the organic EL element 127 assumes a value indicated by the expression (1) in response to the gate-source voltage Vgs of the drive transistor 121 stored in the storage capacitor 120.

Figure 6C:
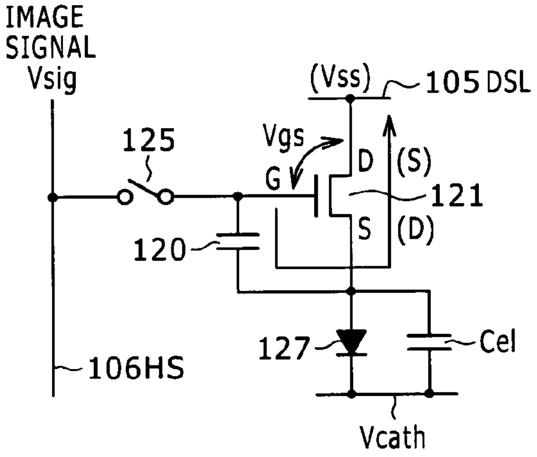
FIG. 6C is a circuit diagram showing an equivalent circuit of the pixel circuit shown in FIG. 5 within a discharging period illustrated in the timing chart of FIG. 6A and illustrating operation of the equivalent circuit.

Thereafter, a new field of line sequential scanning is entered, and the driving scanning section 105 first changes over the power supply driving pulse DSL_1 to be provided to the power supply line 105DSL_1 of the first row from the first potential Vcc of the high potential side to the second potential Vss of the low potential side while the writing driving pulse WS is in the inactive-L state (t11_1: refer to FIG. 6C). This timing t11_1 is within a period within which the image signal Vsig has the signal potential Vofs+Vin of an effective period. However, the changeover of the power supply driving pulse DSL_1 need not necessarily be carried out at this timing t11_1.

Then, the writing scanning section 104 changes over the writing driving pulse WS to the active H level while the potential of the power supply line 105DSL_1 remains the second potential Vss (t13W0). This timing t13W0 is set to a timing t13V0 at which the image signal Vsig within the immediately preceding horizontal period changes over to the offset potential Vofs after it is changed over from the offset potential Vofs in an ineffective period to the signal potential Vofs+Vin in an effective period or to a timing later a little from the timing t13V0. The timing t15W0 at which the writing driving pulse WS is thereafter changed over to the inactive L state is set to same as or a little earlier than the timing t15V0 at which the image signal Vsig changes over from the offset potential Vofs to the signal potential Vofs+Vin.

Preferably, the period t13W to t15W within which the writing driving pulse WS is set to the active H level is set within the time zone t13V to t15V within which the image signal Vsig has the offset potential Vofs in an ineffective period. This is because, if the writing driving pulse WS is set to the active H level when the power supply line 105DSL has the first potential Vcc and the image signal Vsig has the signal potential Vofs+Vin, then a sampling operation of information of the signal amplitude Vin into the storage capacitor 120, that is, a writing operation of the signal potential, is carried out, which gives rise to an obstacle to the threshold value correction operation.

Within a period referred to as discharge period C from timing t11_1 to timing 513W0, the potential of the power supply line 105DSL is discharged to the second potential Vss, and the source potential Vs of the light emission controlling transistor 122 changes to a potential proximate to the second potential Vss. Further, the storage capacitor 120 is connected between the gate terminal G and the source terminal S of the drive transistor 121, and the gate potential Vg varies in an interlocking relationship with the variation of the source potential Vs of the drive transistor 121 by an effect by the storage capacitor 120.

Figure 6D:
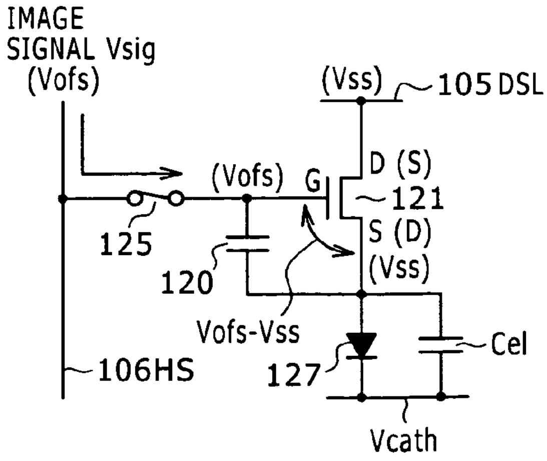
FIG. 6D is a circuit diagram showing an equivalent circuit of the pixel circuit shown in FIG. 5 within an initialization period illustrated in the timing chart of FIG. 6A and illustrating operation of the equivalent circuit.

If the writing driving pulse WS is changed over to the active H level while the power supply driving pulse DSL remains the second potential Vss of the low potential side (t13W0), then the sampling transistor 125 is rendered conducting as seen in FIG. 6D.

At this time, the image signal line 106HS has the offset potential Vofs. Accordingly, the gate potential Vg of the drive transistor 121 becomes the offset potential Vofs of the image signal line 106HS through the sampling transistor 125 rendered conducting. Simultaneously, as the drive transistor 121 is placed into an on state, the source potential Vs of the drive transistor 121 is fixed to the second potential Vss of the low potential side.

In particular, since the potential of the power supply line 105DSL is the second potential Vss which is sufficiently lower than the offset potential Vofs of the image signal line 106HS from the first potential Vcc of the high potential side, the source potential Vs of the drive transistor 121 is initialized or reset to the second potential Vss sufficiently lower than the offset potential Vofs of the image signal 106HS. By initializing the gate potential Vg and the source potential Vs of the drive transistor 121 in this manner, preparations for a threshold value correction operation are completed. Then, the period t13W0 to t14_1 within which the power supply driving pulse DSL is set to the first potential Vcc of the high potential side becomes an initialization period D. It is to be noted that the discharge period C and the initialization period D are referred to collectively also as threshold value correction preparation period within which the gate potential Vg and the source potential Vs of the drive transistor 121 are initialized.

Where the wiring line capacitance of the power supply line 105DSL is high, the potential of the power supply line 105DSL may be changed over from the first potential Vcc to the second potential Vss at a comparatively early timing. The discharge period C and the initialization period D t11_1 to t14_1 are assured sufficiently so as to eliminate an influence of the wiring line capacitance and other pixel parasitic capacitance. Therefore, in the third comparative example, the initialization process is carried out twice. In particular, after the writing driving pulse WS is changed over to the inactive L level (t15W0) while the power supply line 105DSL_1 remains in the second potential Vss state, the image signal Vsig is changed over to the signal potential Vofs+Vin (t15V0). Further, the image signal Vsig is changed over to the offset potential Vofs (t13V1), and then the writing driving pulse WS is changed over to the active H level (t13W1).

Within the discharge period C, when the second potential Vss is lower than the sum of the threshold voltage VthEL and the cathode potential Vcath of the organic EL element 127, that is, if "Vss<VthEL+Vcath" is satisfied, then the organic EL element 127 turns off to stop emission of light. Further, the source terminal and the drain terminal of the drive transistor 121 are reversed in fact such that the power supply line 105DSL becomes the source side of the drive transistor 121 and the anode terminal A of the organic EL element 127 is charged to the second potential Vss (refer to FIG. 6C).

Further, within the initialization period D, the gate-source voltage Vgs of the drive transistor 121 assumes the value of "Vofs−Vss" (refer to FIG. 6D). If this "Vofs−Vss" is not higher than the threshold voltage Vth of the drive transistor 121, then the threshold value correction operation cannot be carried out, and therefore, the offset potential Vofs, second potential Vss and threshold voltage Vth satisfy. "Vofs−Vss>Vth."

Then, while the writing driving pulse WS is kept in the active H state, the power supply driving pulse DSL to be applied to the power supply line 105DSL is changed over to the first potential Vcc (t14_1). The driving scanning section 105 thereafter keeps the potential of the power supply line 105DSL to the first potential Vcc till processing for a next frame or field.

Figure 6E:
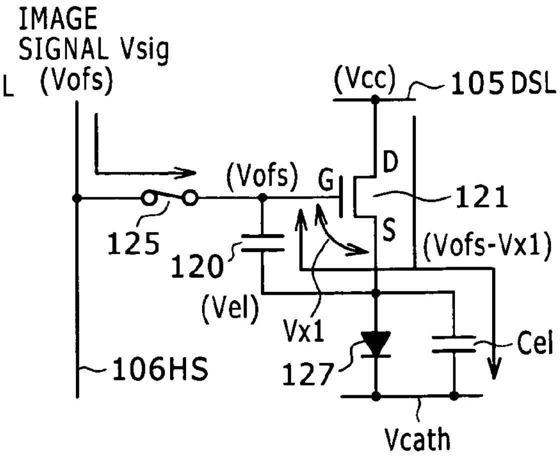
FIG. 6E is a circuit diagram showing an equivalent circuit of the pixel circuit shown in FIG. 5 within a first threshold value correction period illustrated in the timing chart of FIG. 6A and illustrating operation of the equivalent circuit.

After the power supply line 105DSL is changed over to the first potential Vcc (t14_1), the source terminal and the drain terminal of the drive transistor 121 are reversed again such that the power supply line 105DSL becomes the drain side of the drive transistor 121 (refer to FIG. 6E). Consequently, a first time threshold correction period hereinafter referred to as first threshold value correction period E wherein the driving current Ids flows into the storage capacitor 120 to compensate for or cancel the threshold voltage Vth of the drive transistor 121 is entered. This first threshold value correction period E continues to a timing t15W1 at which the writing driving pulse WS is changed over to the inactive L level.

Here, the driving scanning section 105 in the present embodiment sets the timing t14_1 at which the potential of the power supply line 105DSL is changed over from the second potential Vss of the low potential side to the first potential Vcc of the high potential side within the time zone t13V1 to t15V1 within which the image signal line 106HS has the offset potential Vofs in an ineffective period of the image signal Vsig, preferably within a time zone t13W1 to t15W1 within which the writing driving pulse WS is active.

Incidentally, within the first threshold value correction period E later than the timing t14_1, the potential of the power supply line 105DSL changes over from the second potential Vss of the low potential side to the first potential Vcc of the high potential side as seen in FIG. 6E, and the source potential Vs of the drive transistor 121 begins to rise.

In particular, the gate terminal G of the drive transistor 121 is kept at the offset potential Vofs of the image signal Vsig, and the driving current Ids tends to flow until the source potential Vs of the source terminal S of the drive transistor 121 rises to cut off the drive transistor 121. When the drive transistor 121 is cut off, the source potential Vs of the drive transistor 121 becomes "Vofs−Vth."

In particular, since the equivalent circuit of the organic EL element 127 is represented by a parallel circuit of a diode and a parasitic capacitance Cel, as far as "Vel≦Vcath+VthEL" continues, that is, as far as the leak current of the organic EL element 127 is considerably lower than the current flowing through the drive transistor 121, the driving current Ids of the drive transistor 121 is used to charge the storage capacitor 120 and the parasitic capacitance Cel.

As a result, if the driving current Ids flows through the drive transistor 121, then the voltage Vel of the anode terminal A of the organic EL element 127, that is, the potential of a node ND121, rises as time passes as seen in FIG. 7A. Then, when the potential difference between the potential of the node ND121, that is, the source potential Vs, and the voltage of a node ND122, that is, the gate potential Vg, becomes just equal to the threshold voltage Vth, the threshold value correction period is ended. In other words, after a fixed period of time elapses, the gate-source voltage Vgs of the drive transistor 121 assumes the value of the threshold voltage Vth.

Until after the gate-source voltage Vgs becomes equal to the threshold voltage Vth, since the gate-source voltage Vgs of the drive transistor 121 is higher than the threshold voltage Vth, driving current Ids flows as seen in FIG. 6E. At this time, since a reverse bias is applied to the organic EL element 127, the organic EL element 127 does not emit light.

Here, actually a voltage corresponding to the threshold voltage Vth is written into the storage capacitor 120 connected between the gate terminal G and the source terminal S of the drive transistor 121. However, the first threshold value correction period E ranges from the timing t13W1 at which the writing driving pulse WS is changed to the active H level, more particularly, from the time point t14 at which the power supply driving pulse DSL is subsequently returned to the first potential Vcc, to the timing t15W1 at which the writing driving pulse WS is returned to the inactive L level. If this period is not assured sufficiently, then the writing described above comes to an end before then.

In particular, the writing ends when the gate-source voltage Vgs becomes Vx1 higher than the threshold voltage Vth, that is, when the source potential Vs of the driving transistor 121 changes from the second potential Vss of the low potential side to "Vofs−Vx1." Therefore, at the point t15W1 of time at which the first threshold value correction period E is completed, the voltage Vx1 is written in the storage capacitor 120.

Figure 6F:
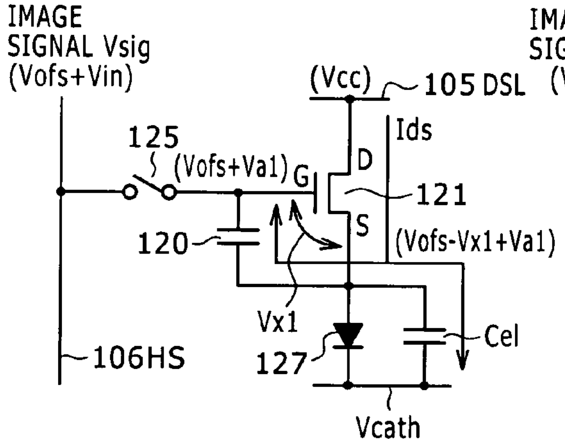
FIG. 6F is a circuit diagram showing an equivalent circuit of the pixel circuit shown in FIG. 5 within a different row writing period illustrated in the timing chart of FIG. 6A and illustrating operation of the equivalent circuit.

Then, within the latter half of the one horizontal period, the driving scanning section 105 changes over the writing driving pulse WS to the inactive L level (t15W1), and further, the horizontal driving section 106 changes over the potential of the image signal line 106HS from the offset potential Vofs to the signal potential Vofs+Vin (t15V1). Consequently, as seen in FIG. 6F, the potential of the image signal line 106HS changes to the signal potential Vofs+Vkin while the potential of the writing scanning line 104WS, that is, the writing driving pulse WS, changes to the low level.

At this time, the sampling transistor 125 is in a non-conducting or off state, and drain current corresponding to the voltage Vx1 stored in the storage capacitor 120 before then flows to the organic EL element 127. Consequently, the source potential Vs rises a little. Where the rise amount is represented by Va1, the source potential Vs is given by "Vofs−Vx1+Va1." Further, the storage capacitor 120 is connected between the gate terminal G and the source terminal S of the drive transistor 121, and the gate potential Vg varies in an interlocking relationship with a fluctuation of the source potential Vs of the drive transistor 121 by an effect by the storage capacitor 120 until the gate potential Vg becomes "Vofs +Va1."

The period F after the horizontal driving section 106 changes over the potential of the image signal line 106HS from the signal potential Vofs+Vth to the offset potential Vofs (t13V2) after the first threshold value correction period E until the driving scanning section 105 changes over the writing driving pulse WS to the active H level (t13W2) becomes a sampling period of information of the signal amplitude Vin for pixels of another row. The period F is hereinafter referred to as different row writing period. Within the different row writing period F, it is necessary to place the sampling transistors 125 of the processing object row into an off state. The processing within the one horizontal period of 1 H is completed therewith.

When the front half of a next one horizontal period of 1 H is entered, the horizontal driving section 106 changes over the potential of the image signal line 106HS from the signal potential Vofs+Vin to the offset potential Vofs (t13V2), and the driving scanning section 105 changes over the writing driving pulse WS to the active H level (t13W2). Consequently, drain current flows into the storage capacitor 120 to enter a second time threshold correction period within which the threshold voltage Vth of the drive transistor 121 is to be compensated for or canceled. The second time threshold value correction period is hereinafter referred to as second threshold value correction period G. This second threshold value correction period G continues till the timing (t15W2) at which the writing driving pulse WS is placed into the active L level.

Figure 6G:
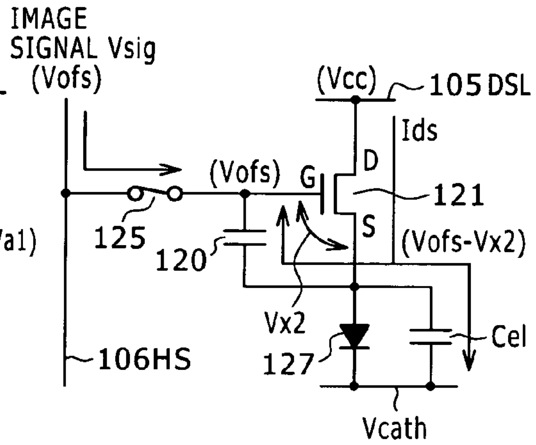
FIG. 6G is a circuit diagram showing an equivalent circuit of the pixel circuit shown in FIG. 5 within a second threshold value correction period illustrated in the timing chart of FIG. 6A and illustrating operation of the equivalent circuit.
Figure 6H:
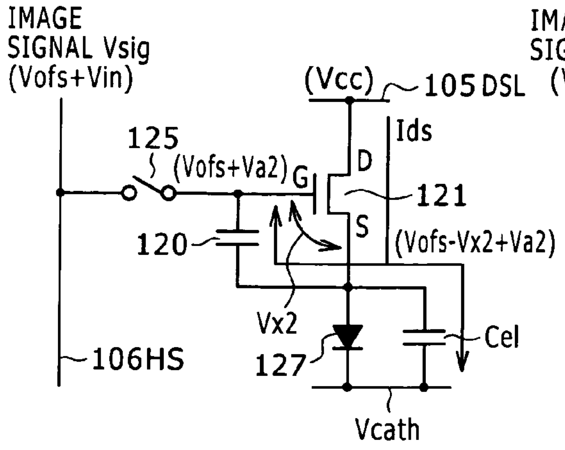
FIG. 6H is a circuit diagram showing an equivalent circuit of the pixel circuit shown in FIG. 5 within another different row writing period illustrated in the timing chart of FIG. 6A and illustrating operation of the equivalent circuit.

Within the second threshold value correction period G, similar operation to that within the first threshold value correction period E is carried out. In particular, as seen in FIG. 6G, the gate terminal G of the drive transistor 121 is kept at the offset potential Vofs of the image signal Vsig, and the gate potential changes over from "Vg=offset potential Vofs+Va1" at this point of time to the offset potential Vofs. Information of the potential fluctuation amount Va1 of the gate terminal G of the drive transistor 121 at this time is inputted to the source terminal S of the drive transistor 121 through the storage capacitor 120 and the parasitic capacitance Cgs between the gate and the source of the drive transistor 121. The input amount to the source terminal S at this time is represented by gVa1, and since the source potential Vs drops by gVa1 from "Vofs−Vx1+Va1" at this point of time, it becomes "Vofs−Vx1+(1−g)Va1."

Here, if the gate-source voltage Vx1−(1−g)Va1 of the drive transistor 121 is equal to or higher than the threshold voltage Vth of the drive transistor 121, then drain current tends to flow until the source potential Vs of the source terminal S of the drive transistor 121 thereafter rises to cut off the drive transistor 121. When the drive transistor 121 is cut off, the source potential Vs of the drive transistor 121 is "Vofs−Vth."

However, the second threshold value correction period G ranges from the timing t13W2 at which the writing driving pulse WS is placed into the active H level to the timing t15W2 at which the writing driving pulse WS returned to the inactive L level, and if this period is not assured sufficiently, the second threshold value correction period G ends before the timing t13W2. This is same as in the first threshold value correction period E, and when the gate-source voltage Vgs becomes a voltage Vx2 which is lower than the voltage Vx1 but higher than the threshold voltage Vth, that is, when the source potential Vs of the driving transistor 121 changes over from "Vofs−Vx1" to "Vofs−Vx2," the second threshold value correction period G ends. Therefore, at the time point t15W2 at which the second threshold value correction period G comes to an end, the voltage Vx2 is written into the storage capacitor 120.

Thereafter, in order to carry out sampling of the signal potential to the pixels in a different row within the rear half of the one horizontal period, the driving scanning section 105 changes over the writing driving pulse WS to the inactive L level (t15W2). Further, the horizontal driving section 106 changes over the potential of the image signal line 106HS from the offset potential Vofs to the signal potential Vofs+Vin (t15V2). Consequently, the potential of the image signal line 106HS changes to the signal potential Vofs+Vin while the potential of the writing scanning line 104WS, that is, the writing driving pulse WS, changes to the low level as seen from FIG. 6H.

At this time, the sampling transistor 125 is in a non-conducting or off state, and drain current corresponding to the voltage Vx2 stored in the storage capacitor 120 flows through the organic EL element 127. Consequently, the source potential Vs rises a little. Where this rise amount is represented by Va2, the source potential Vs becomes "Vofs−Vx2+Va2." Further, the storage capacitor 120 is connected between the gate terminal G and the source terminal S of the drive transistor 121, and the gate potential Vg varies in an interlocking relationship with the variation of the source potential Vs of the drive transistor 121 by an effect by the storage capacitor 120. Consequently, the gate potential Vg becomes "Vofs+Va2."

The period H after the horizontal driving section 106 changes over the potential of the image signal line 106HS from the signal potential Vofs+Vth to the offset potential Vofs (t13V3) after the second threshold value correction period G until the driving scanning section 105 changes over the writing driving pulse WS to the active H level (t13W3) becomes a sampling period of information of the signal amplitude Vin for pixels of a different row. The period H is hereinafter referred to as different row writing period. Within the different row writing period H, it is necessary to place the sampling transistors 125 of the processing object row into an off state. The processing within the second time one horizontal period is completed therewith.

When the front half of a next one horizontal period of 1 H is entered, the horizontal driving section 106 changes over the potential of the image signal line 106HS from the signal potential Vofs+Vin to the offset potential Vofs (t13V3), and the driving scanning section 105 changes over the writing driving pulse WS to the active H level (t13W3). Consequently, drain current flows into the storage capacitor 120 to enter a third time threshold correction period within which the threshold voltage Vth of the drive transistor 121 is to be compensated for or canceled. The third time threshold value correction period is hereinafter referred to as third threshold value correction period I. This third threshold value correction period I continues till the timing t15W3 at which the writing driving pulse WS is placed into the inactive L level.

Figure 6I:
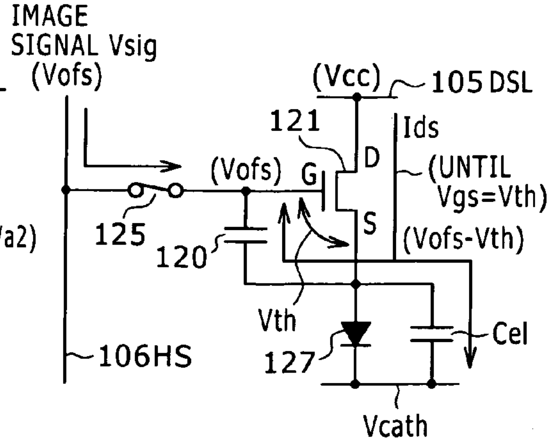
FIG. 6I is a circuit diagram showing an equivalent circuit of the pixel circuit shown in FIG. 5 within a third threshold value correction period illustrated in the timing chart of FIG. 6A and illustrating operation of the equivalent circuit.

Within the third threshold value correction period I, similar operation to that within the first threshold value correction period E or the second threshold value correction period G is carried out. In particular, as seen in FIG. 6I, the gate terminal G of the drive transistor 121 is kept at the offset potential Vofs of the image signal Vsig, and the gate potential changes over from "Vg=offset potential Vofs+Va2" at this point of time to the offset potential Vofs. Information of the potential fluctuation amount Va2 of the gate terminal G of the drive transistor 121 at this time is inputted to the source terminal S of the drive transistor 121 through the storage capacitor 120 and the parasitic capacitor Cgs between the gate and the source of the drive transistor 121. The input amount to the source terminal S at this time is represented by gVa2, and since the source potential Vs drops by gVa2 from "Vofs−Vx2+Va2" at this point of time, it becomes "Vofs−Vx2+(1−g)Va2."

Thereafter, the drain current tends to flow until the source potential Vs of the source terminal S of the drive transistor 121 rises and the drive transistor 121 is cut off. When the gate-source voltage Vgs becomes just equal to the threshold voltage Vth, the drain current is cut off. When the drain current is cut off, the source potential Vs of the drive transistor 121 becomes "Vofs−Vth."

In particular, the gate-source voltage Vgs of the drive transistor 121 assumes the value of the threshold voltage Vth as a result of processing over a plural number of times (in this example, three times) of threshold value correction periods. Here, a voltage corresponding to the threshold voltage Vth is written into the storage capacitor 120 connected between the gate terminal G and the source terminal S of the drive transistor 121.

It is to be noted that, within the three times of threshold value correction periods E, G and I, in order that drain current flows only to the storage capacitor 120 side or the parasitic capacitance Cel side of the organic EL element 127 but does not flow to the cathode potential Vcath side, the cathode potential Vcath for the common ground wiring line cath is set so that the organic EL element 127 is cut off.

Thereafter, the horizontal driving section 106 actually supplies the signal potential Vofs+Vin to the image signal line 106HS so that the period within which the writing driving pulse WS is placed in the active H state is set as a writing period or sampling period of information of the signal amplitude Vin into the storage capacitor 120. This information of the signal amplitude Vin is stored in such a manner as to be cumulatively added to the threshold voltage Vth of the drive transistor 121. In particular, where the write gain Ginput is taken into consideration, the gate terminal G described above takes part.

As a result, since the variation of the threshold voltage Vth of the drive transistor 121 is always canceled, it is considered that threshold value correction is carried out. The gate-source voltage Vgs stored in the storage capacitor 120 through this threshold value correction is Vin +Vth. If the write gain Ginput is considered, the gate-source voltage Vgs is (1−g)Vin+Vth=Vinput−Vin+Vth. Simultaneously, mobility correction is carried out within this sampling period. In particular, at the driving timing, the sampling period serves also as the mobility correction period. The signal amplitude Vin is a voltage corresponding to a gradation.

Figure 6J:
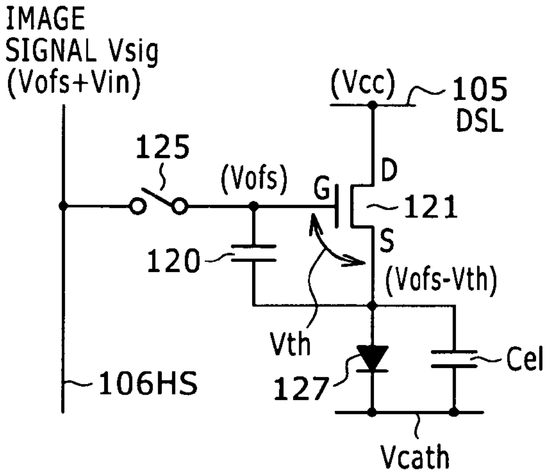
FIG. 6J is a circuit diagram showing an equivalent circuit of the pixel circuit shown in FIG. 5 within a writing and mobility correction preparation period illustrated in the timing chart of FIG. 6A and illustrating operation of the equivalent circuit.

In particular, the writing driving pulse WS is changed over to the inactive L level first (t15W3), and then the horizontal driving section 106 changes over the potential of the image signal line 106HS from the offset potential Vofs to the signal potential Vofs+Vin (t15V3) to complete the last threshold value correction period, in the present example, the third time threshold value correction period. Consequently, the sampling transistor 125 is placed into a non-conducting or off state as seen in FIG. 6J, and preparations for a next sampling operation and mobility correction operation are completed. The period till the timing t16_1 at which the writing driving pulse WS is placed into the active H level subsequently is hereinafter referred to as writing and mobility correction preparation period J.

Then, while the potential of the image signal line 106HS is kept at the signal potential Vofs+Vin, the writing scanning section 104 changes over the writing driving pulse WS to the active H level (t16_1). Then, the horizontal driving section 106 changes over the potential of the image signal line 106HS to the inactive L level (t17_1) at a suitable timing within a period till the timing t18_1 at which the potential of the image signal line 106HS is changed over from the signal potential Vofs+Vin to the offset potential Vofs, that is, at a suitable timing within a time zone within which the image signal line 106HS has the signal potential Vofs+Vin. The period t16_1 to t17_1 within which the writing driving pulse WS is in the active H state is hereinafter referred to as sampling period and mobility correction period K.

Figure 6K:
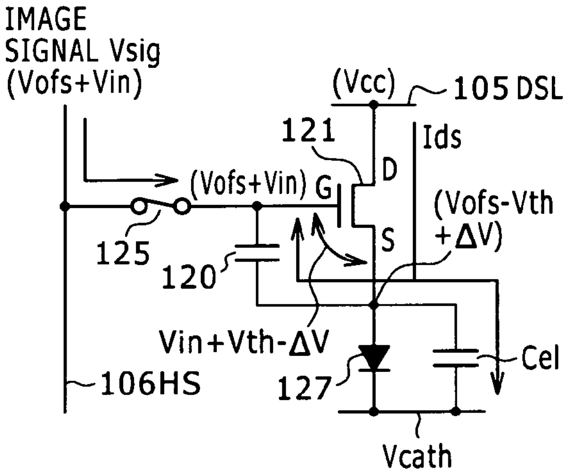
FIG. 6K is a circuit diagram showing an equivalent circuit of the pixel circuit shown in FIG. 5 within a sampling period and mobility correction period illustrated in the timing chart of FIG. 6A and illustrating operation of the equivalent circuit.

Consequently, the sampling transistor 125 is placed into a conducting or on state and the gate potential Vg of the drive transistor 121 becomes the signal potential Vofs+Vin as seen in FIG. 6K. Accordingly, within the sampling period and mobility correction period K, driving current Ids flows through the drive transistor 121 in a state wherein the potential of the gate terminal G of the drive transistor 121 is fixed to the signal potential Vofs+Vin.

Since the sampling transistor 125 is on, although the gate potential Vg of the drive transistor 121 becomes the signal potential Vofs+Vin, since current flows through the drive transistor 121 from the power supply line 105DSL, the gate-source voltage Vgs rises as time passes.

Although description is hereinafter given, when the threshold voltage of the organic EL element 127 is represented by VthEL, where the write gain is taken into consideration, if associated voltages are set so as to satisfy "Vofs−Vth+gVin+ΔV<VthEL+Vcath," then the organic EL element 127 does not emit light because it is placed in a reversely biased state and is in a cutoff state or high impedance state. Thus, the organic EL element 127 exhibits not a diode characteristic but a simple capacitor characteristic. If the source potential Vs at this time does not exceed the sum of the threshold voltage VthEL and the cathode potential Vcath of the organic EL element 127, then the drain current or driving current Ids flowing through the drive transistor 121 is written into the capacitor "C=Cs+Cel" which is the sum of the capacitance value Cs of the storage capacitor 120 and the parasitic capacitance Cel (equivalent capacitor) of the organic EL element 127. Consequently, the source potential Vs of the drive transistor 121 rises. At this time, since the threshold value correction operation of the drive transistor 121 has been completed at this time, the driving current Ids supplied from the drive transistor 121 reflects the mobility μ.

In the timing chart of FIG. 6A, this rise amount is represented by ΔV. When the write gain is taken into consideration, the rise amount, that is, the negative feedback amount ΔV which is a mobility correction parameter, is subtracted from the gate-source voltage "Vgs=(1−g)Vin+Vth" stored in the storage capacitor 120 by threshold value correction and becomes "Vgs=(1−g)Vin+Vth−ΔV." At this time, the source potential Vs of the drive transistor 121 becomes the value "(1−g)Vofs+g(Vofs+Vin)−Vth+ΔV"="Vofs+gVin−Vth+ΔV" obtained by subtracting the voltage "Vgs=(1−g)Vin+Vth−ΔV" stored in the storage capacitor from the gate potential Vg(=Vofs+Vin).

In this manner, in the driving timing scheme of the third comparative example, adjustment of the negative feedback amount or mobility correction parameter ΔV for correcting the mobility u of the signal amplitude Vin of the image signal Vsig is carried out within the sampling period and mobility correction period K (t16 to t17). The negative feedback amount ΔV is ΔV=Ids·t/Cel+Cgs+Cs).

The writing scanning section 104 can adjust the time width of the sampling period and mobility correction period K and can thereby optimize the negative feedback amount of the driving current Ids to the storage capacitor 120. Here, "to optimize the negative feedback amount" signifies to make it possible to carry out mobility correction appropriately at any level within a range from the black level to the white level of the image signal potential.

Since the negative feedback amount ΔV is ΔV=Ids·t/(Cel+Cgs+Cs), the negative feedback amount ΔV of the gate-source voltage Vgs relies upon the takeout period of the driving current Ids, that is, upon the sampling period and mobility correction period K, and as this period increases, the negative feedback amount increases. Thereupon, the mobility correction period t need not necessarily be fixed, but it is sometimes preferable to adjust the mobility correction period t in response to the driving current Ids conversely. For example, where the driving current Ids is high, the mobility correction period t may be set to a comparative short period, but on the contrary where the driving current Ids is low, the mobility correction period t may be set to a comparatively long period.

Further, since the negative feedback amount ΔV is ΔV=Ids·t/(Cel+Cgs+Cs), the negative feedback amount ΔV increases as the driving current Ids which is drain-source current of the drive transistor 121 increases. On the contrary, as the driving current Ids of the drive transistor 121 decreases, the negative feedback amount ΔV decreases. In this manner, the negative feedback amount ΔV depends upon the driving current Ids.

Further, as the signal amplitude Vin increases, the driving current Ids increases and also the absolute value of the negative feedback amount ΔV increases. Accordingly, mobility correction in accordance with the emission light luminance level can be implemented. Thereupon, the sampling period and mobility correction period K need not necessarily be fixed, but it is sometimes preferable to adjust the sampling period and mobility correction period K in accordance with the driving current Ids conversely. For example, where the driving current Ids is high, the mobility correction period t may be set to a comparatively short period, but on the contrary as the driving current Ids decreases, the sampling period and mobility correction period K may be set to a comparatively short period.

For example, a slope is provided to a rising edge of the image signal potential, that is, the potential of the image signal line 106HS or to the transition characteristic of the writing driving pulse WS of the writing scanning line 104WS so that the mobility correction period may automatically follow up the image line signal potential to achieve optimization of the mobility correction period. In particular, the correction period is automatically adjusted such that, when the potential of the image signal line 106HS is high, that is, when the driving current Ids is high, the correction time becomes short, but when the potential of the image signal line 106HS is low, that is, when the driving current Ids is low, the correction time becomes long. According to such adjustment, since an appropriate correction period can be set automatically following up the image signal potential or image signal Vsig, optimum mobility correction can be achieved without depending upon the luminance or picture of the image.

Further, the negative feedback amount ΔV is ΔV=Ids·t/(Cel+Cgs+Cs), and even if the driving current Ids is dispersed by the dispersion of the mobility μ for each pixel circuit P, since the negative feedback amount ΔV differs among different pixel circuits P, the dispersion of the negative feedback amount ΔV for each pixel circuit P can be compensated for. In other words, if it is assumed that the signal amplitude Vin is fixed, then as the mobility u of the drive transistor 121 increases, the driving current Ids increase and the source potential Vs rises more quickly and besides the absolute value of the negative feedback amount ΔV increases as shown in FIG. 7B. As the mobility μ decreases, the driving current Ids decreases and the source potential Vs rises more slowly and besides the absolute value of the negative feedback amount ΔV decreases. In other words, since the negative feedback amount ΔV as the mobility u increases, the gate-source voltage Vgs of the drive transistor 121 decreases reflecting the mobility μ. Then, after a fixed interval of time elapses, the gate-source voltage Vgs of the drive transistor 121 fully becomes a value for correcting the mobility μ, and therefore, a dispersion of the mobility μ for each pixel circuit P can be removed.

In this manner, according to the driving timings of the third comparative example, sampling of the signal amplitude Vin and adjustment of the negative feedback amount ΔV for correcting the dispersion of the mobility μ are carried out simultaneously within the sampling period and mobility correction period K. Naturally, the negative feedback amount ΔV can be optimized by adjusting the time width of the sampling period and mobility correction period K.

Figure 6L:
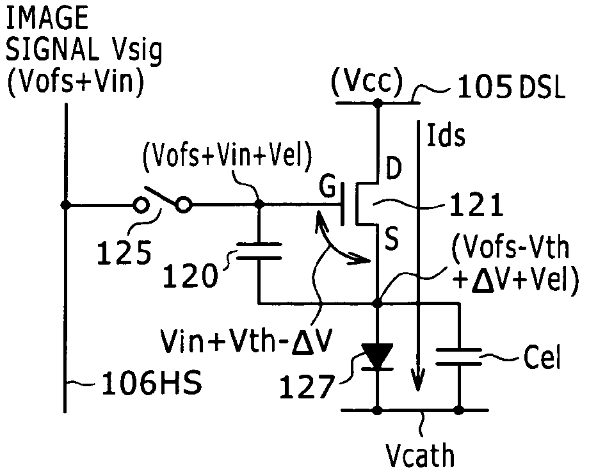
FIG. 6L is a circuit diagram showing an equivalent circuit of the pixel circuit shown in FIG. 5 within another light emitting period illustrated in the timing chart of FIG. 6A and illustrating operation of the equivalent circuit.

Thereafter, the writing scanning section 104 changes over the writing driving pulse WS to the inactive L level in a state wherein the image signal line 106HS has the signal potential Vofs+Vin (t17_1). Consequently, the sampling transistor 125 is placed into a non-conducting or off state as seen in FIG. 6L and a light emitting period L is entered. At a suitable later point of time, the horizontal driving section 106 stops supply of the signal potential Vofs+Vin to the image signal line 106HS and restores the offset potential Vofs (t18_1). Thereafter, the threshold value correction preparation operation, threshold value correction operation, mobility correction operation and light emitting operation are repeated for a next frame or field.

As a result, the gate terminal G of the drive transistor 121 is disconnected from the image signal line 106HS. Since the application of the signal potential Vofs+Vin to the gate terminal G of the drive transistor 121 is canceled, the gate potential Vg of the drive transistor 121 is permitted to rise.

At this time, the driving current Ids flowing through the drive transistor 121 flows to the organic EL element 127, and the anode potential of the organic EL element 127 rises in response to the driving current Ids. The rise amount is represented by Vel. Soon, as the source potential Vs rises, the reversely biased state of the organic EL element 127 is canceled, the organic EL element 127 actually starts emission of light in response to the driving current Ids flowing thereto. The rise amount Vel of the anode potential of the organic EL element 127 at this time is nothing but a rise of the source potential Vs of the drive transistor 121, and the source potential Vs of the drive transistor 121 becomes "(1−g)Vofs+g(Vofs+Vin)−Vth+ΔV+Vel"="Vofs+gVin−Vth+ΔV+Vel."

The relationship between the driving current Ids and the gate-source voltage Vgs can be represented like an expression (2-1) by substituting "Vin−ΔV+Vth" into Vgs of the expression (1) given hereinabove which represents the transistor characteristic. When the write gain is taken into consideration, the relationship can be represented like an expression (2-2) by substituting "(1−g)Vin−ΔΔV+Vth" into Vgs of the expression (1). In the expressions (2-1) and (2-2) (hereinafter referred to collectively as expressions (2)), k=(½)(W/L)Cox.

$$Ids=k\mu(Vgs-Vth)^2=k\mu(Vin-\Delta V)^2 \ldots (2\text{-}1)\ Ids=k\mu(Vgs-Vth)^2=k\mu((1-g)Vin-\Delta V)^2 \ldots (2\text{-}2)\} \quad (2)$$

From the expressions (2), it can be recognized that the term of the threshold voltage Vth is canceled and the driving current Ids supplied to the organic EL element 127 does not rely upon the threshold voltage Vth of the drive transistor 121. The driving current Ids basically depends upon the signal amplitude Vin. In other words, the organic EL element 127 emits light with luminance provided by the signal amplitude Vin.

Thereupon, the information stored in the storage capacitor 120 is in a state corrected with the feedback amount ΔV. This correction amount ΔV acts to cancel the effect of the mobility μ just positioned at the coefficient part of the expression (2). Accordingly, the driving current Ids substantially relies only upon the signal amplitude Vin but does not rely upon the threshold voltage Vth. Therefore, even if the threshold voltage Vth fluctuates in the fabrication process, the driving current Ids between the drain and the source does not fluctuate, and also the emission light luminance of the organic EL element 127 does not fluctuate.

Further, the storage capacitor 120 is connected between the gate terminal G and the source terminal S of the drive transistor 121, and by an effect by the storage capacitor 120, a bootstrap operation is carried out at the beginning of the light emitting period. Consequently, the gate potential Vg and the source potential Vs of the drive transistor 121 rise while the gate-source voltage Vgs of the drive transistor 121 is kept fixed. As the source potential Vs of the drive transistor 121 becomes "Vofs+gVin−Vth+ΔV+Vel," the gate potential Vg becomes "Vofs+Vin+Vel."

At this time, since the gate-source voltage Vgs of the drive transistor 121 is fixed, the drive transistor 121 supplies fixed current, that is, fixed driving current Ids, to the organic EL element 127. As a result, the potential of the anode terminal A of the organic EL element 127, that is, the potential of the drive transistor 121, rises to a voltage with which current of the driving current Ids in the saturation state can flow through the organic EL element 127.

Here, if the light emitting period becomes long, then the I-V characteristic of the organic EL element 127 changes. Therefore, as time passes, also the potential of the drive transistor 121 varies. However, even if the anode voltage of the organic EL element 127 fluctuates by aged deterioration, the gate-source voltage Vgs stored in the storage capacitor 120 is normally kept fixed.

Since the drive transistor 121 operates as a constant current source, even if the I-V characteristic of the organic EL element 127 suffers from aged deterioration and the source potential Vs of the drive transistor 121 varies, since the gate-source voltage Vgs of the drive transistor 121 is kept fixed (≈Vin−ΔV+Vth or ≈(1−g)Vin−ΔV+Vth) by the storage capacitor 120, the current flowing through the organic EL element 127 does not vary. Accordingly, also the emission light luminance of the organic EL element 127 is kept fixed.

An operation for keeping the gate-source voltage of the drive transistor 121 fixed to keep the luminance fixed irrespective of the characteristic fluctuation of the organic EL element 127, that is, an operation by an effect of the storage capacitor 120, is hereinafter referred to as bootstrap operation. By this bootstrap operation, image display which does not suffer from luminance deterioration even if the I-V characteristic of the organic EL element 127 fluctuation as time passes can be achieved.

In particular, in the pixel circuit P of the third comparative example and at the driving timings to drive the pixel circuit P in the third comparative example, a bootstrap circuit which is an example of a driving signal fixing circuit which compensates for a variation of the current-voltage characteristic of the organic EL element 127 which is an example of an electro-optical element to keep the driving current fixed is formed and the bootstrap operation functions. Therefore, even if the I-V characteristic of the organic EL element 127 deteriorates, since the driving current Ids normally continues to flow, the organic EL element 127 continues to emit light with luminance corresponding to the image signal Vsig, and the luminance does not vary.

Further, in the pixel circuit P of the third comparative example and at the driving timings to drive the pixel circuit P in the third comparative example, a threshold value correction circuit which is an example of a driving signal fixing circuit which corrects the threshold voltage Vth of the drive transistor 121 to keep the driving current fixed is configured and the threshold value correction operation functions. Thus, the fixed driving current Ids with which the gate-source voltage Vgs which reflects the threshold voltage Vth of the drive transistor 121 is not influenced by the dispersion of the threshold voltage Vth can be supplied.

Particularly according to the driving timings in the third comparative example, the processing cycle of one time threshold value correction operation is set to one horizontal period and the threshold value correction operation is repeated over a plural number of times and the threshold voltage Vth is stored into the storage capacitor 120 with certainty. Therefore, the difference of the threshold voltage Vth between pixels is removed with certainty, and luminance unevenness arising from the dispersion of the threshold voltage Vth can be suppressed irrespective of the gradation.

In contrast, where the correction of the threshold voltage Vth is insufficient such that the number of times of threshold value correction operation is reduced to once, that is, where the threshold voltage Vth is not stored in the storage capacitor 120, a difference in luminance or in the driving current Ids appears between different pixel circuits P in a low gradation region. Therefore, where the correction of the threshold voltage is insufficient, unevenness of the luminance appears at low gradations, resulting in deterioration of the picture quality.

In addition, according to the driving timings of the third comparative example, a mobility correction circuit which is an example of a driving signal fixing circuit which corrects the mobility μ of the drive transistor 121 in an interlocking relationship with the writing operation of the signal amplitude Vin into the storage capacitor 120 by the sampling transistor 125 to keep the driving current fixed is configured and the mobility correction operation functions. The gate-source voltage Vgs reflects the mobility μ of the drive transistor 121 so that the fixed current Ids which is not influenced by the dispersion of the mobility μ can be supplied.

In short, with the pixel circuit P of the third comparative example, a threshold value correction circuit or a mobility correction circuit is formed automatically by devising the driving timings. Thus, the pixel circuit P functions as a driving signal fixing circuit which compensates for an influence of the threshold voltage Vth and the carrier mobility μ to keep the driving current fixed in order to prevent the influence of a characteristic dispersion of the drive transistor 121, in the present example, a dispersion of the threshold voltage Vth and the mobility u upon the driving current Ids.

Since not only a bootstrap operation but also a threshold value correction operation and a mobility correction operation are executed, the gate-source voltage Vgs kept by the bootstrap operation is adjusted with the voltage corresponding to the threshold voltage Vth and the voltage ΔV for mobility correction. Therefore, the emission light luminance of the drive transistor 121 is not influenced by the dispersion of the threshold voltage Vth or the mobility μ of the drive transistor 121, nor by aged deterioration of the organic EL element 127. An image can be displayed with a stabilized gradation corresponding to the inputted signal amplitude Vin and can be displayed with high picture quality.

Further, since the pixel circuit P of the third comparative example can be formed from a source follower circuit using the n-channel drive transistor 121, even if the organic EL element 27 with the anode-cathode electrode is used as it is, the organic EL element 127 can be driven.

Further, the pixel circuit P can be configured using only n-channel transistors including the driving transistor 121 and the sampling transistor 125 around the driving transistor 121, and also in TFT fabrication, an amorphous silicon (a-Si) process can be used. Consequently, reduction in cost of a TFT substrate can be achieved.

<<Pixel Defect>>

Figure 8A:
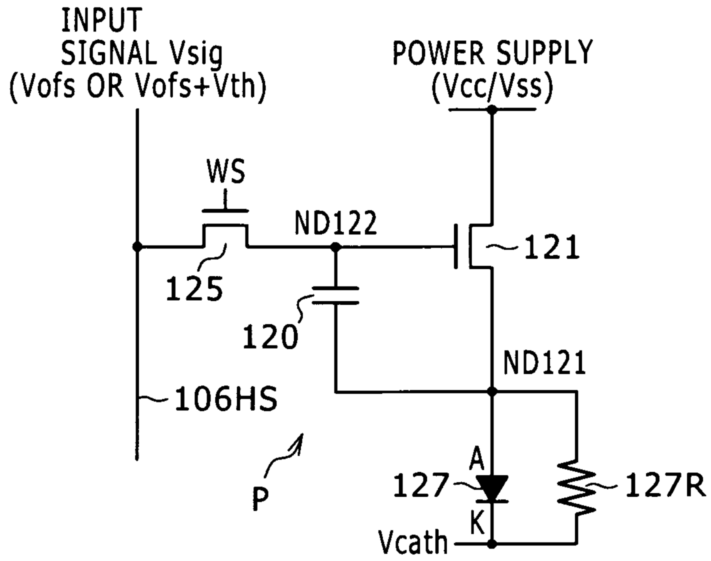
FIG. 8A is a circuit diagram of an equivalent circuit of the organic EL element upon appearance of a dark spot illustrating a spot defect of the pixel circuit.
Figure 8B:
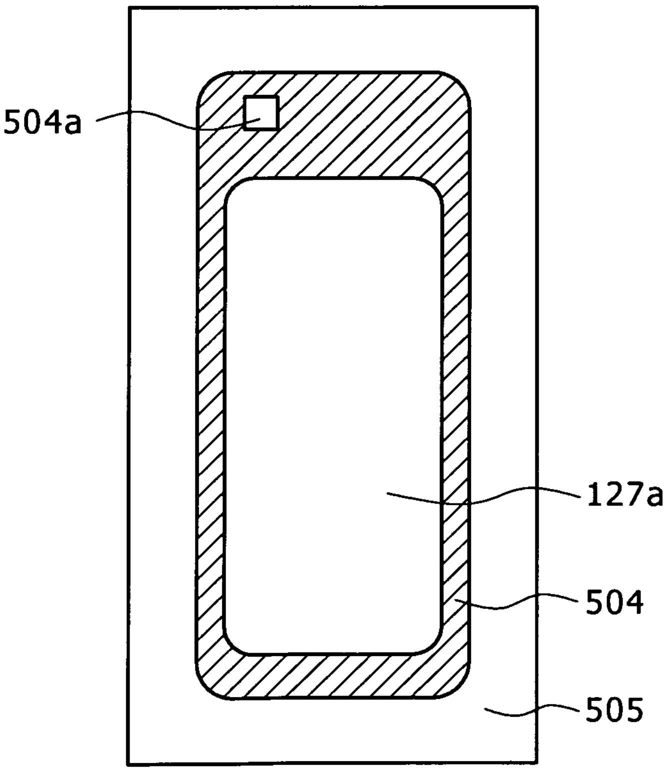
FIG. 8B is a plan view of one pixel illustrating a spot defect of the pixel circuit.

FIGS. 8A and 8B illustrate a spot defect at a pixel circuit P of the pixel array section 102. In particular, FIG. 8A illustrates an equivalent circuit of the organic EL element 127 upon appearance of a dark spot. Meanwhile, FIG. 8B illustrates an arrangement relationship of the organic EL element 127 on a semiconductor substrate. More particularly, FIG. 8B is a plan view of one pixel in a general organic EL display apparatus.

A case wherein the organic EL element 127 of the pixel circuit P shown in FIG. 5 forms a dark spot, that is, a pixel which does not emit light, because of a defect such as dust is studied. In such a case that the organic EL element 127 forms a dark spot, the equivalent circuit of the organic EL element 127 may be considered such that it is in a state wherein a resistance element 127R exists in parallel to a normal organic EL element 127 as shown in FIG. 8A. If the organic EL element 127 becomes a dark spot by short-circuiting, it may be considered that the resistance value is low. This is because the driving current Ids from the drive transistor 121 flows by a greater amount to the resistance element 127R side than the organic EL element 127 to establish a state wherein the organic EL element 127 does not emit light.

Referring to FIG. 8B which shows a plan view of the pixel circuit P of the pixel array section 102 for one pixel, a lower electrode 504, for example, an anode electrode, is disposed on a substrate 101, and an opening (hereinafter referred to as EL opening) 127*a* for the organic EL element 127 is formed above the lower electrode 504. A connection hole 504*a* which may be, for example, a TFT-anode contact is provided on the lower electrode 504 such that the lower electrode 504 is connected to an input/output terminal, in the example shown, the source electrode, of the drive transistor 121 disposed below the lower electrode 504 through the connection hole 504*a*.

The lower electrode 504 is covered on a circumference thereof with an organic layer 505 in such a manner as to define the EL opening 127*a* through which only a portion of the organic EL element 127 in which the lower electrode 504 and an organic layer 506 and an upper electrode 508 not shown which form the organic EL element 127 are laminated is exposed widely so as to form a light emission effective region 127*b*.

Since the EL opening 127*a* of the pixel circuit P is provided one for one pixel, if the organic EL element 127 becomes a dark spot by dust or the like, then the pixel becomes a spot defect, which makes a cause of a drop of the yield.

Therefore, the present embodiment takes a countermeasure for moderating the problem that the organic EL element 127 itself becomes a dark spot by dust or the like and the pixel becomes a spot defect. The base of the countermeasure is to divide one pixel into a plurality of pixels and dispose at least one organic EL element 127 in each of the divisional pixels.

Further, in order to specify a dark spot element when any of the organic EL elements 127 of the divisional pixels is the dark spot, a countermeasure is taken to make it possible to selectively supply driving current Ids from the drive transistor 121 to the organic EL element 127 through a switching transistor which functions as a test switch.

Here, the term "selectively supply driving current Ids" is not limited to selecting the divisional organic EL elements 127 one by one and supplying driving current Ids to the selected organic EL element 127, but such switching transistors may be disposed or connected in any manner only if they can be switched on/off to specify the organic EL element 127 of the dark spot.

Thus, upon fabrication, the pixel circuits P are rendered operative to specify presence or absence of a dark spot element and the position of the element through selective operation of the switching transistors. Then, an energy beam such as a laser beam is irradiated upon the dark spot element to electrically isolate the dark spot element from the normal pixel circuits P. Upon normal operation after then, in order to use the remaining normal organic EL elements 127 to carry out display, the switching transistors are turned on and used. In order to assure sufficient luminance, preferably all switching transistors relating to light emission of the normal organic EL elements 127 are turned on and used.

In particular, one pixel is provided with a plurality of EL openings 127*a* as light emitting portions for different organic EL elements 127 and test switches such that a dark spot position is specified by on/off operations of the test switches and the specified dark spot position is disconnected from the normal pixel circuits P. After the dark spot position is specified, the dark spot position is repaired by a laser beam or the like to prevent the one pixel from fully becoming a dark spot.

Also it is a possible idea to adopt a different configuration wherein, in order to drive the organic EL element 127 belonging to each divisional pixel independently of the other divisional pixels, a drive circuit which includes a storage capacitor 120, a sampling transistor 125 and a drive transistor 121 for the organic EL element 127 is provided for each divisional pixel. However, it is considered that the configuration just described has a drawback that, as the divisional number increases, the number of elements increases. According to the countermeasure of the present embodiment, even if the divisional number increases, only it is necessary to add a test transistor in accordance with the divisional number N, and the drawback of increase of the element number can be eliminated.

By dividing an existing one pixel into a plurality of regions, providing an organic EL element for each of the regions and connecting each divisional organic EL element to the drive transistor 121 through a test transistor which can be controlled between on and off, even if any of the divisional pixels becomes a dark spot, if the dark spot position is electrically disconnected and the organic EL elements of the other normal divisional pixels are used for display, then the effect that the dark spot does not apparently look as a spot defect can be enjoyed. In the following, particular forms are described.

<<Pixel Circuit Ready for the Countermeasure for a Dark Spot Element: First Form>>

FIGS. 9A to 9C show a first form of the countermeasure for a dark spot element according to the present embodiment. In particular, FIG. 9A shows a pixel circuit P of the first form which has the dark spot element countermeasure function, and FIG. 9B illustrates a dark spot inspection step of specifying presence or absence of a dark spot element and the position of the dark spot element. FIG. 9C shows a plan view for one pixel and illustrates an arrangement relationship of organic EL elements 127 on a semiconductor substrate in the first form of the dark spot element countermeasure.

Referring first to FIG. 9A, the pixel circuit P of the first form is configured such that an existing one pixel is divided into two regions of a divisional pixel P_1 and a divisional pixel P_2 and one organic EL element 127 is provided for each of the divisional pixels P_1 and P_2. A drive circuit of a 2TR configuration for driving an organic EL element 127_1 and an organic EL element 127_2 is configured such that a configuration similar to that of the pixel circuit P of the third comparative example described hereinabove is provided commonly to the divisional pixels P_1 and P_2. Consequently, the organic EL element 127_1 of the divisional pixel P_1 and the organic EL element 127_2 of the divisional pixel P_2 are driven by the common drive circuit, particularly by the drive transistor 121.

The organic EL element 127 in one of the divisional pixels P_1 and P_2 in the two regions, that is, in the example shown in FIG. 9A, the organic EL element 127_1 of the divisional pixel P_1, includes, as a test switch, an n-channel switching transistor (hereinafter referred to as test transistor) 128_1 provided between the source terminal of the drive transistor 121 and the anode terminal of the organic EL element 127. A test pulse Test_1 for controlling the test transistor 128_1 between on and off is supplied to the gate terminal of the test transistor 128_1. The test transistor 128_1 is turned off when the test pulse Test_1 has the L level, but is turned on when the test pulse Test_1 has the H level.

A wiring line for the test pulse Test_1 may be formed, for example, as a row scanning line or column scanning line for supplying the test pulse Test_1 commonly to all test transistors 128_1 of the same row or the same column. Or, in order to control the test transistors 128_1 of the pixel circuits P individually, for example, a PMOS transistor may be provided as a scanning transistor on the gate side of each of the test transistors 128_1 while the source terminal side of the test transistor 128_1 is connected to a column scanning line and the gate terminal of the test transistor 128_1 is connected to a scanning line. Where a jth column of an ith row is determined as an object, a test pulse Test_Hj of the active H level is supplied to the jth column scanning line while a test pulse Test_Vi of the active L level is supplied to the ith row scanning line to turn on the scanning transistor ij, and information of the H level of the column scanning line is supplied as a test pulse Test_k to the test transistor 128_1.

Upon normal use, the test transistor 128_1 is normally kept in an on state. In the first configuration example shown in FIG. 1A, the test transistor 128_k should be controlled so as to be turned on by the dark spot inspection scanning section 313. On the other hand, where the display panel section 100 is configured so as to be compatible with a jig like the second configuration example shown in FIG. 1B, pull-up means such as, for example, a pull-up resistor may be provided such that, when the terminal section 314 and the dark spot inspection apparatus 315 are disconnected from each other, all test transistors 128_*k*, in the present example, only the test transistor 128_1, may be turned on.

The pixel circuit P has such a plan configuration as seen in FIG. 9C. Referring to FIG. 9C, one pixel has two EL openings 127*a*_1 and 127*a*_2 corresponding to the divisional pixels P_1 and P_2 of the two divisional regions, respectively. If any of the two organic EL elements 127_1 and 127_2 is not a dark spot, then both of the EL openings 127*a*_1 and 127*a*_2 serve as light emitting portions. Therefore, where the total area of the EL openings 127*a*_1 and 127*a*_2 is set substantially equal to the area of the EL opening 127*a* before the division, the aperture ratio of the display apparatus is not substantially decreased.

<<Inspection of and a Repair Method of a Dark Spot Element: First Form>>

FIGS. 9D to 9G illustrate a method of specifying presence or absence of a dark spot element in the pixel circuit P of the first form and the position of the dark spot element and electrically isolating the dark spot element from the normal pixel circuit P, that is, a fabrication method of the organic EL display apparatus 1, particularly a dark spot inspection step and a dark spot separating step or repair step.

Though not shown in FIGS. 9D to 9G, a dark spot separation apparatus is prepared which electrically isolates an organic EL element 127, that is, a dark spot element, decided as a dark spot element from among the organic EL elements 127 of the divisional elements from those organic EL elements 127 as normal elements which emit light normally. Where a mechanism for isolating, in order to electrically isolate a dark spot element and a normal element from each other, the elements by wiring line blowout is adopted, a mechanism which irradiates an energy beam such as a laser beam is prepared.

On the other hand, in order to cope with such an organic EL display apparatus 1 ready for a jig as described hereinabove with reference to FIG. 1B, a dark spot inspection apparatus 315 is prepared which includes a dark spot inspection scanning section which selectively supplies a test pulse for deciding whether or not the organic EL element 127 is a dark spot which does not emit light to the test transistor 128.

Upon dark spot detection of the organic EL elements 127, the sampling transistors 125 of the inspection object row are turned on (writing driving pulse WS: high) and the potential of the power supply driving pulse DSL to the drive transistors 121 is set to the first potential Vcc. Further, the image signal Vsig of the inspection object column is set to the signal amplitude Vin. In this state, the test transistors 128_1 as test switches are switched on/off to carry out dark spot detection, that is, decision of presence or absence of a dark spot element and the position of the dark spot element.

In particular, first at the dark spot inspection step of the organic EL element 127_2, the test transistor 128_1 is turned off as shown in FIG. 9B or FIG. 9D to decide whether or not the organic EL element 127_2 (FIGS. 9D and 9F) which is not associated with the test transistor 128_1. Where the test transistor 128_1 is turned off, driving current Ids or a driving voltage is not applied to the organic EL element 127_1 (FIGS. 9E, 9G) which is associated with the test transistor 128_1.

Therefore, if the organic EL element 127_2 is normal, then only the organic EL element 127_2 emits light. On the other hand, if the organic EL element 127_2 is a dark spot element due to dust or the like, then the divisional pixel P_2 which has the organic EL element 127_2 does not emit light but becomes a spot defect. This can be confirmed by visual observation or by means of an optical inspection apparatus.

Then, at the dark spot separation step, when the organic EL element 127_2 is a dark spot element, for example, as shown in FIG. 9E, an energy beam such as a laser beam is irradiated upon a wiring line which serves as a current channel of driving current Ids to the organic EL element 127_2, for example, a wiring line on the anode side connected to the drive transistor 121 to blow out the wiring line to electrically isolate the organic EL element 127_2 from the normal pixel circuits P. In particular, the wiring line between the source of the drive transistor 121 and the anode of the organic EL element 127_2 of a dark spot element is blown out as shown in FIG. 9E to carry out repair or mending of the dark spot.

Then at the dark spot inspection step of the organic EL element 127_1, the test transistor 128_1 is turned on as shown in FIG. 9E or FIG. 9F to detect whether or not the organic EL element 127_1 (FIGS. 9E, 9G) associated with the test transistor 128_1 is a dark spot element. If the test transistor 128_1 is turned on, then driving current Ids or a driving voltage is applied to both of the organic EL elements 127_1 and 127_2. If both of the organic EL elements 127_1 and 127_2 are normal, then both of them emit light.

At this time, if the organic EL element 127_2 is electrically isolated as a dark spot element from the pixel circuit P formerly, then if the organic EL element 127_1 is normal, then only it emits light. On the other hand, if the organic EL element 127_1 is a dark spot element due to dust or the like, then the divisional pixel P_1 which includes the organic EL element 127_1 does not emit light but makes a spot defect irrespective of whether or not the other organic EL element 127_2 is normal. If the other organic EL element 127_2 is normal, then neither of the organic EL elements 127_1 and 127_2 emits light.

In particular, when the organic EL element 127_1 is a dark spot element, since the test transistor 128_1 is on, both of the organic EL elements 127_1 and 127_2 make a dark spot. They are specified by confirming them by visual observation or by means of an optical inspection apparatus. When the organic EL element 127_2 is a dark spot element, since it is confirmed in a state wherein the test transistor 128_1 is off and is isolated, if both of the organic EL elements 127_1 and 127_2 make a dark sport, then it may be decided that the organic EL element 127_1 is a dark spot element.

Then, at the dark spot separation step, when the organic EL element 127_1 is a dark spot element, as shown in FIG. 9G as an example, an energy beam such as a laser beam is irradiated upon a wiring line which serves as a current channel of driving current Ids to the organic EL element 127_1, for example, a wiring line of the anode side connected to the drive transistor 121, to blow out the wiring line to electrically isolate the organic EL element 127_1 from the normal pixel circuits P. In particular, repair of the dark spot provided by the organic EL element 127_1 is carried out by cutting the wiring line between the source of the drive transistor 121 and the anode of the organic EL element 127_1 as shown in FIG. 9G.

It is to be noted that, where a configuration allows individual control of the test transistors 128_*k*, upon repair of a dark spot element, in the example illustrated, of the organic EL element 127_1, the test transistor 128_*k* may be turned off in use in place of blowout of a wiring line which serves as a current channel of driving current Ids to the dark spot element, for example, a wiring line connected to the anode.

As described above, one pixel has two openings of the organic EL elements 127, that is, two light emitting portions, and dark spot detection by on/off operation of the test transistor 128 to repair is carried out.

In the mechanism of the first form, since an existing one pixel is divided into two regions of the divisional pixel P_1 and the divisional pixel P_2 such that two light emitting portions of the EL openings 127*a*_1 and 127*a*_2 are provided, the probability that both of the divisional pixels P_1 and P_2 may become dark spot elements is lowered. Consequently, one pixel can be prevented from fully becoming a dark spot, and a drop of the yield by spot defects can be avoided.

Since an organic EL element is a current light emitting type element, luminance thereof increases in proportion to the current. Therefore, also when one organic EL element is damaged and becomes a dark spot element, even if the dark spot is isolated such that light is emitted only from the other normal organic EL element or elements existing in the same pixel, if the total current flowing through the normal organic EL element or elements is equal, then the luminance obtained from the one pixel is equal irrespective of the presence of the dark spot.

<<Pixel Circuit Ready for the Dark Spot Element: Second Form>>

FIG. 10A illustrates a second form of the dark spot element countermeasure of the present embodiment and shows a pixel circuit P of the second form which includes a dark spot element countermeasure function.

According to the dark spot element countermeasure of the second form, the mechanism of the dark spot element countermeasure of the first form wherein an existing one pixel is divided into two regions is expanded to division into N regions. In particular, as shown in FIG. 10A, according to the pixel circuit P of the second form, an existing one pixel is divided into N regions of divisional pixels P_1, . . . , P_N, and one organic EL element 127_1, . . . , 127_N is provided for each of the divisional pixels P_1, . . . , P_N, respectively. A drive circuit of a 2TR configuration for driving each of the organic EL elements 127_1, . . . , 127_N has a configuration which includes one configuration similar to that of the pixel circuit P of the third comparative example is provided commonly to the divisional pixels P_1, . . . , P_N. Consequently, the organic EL elements 127_1, . . . , 127_N are driven by the common drive circuit.

From among the divisional pixels P_1, . . . , P_N in the N regions, each of the organic EL elements 127_1, 127_N−1 except one which is, in FIG. 10A, the organic EL element 127_N of the divisional pixel P_N includes, as a test switch, a test transistor 128_1, . . . , 128_N−1 interposed independently between the source terminal of a drive transistor 121 and the anode electrode of an organic EL element 127_1, . . . , 127_N−1.

The term "independently" signifies that one test transistor 128_*k* is associated with one divisional pixel P_*k*, in the present example, with one organic EL element 127_k. The present form is different in this regard from a fourth form hereinafter described. If a plurality of organic EL elements 127 are provided also in one divisional pixel P_k, then they are collectively connected to a drive transistor 121 through one test transistor 128_*k*.

Upon normal light emission, the test transistors 128_1, . . . , 128_N−1 are normally kept in an on state. Test pulses Test_1, . . . , Test_N−1 for controlling the test transistors 128_1, . . . , 128_N−1 between on and off states are supplied to the gate terminal of the test transistors 128_1, . . . , 128_N−1, respectively. The test transistors 128_1, . . . , 128_N−1 are turned off when the test pulses Test_1, . . . , Test_N−1 have the L level but are turned on when the test pulses Test_1, . . . , Test_N−1 have the H level. Wiring lines for the test pulses Test_1, . . . , Test_N−1 may be row scanning lines, or scanning transistors may be provided so as to control column scanning lines and row scanning lines individually.

Although a plan configuration is omitted, N EL opening portions corresponding to the divisional pixels P_1, . . . , P_N are provided in one pixel. In particular, the pixel circuit P is characterized in that one pixel has N openings or light emitting portions for organic EL elements 127. If any of the N organic EL elements 127_1, . . . , 127_N is not a dark spot element, then since each of the EL openings 127*a*_1, . . . , 127*a*_N serves as a light emitting portion, the aperture ratio of the display apparatus is not substantially decreased by setting the total area of the EL openings 127*a*_1, . . . , 127*a*_N substantially equal to the area of the EL opening 127*a* before the division.

<<Inspection and Repair Method of a Dark Spot Element: Second Form>>

FIG. 10B illustrates a dark spot inspection step of specifying presence or absence of a dark spot element in the pixel circuit P of the second form and the position of the dark spot element.

Also in the pixel circuit P of the second form, upon light emission in normal use, basically all of the test transistors 128_*k* are turned on in use. Further, upon dark spot detection, all of the test transistors 128_1, . . . , 128_N−1 are successively turned on for detection from an on state.

In the case of the pixel circuit P of the second form, since the test transistors 128_*k* are disposed such that supply of driving current or a driving voltage to the organic EL elements 127_*k* can be controlled independently of each other, the order in which the test transistors 128_*k* are turned on may be laid aside. Further, those test transistors 128_*k* associated with the organic EL elements 127_*k* for which inspection is completed may be kept in an on state or may be turned off when the other elements are inspected later. In FIG. 10B, the order in which the test transistors 128_*k* are turned on and the order of the organic EL elements 127_*k* of the inspection object are represented by the order of N−1, . . . , 1 for contrast to the fourth form hereinafter described, that is, for the clarification of differences.

When an organic EL element 127_*k* is a dark spot element, as an example, repair of the dark spot element is carried out by irradiating an energy beam such as a laser beam upon a wiring line serving as a current channel of the driving current Ids to the organic EL element 127_*k*, for example, upon a wiring line on the anode side connected to the drive transistor 121 to blow out the wiring line to electrically isolate the organic EL element 127_*k* from the normal pixel circuits P.

Where the pixel circuit P of the second form is used, since N openings exist in one pixel, the possibility that all openings may become dark spots is low. Further, it can be prevented by repair that one pixel fully becomes a dark spot, and a drop of the yield by spot defects can be avoided. As the number N of openings in one pixel increases, the drop of the yield by dark spots can be avoided by a greater amount.

By providing one pixel with a plurality of openings or light emitting elements of different organic EL elements 127_*k* and a plurality of test transistors 128_*k* as test switches, the position of a dark spot element can be specified by on/off operations of the test switches. Since the position of the dark spot can be specified, by repairing the dark spot element by means of a laser beam or the like in order to electrically isolate the dark spot element from the normal pixel circuits P, the pixel can be prevented from fully becoming a dark spot element and a high yield can be achieved.

<<Pixel Circuit Ready for the Dark Spot Element Countermeasure: Third Form>>

Figure 11A:
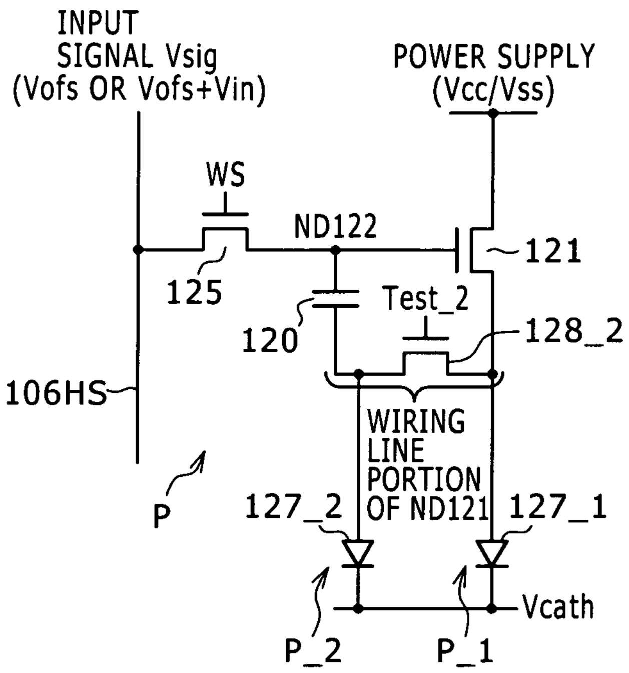
FIG. 11A is a circuit diagram showing a pixel circuit of a third form having the dark spot element countermeasure function.
Figure 11B:
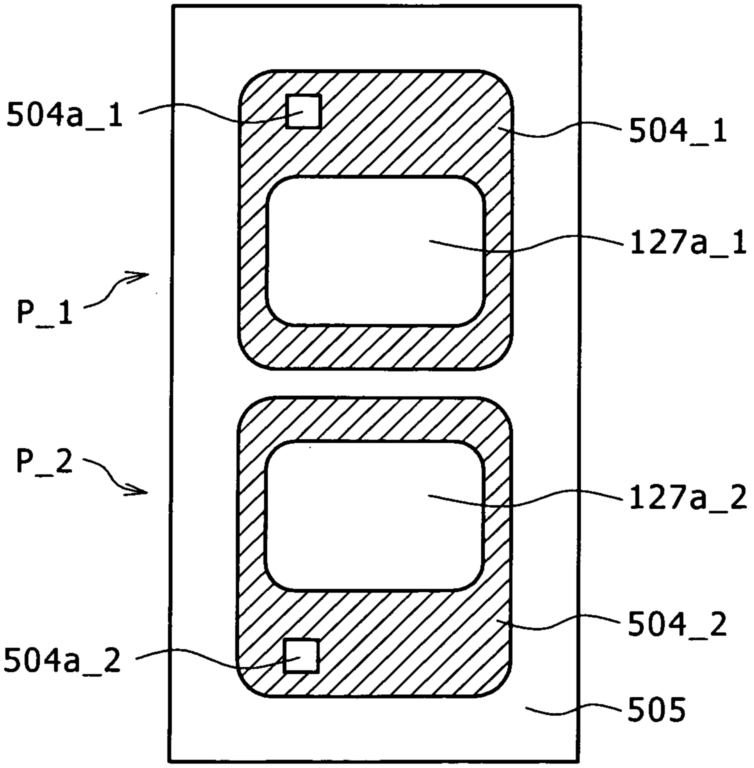
FIG. 11B is a plan view of one pixel illustrating an arrangement relationship of an organic EL element on a semiconductor substrate in the third form of the dark spot element countermeasure function.

FIGS. 11A and 11B illustrate a third form of the dark spot element countermeasure of the present embodiment. In particular, FIG. 11A shows a pixel circuit P of the third form which includes a dark spot element countermeasure function. FIG. 11B is a plan view of one pixel of the third form of the dark spot element countermeasure and illustrates an arrangement relationship of an organic EL element 127 on a semiconductor substrate.

Referring to FIG. 11A, according to the pixel circuit P of the third form, an existing one pixel is divided into two regions of a divisional pixel P_1 and a divisional pixel P_2, and one organic EL element 127 is provided for each of the divisional pixels P_1 and P_2. A drive circuit of a 2TR configuration for driving the organic EL elements 127_1 and 127_2 has a configuration similar to that of the pixel circuit P of the third comparative example described hereinabove. Consequently, the organic EL element 127_1 of the divisional pixel P_1 and the organic EL element 127_2 of the divisional pixel P_2 are driven by the common drive circuit, particularly by the drive transistor 121.

The pixel circuit P of the third form has a similar mechanism to that of the first form in that an existing one pixel is divided into two regions of the divisional pixel P_1 and the divisional pixel P_2. On the other hand, the pixel circuit P of the third form is different from that of the first form in the position at which the test transistor 128 is connected. In particular, the pixel circuit P of the third form is characterized in that the test transistor 128_2 is interposed in a wiring line portion of the node ND121 between the divisional pixels P_1 and P_2 in the two regions. It is to be noted that the lower side junction of the storage capacitor 120 is, for example, the anode of the organic EL element 127_2.

In such a configuration as described above, it may be considered that, as regards one of the organic EL elements 127_1 and 127_2 of the divisional pixels P_1 and P_2, in FIG. 11A, the organic EL element 127_2 of the divisional pixel P_2, the test transistor 128_2 is provided as a test switch between the source terminal of the drive transistor 121 and the anode terminal of the organic EL element 127_2.

A test pulse Test_2 for controlling the test transistor 128_2 between on and off is supplied to the gate terminal of the test transistor 128_2. The test transistor 128_2 is turned off when the test pulse Test_2 has the L level, but is turned on when the test pulse Test_2 has the H level. Upon normal use, the test transistor 128_2 is normally kept in an on state.

A wiring line for the test pulse Test_2 is formed, for example, as a row scanning line for supplying the test pulse Test_2 commonly to all test transistors 128_2 of the same row. Since the test transistors 128_2 are wired to wiring line portions of the nodes ND121, upon normal use wherein the organic EL elements 127_1 are normal, it is necessary to keep the test transistors 128_2 in an on state. Therefore, it may be considered that there is no meaning in adopting a mechanism which makes use of a row scanning line and a column scanning line to individually control the test transistors 128_2.

As a plan configuration, as seen in FIG. 11B, one pixel has two EL openings 127*a*_1 and 127*a*_2 corresponding to the divisional pixels P_1 and P_2 of two regions, respectively. It is the same configuration to that of the first form shown in FIG. 9C.

<<Inspection and Repair Method of a Dark Spot Element: Third Form>>

FIGS. 11C to 11F illustrate a dark spot inspection step of specifying presence or absence of a dark spot element in the pixel circuit P of the third form and the position of the dark spot element and a dark spot separation step or repair step of electrically isolating the specified dark spot element from the normal pixel circuit P.

Upon dark spot detection, the sampling transistor 125 of an inspection object row (writing driving pulse WS: H) is turned on and the power supply driving pulse DSL to the drive transistor 121 is set to the first potential Vcc. Further, the image signal Vsig for an inspection object column is set to the signal amplitude Vin. In this state, the test transistor 128_2 as a test switch is switched on/off to carry out dark spot detection, that is, specification of presence or absence of a dark spot element and the position of the dark spot. In particular, first at the dark spot inspection step of the organic EL element 127_1, the test transistor is turned off as shown in FIG. 11C to decide whether or not the organic EL element 127_1 (FIGS. 11D, 11F) which is not associated with the test transistor is a dark spot element. Where the test transistor is turned off, driving current Ids or a driving voltage is not applied to the organic EL element 127_2 (FIGS. 11C, 11E) which is associated with the test transistor 128_2.

Therefore, only the organic EL element 127_1 emits light if this is normal. On the other hand, if the organic EL element 127_1 is a dark spot element due to dust or the like, then the divisional pixel P_1 which includes the organic EL element 127_1 does not emit light and forms a spot detect. This spot defect can be confirmed by visual observation or by means of an optical inspection apparatus or the like.

Then at the dark spot separation step, if the organic EL element 127_1 is a dark spot element, then an energy beam such as a laser beam is irradiated upon a wiring line which serves as a current channel of the driving current Ids to the organic EL element 127_1, for example, a wiring line on the anode side connected to the drive transistor 121, to blow out the wiring line to electrically isolate the organic EL element 127_1 from the normal pixel circuits P. In particular, a wiring line between the source of the drive transistor 121 and the anode of the organic EL element 127_1 associated with the organic EL element 127_1 which is a dark spot element is cut as shown in FIG. 11D to carry out repair of the dark spot.

Then, at the dark spot inspection step of the organic EL element 127_2, the test transistor 128_2 is turned on as shown in FIG. 11E to detect whether or not the organic EL element 127_2 (FIGS. 11C, 11E) which is associated with the test transistor 128_2 is a dark spot element. If the test transistor 128_2 is turned on, then driving current Ids or a driving voltage is applied to both of the organic EL elements 127_1 and 127_2. If both of the organic EL elements 127_1 and 127_2 are normal, then both of the organic EL elements 127_1 and 127_2 emit light.

At this time, if the organic EL element 127_1 is a dark spot element and is in a state electrically isolated state from the pixel circuits P, then only the organic EL element 127_2 emits light if this is normal. On the other hand, if the organic EL element 127_2 is a dark spot element due to dust or the like, then the divisional pixel P_2 which includes the organic EL element 127_2 does not emit light and forms a spot detect irrespective of whether or not the other organic EL element 127_1 is normal. If the other organic EL element 127_1 is normal, then none of the organic EL elements 127_1 and 127_2 emits light.

In particular, when the organic EL element 127_2 is a dark spot element, since the test transistor 128_2 is on, both of the organic EL elements 127_1 and 127_2 form a dark spot. The dark spot is specified by visual observation or by means of an optical inspection apparatus or the like. If the organic EL element 127_1 is a dark spot element, then since the test transistor 128_2 is confirmed and isolated in a turned off state, when both of the organic EL elements 127_1 and 127_2 form a dark spot, it may be decided that the organic EL element 127_2 is a dark spot element.

Then, at the dark spot separation step, when the organic EL element 127_2 is a dark spot element, an energy beam such as a laser beam is irradiated upon a wiring line which serves as a current channel of the driving current Ids to the organic EL element 127_2, for example, a wiring line on the anode side connected to the drive transistor 121 as shown in FIG. 11F to blow out the wiring line to electrically isolate the organic EL element 127_2 from the normal pixel circuits P. In particular, the wiring line between the source of the drive transistor 121 and the anode of the organic EL element 127_2 with regard to the organic EL element 127_2 which is a dark spot element is cut as shown in FIG. 11F to carry out repair of the dark spot.

As described above, one pixel includes two openings for the organic EL elements 127, that is, two light emitting portions, and the test transistor 128 is turned on and off to carry out operations from dark spot detection to repair. The first and third forms are different from each other in the position at which the test transistor 128 is connected, but are common to each other in that a dark spot of the left and right organic EL elements 127_1 and 127_2 can be detected and repaired by on/off control of the test transistor 128.

Also in the mechanism of the third form, since an existing one pixel is divided into two regions of the divisional pixel P_1 and the divisional pixel P_2 such that two light emitting portions of the EL openings 127*a*_1 and 127*a*_2 are provided, the probability that both of the divisional pixels P_1 and P_2 may become dark spot elements is lowered. Consequently, one pixel can be prevented from fully becoming a dark spot, and a drop of the yield by spot defects can be avoided similarly as in the first form.

Here, where the mechanism of the first form and the mechanism of the third form are compared with each other, it is considered that they have no basically great difference in the aspects of working-effects in regard to the flow of dark spot inspection to repair. However, if a difference has to be pointed out, the third form requires repair without fail whichever one of the two organic EL elements 127 becomes a dark spot element. In contrast, in the first form, if the right side organic EL element 127_1 becomes a dark spot element, then this can be coped with by turning off the test transistor 128_1 as a switch, and there is an advantage that dark spot repair is not necessarily required. However, since the first form needs to be ready for a pulse, increase of the cost for a memory or the like is invited.

Further, in regard to a pixel circuit, where it has the configuration of the third form, since the test transistor 128 is disposed on the wiring line of the node ND121, the on-resistance may matter. However, where the pixel circuit has the configuration of the first form, the on-resistance does not matter. However, where the two forms are contrasted with each other, it is considered that they have no problem relative to each other because the on-resistances of them correspond to one transistor. It is to be noted that, although it seems a possible idea to set the lower side connection point of the storage capacitor 120 in the configuration of the third form not to the anode of the organic EL element 127_2 but to the anode of the organic EL element 127_1, the configuration in this instance is similar to that of the first form in fact.

<<Pixel Circuit Ready for the Dark Spot Element Countermeasure: Fourth Form>>

FIG. 12A illustrates a fourth form of the dark spot element countermeasure of the present embodiment and shows a pixel circuit P of the fourth form which includes a dark spot element countermeasure function.

According to the dark spot element countermeasure of the fourth form, the mechanism of the dark spot element countermeasure of the third form wherein an existing one pixel is divided into two regions is expanded to division into N regions. In particular, as shown in FIG. 12A, according to the pixel circuit P of the fourth form, an existing one pixel is divided into N regions of divisional pixels P_1, . . . , P_N, and one organic EL element 127_1, . . . , 127_N is provided for each of the divisional pixels P_1, . . . , P_N, respectively. A drive circuit of a 2TR configuration for driving each of the organic EL elements 127_1, . . . , 127_N has a configuration similar to that of the pixel circuit P of the third comparative example. Consequently, the organic EL elements 127_1, . . . , 127_N are driven by the common drive circuit.

From among the divisional pixels P_1, . . . , P_N in the N regions, each of the organic EL elements 127_1, . . . , 127_N−1 except one which is, in FIG. 12A, the organic EL element 127_1 of the divisional pixel P_1 includes, as a test switch, a test transistor 128_2, . . . , 128_N provided successively at wiring line portions of the node ND121 each of which is a connection point of a storage capacitor 120 and the output terminal or source terminal side of a drive transistor 121 such that test switches are successively interposed between the source terminal of the drive transistor 121 and the anode terminals of the organic EL elements 127_2, . . . , 127_N, respectively. It is to be noted that the lower side connecting point of the storage capacitor 120 is set, for example, to the anode of the organic EL element 127_2.

Upon normal light emission, the test transistors 128_2, . . . , 128_N are normally kept in an on state. Test pulses Test_2, . . . , Test_N for controlling the test transistors 128_2, . . . , 128_N between on and off states are supplied to the gate terminal of the test transistors 128_2, . . . , 128_N, respectively. The test transistors 128_2, . . . , 128_N are turned off when the test pulses Test_2, . . . , Test_N have the L level but are turned on when the test pulses Test_2, . . . , Test_N have the H level. Wiring lines for the test pulses Test_2, . . . , Test_N may be row scanning lines.

Although a plan configuration is omitted, N EL opening portions corresponding to the divisional pixels P_1, . . . , P_N are provided in one pixel. In particular, the pixel circuit P is characterized in that one pixel has N openings or light emitting portions for organic EL elements 127.

<<Inspection and Repair Method of a Dark Spot Element: Fourth Form>>

FIG. 12B illustrates a dark spot inspection step of specifying presence or absence of a dark spot element in the pixel circuit P of the fourth form and the position of the dark spot element.

Also in the pixel circuit P of the fourth form, upon light emission in normal use, basically all of the test transistors 128_*k* are turned on in use. Further, upon dark spot detection, all of the test transistors 128_1, . . . , 128_N−1 are successively turned on such that the inspection object element may be selected in order from the organic EL element 127_1 to the organic EL element 127_N. In the case of the pixel circuit P of the fourth form, since the test transistors 128_*k* are disposed at a wiring line portion of the node ND121, supply of driving current or a driving voltage to the organic EL elements 127_*k* cannot be controlled independently of each other, the order in which the test transistors 128_*k* are turned on and the order of the organic EL elements 127_*k* of the inspection object are set to 1, 2, . . . , N. In this regard, the fourth form is different from the second form.

As a point of view, first the order of the organic EL elements 127_*k* of the inspection object is set to the order of 1, 2, . . . , N. Upon inspection of the organic EL element 127_1, at least the second test transistor 128_2 is turned off. Thereafter, for the organic EL element 127_*k* of the object of inspection, all of the second to kth test transistors 128_2 to 128_*k* are turned on while at least the k+1th test transistor 128_*k*+1 is turned off. In other words, different from the second form, the test transistors 128_*k* associated with those organic EL elements 127_*k* which are inspected already are left in an on state when any other succeeding organic EL element is inspected.

For example, in a state wherein all of the test transistors 128_1, . . . , 128_N−1 are off, it is decided whether or not the organic EL element 127_1 is a dark spot element, and then the test transistors 128 are successively turned on in the order of 2, 3, . . . , N while a decision of whether or not the organic EL elements 127 is a dark spot element is carried out in the order of 2, 3, . . . , N in an interlocking relationship with the order.

When an organic EL element 127_*k* is a dark spot element, repair of the dark spot element is carried out by irradiating an energy beam such as a laser beam upon a wiring line serving as a current channel of the driving current Ids to the organic EL element 127_*k*, for example, upon a wiring line on the anode side connected to the drive transistor 121 to blow out the wiring line to electrically isolate the organic EL element 127_*k* from the normal pixel circuits P.

Where the pixel circuit P of the fourth form is used, since N openings exist in one pixel, the possibility that all openings may become dark spots is low. Further, it can be prevented by repair that one pixel fully becomes a dark spot, and a drop of the yield by spot defects can be avoided. As the number N of openings in one pixel increases, the drop of the yield by dark spots can be avoided by a greater amount.

Here, where the mechanism of the second form and the mechanism of the fourth form are compared with each other, it is considered that they have no basically great difference in the aspects of working-effects in regard to the flow of dark spot inspection to repair. However, with the configuration of the pixel circuit of the fourth form, since a plurality of test transistors 128 exist on a wiring line of the node ND121, the on resistance of the test transistors 128 may possibly matter and the light emission characteristics may become non-uniform. However, the configuration of the pixel circuit of the second form is advantageous in that the light emission characteristics are uniform. Further, with the configuration of the fourth form, since the on resistance of the wiring line of the node ND121 may possibly manner, the loss of the voltage increases toward the left in the figure and there is the possibility that low-voltage driving may be impossible. However, the configuration of the second form is clear of the problem.

It is to be noted that, although it seems a possible idea to set the lower side connection point of the storage capacitor 120 in the configuration of the fourth form not to the anode of the organic EL element 127_2 but to the anode of the organic EL element 127_1, since the on resistance of the test transistor 128_2 may matter with regard to the organic EL element 127_2, it is considered that there is no significance in actual adoption of the idea.

As a modification, a configuration which applies both of the configurations of the second and fourth forms may be used. It is considered that the modified configuration is not much different from that of the second form or the fourth form in the aspects of working-effects in regard to the flow of dark spot inspection to repair. Meanwhile, as a characteristic in regard to the circuit configuration, the modified configuration has intermediate characteristics of those of the second form and the fourth form, and therefore, although the light emission characteristics are uniformed more than those of the fourth form, the uniformity is not so good as that of the second form.

While description of the embodiment of the present invention is given above, the technical scope of the present invention is not limited to the range of the description of the embodiment. Various alterations and modifications can be made without departing from the subject matter of the present invention. Also such alterations and the modifications are included in the technical scope of the present invention.

Further, the embodiment described above shall not restrict the invention as set forth in claims, and all of the combinations of the characteristics described in the description of the embodiment are not necessary as essential means for the solution of the present invention. Various stages of the invention are included in the embodiment described above, and various inventions can be extracted by a suitable combination of a plurality of ones of the features disclosed in the present application. Even if several features are deleted from all of the features of the embodiment, as far as intended effects are achieved, the configuration from which such several features are deleted may be extracted as an invention.

<Modifications to the Driving Timings>

In the aspect of the driving timings, various modifications are possible while the timing at which the potential of the power supply line 105DSL is changed from the second potential Vss to the first potential Vcc is set to a period of the offset potential Vofs which is an ineffective period of the image signal Vsig.

For example, as a first modification, though not shown, the setting method of the sampling period and mobility correction period K can be modified with regard to the driving timings illustrated in FIG. 6A. In particular, the timing t15V at which the image signal Vsig changes from the offset potential Vofs to the signal potential Vofs+Vin is first shifted to the rear half side of one horizontal period from the diving timing illustrated in FIG. 6A to narrow the signal potential Vofs+Vin.

Further, upon completion of the threshold value correction operation, that is, upon completion of the threshold value correction period 1, first the period until, while the writing driving pulse WS is kept at the active H level, the signal potential Vofs+Vin is supplied from the horizontal driving section 106 to the image signal line 106HS (t15) to set the potential of the writing driving pulse WS to the inactive L level (t17) is determined as a writing period of the signal amplitude Vin into the storage capacitor 120. The information of the signal amplitude Vin is stored in a form cumulatively added to the threshold voltage Vth of the drive transistor 121. As a result, since the variation of the threshold voltage Vth of the drive transistor 121 is always canceled, this is execution of threshold value correction.

By the threshold value correction operation, the gate-source voltage Vgs stored in the storage capacitor 120 becomes "(1−g)Vin+Vth." Simultaneously, mobility correction is executed within the signal wiring period t15 to t17. In particular, the period from timing t15 to timing 17 serves as both of the signal writing period and the mobility correction period.

It is to be noted that, within the period t15 to t17 within which the mobility correction is executed, since the organic EL element 127 actually is in a reversely biased state, it does not emit light. Within this mobility correction period t15 to t17, driving current Ids flows through the drive transistor 121 wherein the potential of the gate terminal G of the drive transistor 121 is fixed to the image signal potential Vsig. Later driving timings are similar to those described hereinabove with reference to FIG. 6A.

The driving sections 104, 105 and 106 can adjust relative phases of the image signal Vsig to be supplied to the image signal line 106HS from the horizontal driving section 106 and the writing driving pulse WS to be supplied from the writing scanning section 104 to optimize the mobility correction period.

However, the period from timing t15V3 to timing t17 becomes the sampling period and mobility correction period K without the presence of the writing and mobility correction preparation period J. Therefore, there is the possibility that the difference in waveform characteristic arising from an influence of distance dependence of the wiring line resistance or the wiring line capacitance of the writing scanning line 104WS and the image signal line 106HS may have an influence on the sampling period and mobility correction period K. Since the sampling potential and the mobility correction time are different between the side of the screen nearer to the writing scanning section 104 and the side of the screen farther to the writing scanning section 104, that is, between left and right portions of the screen, there is the possibility that a luminance difference may appear between the left and the right of the screen and be visually observed as a shading.

Meanwhile, as a second modification, the turning off timing of the power supply, that is, the changeover timing to the second potential Vss side, may be modified. In particular, the turning off timing and the turning on timing of a row can be placed into the same horizontal period.

In the driving timings of the second modification, a power supply switching operation is carried out within a period within which the image signal Vsig has the offset potential Vofs. Further, at this time, the sampling transistor 125 is placed into an on state to fix the gate terminal G of the drive transistor 121 to the offset potential Vofs to establish a low-impedance state. The resisting property against coupling noise arising from a power supply pulse, that is, the power supply driving pulse DSL, is improved thereby.

<Modifications to the Pixel Circuit>

In regard to the pixel circuit, an example wherein driving timings are devised while a 2TR configuration which uses an n-channel transistor as the drive transistor 121 is used is described as a configuration example of a bootstrap circuit or a threshold value and mobility correction circuit which is an example of a driving signal fixing circuit for keeping driving current fixed. However, this is a mere example of a driving signal fixing circuit and driving timings for keeping a driving signal for driving the organic EL element 127 fixed, and other various circuits can be applied as a driving signal fixing circuit for preventing aged deterioration of the organic EL element 127 and an influence of a variation of a characteristic of the n-channel drive transistor 121, for example, a dispersion or a variation of the threshold voltage, mobility and so forth upon the driving current Ids.

For example, since the "duality theory" is satisfied on the circuit theory, modification to the pixel circuit P from this point of view can be applied. In this instance, though not shown, while the pixel circuit P of the 2TR configuration shown in FIG. 5 is formed using the n-channel drive transistor 121, a p-channel driving transistor is used to form the pixel circuit P. In conformity with this, alteration in accordance with the duality theory such as to reverse the relationship in polarity of the signal amplitude Vin of the image signal Vsig or in the magnitude of the power supply voltages is applied.

It is to be noted that, while the modification described applies alteration to the 2TR configuration shown in FIG. 5 in accordance with the "duality theory," the technique for the circuit alteration is not limited to this. A configuration other than the 2TR configuration which includes, in addition to a sampling transistor, which is an example of a switching transistor, and a driving transistor, a different transistor for carrying out control of keeping driving current fixed may be applied. However, in order to implement a display apparatus of a small size for which display of high definition is demanded, it is optimum to use the 2TR configuration to implement the driving signal fixing function.

Here, also with various modifications, by dividing an existing one pixel into a plurality of regions and providing an organic EL element in each of the regions, also in a case wherein one of the divisional pixels becomes a dark spot, if the dark spot element is electrically isolated while light is emitted from the other divisional pixels, then it is possible to make the dark spot of the divisional pixel less conspicuous thereby to prevent a drop of the yield by spot defects.

When an existing one pixel is divided into a plurality of pixels to take a countermeasure against dark spots in the present embodiment, if it is taken into consideration that the test transistor 128 is provided, then the application is easier as the number of transistors is smaller in the original configuration of the driving circuits. As a result, it is optimum to divide an existing one pixel into a plurality of regions on the basis of the 2TR driving configuration to take a countermeasure against dark spots.

While preferred embodiments of the present invention have been described using specific terms, such description is for illustrative purposes only, and it is to be understood that changes and variations may be made without departing from the spirit or scope of the following claims.

What is claimed is:

1. A display apparatus comprising:

a pixel circuit including a storage capacitor configured to store information corresponding to an image signal, a sampling transistor configured to write the information corresponding to an image signal into the storage capacitor, a driving transistor configured to produce a driving current whose magnitude corresponds to a voltage stored in the storage capacitor, M electro-optical elements connected to an output terminal of the driving transistor, where M is an integer greater than 1, and N test transistors, where N is an integer less than M, wherein each of the N test transistors is configured to selectively control current flowing between a corresponding one of the M electro-optical elements and a current path to the output terminal of the driving transistor, and wherein at least one of the M electro-optical elements is not configured to have a corresponding test transistor that selectively controls current flowing between the at least one of the M electro-optical elements and a current path to the output terminal of the driving transistor.

2. The display apparatus of claim 1, further comprising:

a control circuit configured to perform a dark spot detection process comprising causing ones of the N test transistors to be selectively turned off and on while driving current is produced by the driving transistor such that any of the M electro-optical elements that comprise dark spots can be detected.

3. The display apparatus of claim 2, wherein the dark spot detection process further comprises the steps of, while driving current is produced by the driving transistor:

turning off all of the N test transistors, successively turning on a different one of the N test transistors until all of the N test transistors have been turned on.

4. The display apparatus of claim 3, wherein in the dark spot detection process, when performing the step of successively turning on a different one of the N test transistors until all of the N test transistors have been turned on, each transistor that has been turned on is thereafter maintained in an on-state until all of the N test transistors have been turned on.

5. The display apparatus of claim 2, wherein the control circuit is further configured to perform an image display process comprising:

causing the sampling transistor to write information corresponding to an image signal that corresponds to luminance information of an image to be displayed into the storage capacitor;

causing the driving transistor to produce a driving current corresponding to the information; and causing all of those of the N test transistors that correspond to an electro-optical element that has not been detected as a dark spot to be simultaneously maintained in an on-state throughout a light emission period.

6. The display apparatus of claim 5, wherein the image display process further comprises causing all of those of the N test transistors that correspond to an electro-optical element that has been detected as a dark spot to be maintained in an off-state throughout the light emission period.

7. The display apparatus of claim 2, wherein the control circuit is further configured to cause all of those of the N test transistors that correspond to an electro-optical element that has not been detected as a dark spot to always be in an on-state.

8. The display apparatus of claim 1, wherein each of the electro-optical elements of the pixel circuit are configured to emit light of a same color.

9. The display apparatus of claim 1, wherein M=2 and N=1, and wherein the N=1 test transistor is disposed between the capacitor and the drive transistor such that the N=1 test transistor controls conduction between the capacitor and the drive transistor.

10. The display apparatus of claim 1, further comprising a terminal section configured to serve as an interface for a test pulse supplied from an external dark spot inspection apparatus for controlling the N test transistors between on and off states.

11. The display apparatus of claim 1, wherein, when N>1, the N test transistors are connected to each other in series with a first one of the N test transistors being connected the output terminal of the driving transistor.

12. A method of correcting dark spots of a pixel circuit, comprising:

causing ones of N test transistors that are connected to M electro-optical elements that are included in the pixel circuit to be selectively turned off and on while driving current is produced by a driving transistor included in the pixel circuit and connected to the M electro-optical elements;

detecting any of the M electro-optical elements that is a dark spot; and electrically isolating any of the M electro-optical elements that are detected as a dark spot, wherein M is an integer greater than 1 and N is an integer less than M, wherein each of the N test transistors is configured to selectively control current flowing between a corresponding one of the M electro-optical elements and a current path to the output terminal of the driving transistor, and wherein at least one of the M electro-optical elements does not have a corresponding test transistor that selectively controls current flowing between the at least one of the M electro-optical elements and a current path to the output terminal of the driving transistor.

13. The method of claim 12, further comprising, while driving current is produced by the driving transistor, successively performing the steps of:

turning off all of the N test transistors;

detecting whether the at least one of the M electro-optical elements that does not correspond to a test transistor is a dark spot by detecting whether light is emitted thereby; and when the at least one of the M electro-optical elements that does not correspond to a test transistor is not detected as a dark spot:

turning on a first one of the N test transistors, and detecting whether the one of the M electro-optical elements that corresponds to the first one of N the test transistors is a dark spot by detecting whether light is emitted thereby.

14. The method of claim 13, further comprising, when M>2, after detecting whether the one of the M electro-optical elements that corresponds to the first one of N the test transistors is a dark spot, successively turning on a different one of the N test transistors until all of the N test transistors have been turned on, and after turning on one of the N test transistors, detecting whether the electro-optical element corresponding thereto is a dark spot before turning on a next one of the N test transistors.

15. The method of claim 12, wherein, when N>1, the N test transistors are connected to each other in series with a first one of the N test transistors being connected the output terminal of the driving transistor, and wherein the method further comprises, while driving current is produced by the driving transistor, successively performing the steps of:

turning off the first one of the N test transistors;

detecting whether the at least one of the M electro-optical elements that does not correspond to a test transistor is a dark spot by detecting whether light is emitted thereby; and when the at least one of the M electro-optical elements that does not correspond to a test transistor is not detected as a dark spot:

turning on the first one of the N test transistors while the one of the N test transistors connected thereto is in an off state, and detecting whether the one of the M electro-optical elements that corresponds to the first one of N the test transistors is a dark spot by detecting whether light is emitted thereby.

16. The method of claim 15, further comprising, after detecting whether the one of the M electro-optical elements that corresponds to the first one of N the test transistors is a dark spot, successively turning on a different one of the N test transistors until all of the N test transistors have been turned on, where the N transistors are turned on in order with those of the N test transistors that are closer in the series connection to the output terminal of the driving transistor being turned on first; and for each of the N test transistors, after turning on one of the N test transistors, detecting whether the electro-optical element corresponding thereto is a dark spot while at least a next one of the N test transistors is in an off state and before turning on the next one of the N test transistors.

* * * * *